United States Patent [19]
Mizoshita et al.

[11] Patent Number: 6,025,973
[45] Date of Patent: Feb. 15, 2000

[54] CONSTRUCTION FOR ATTACHING A DISK IN A DISK DRIVE

[75] Inventors: Yoshifumi Mizoshita; Tomoyoshi Yamada; Yasumasa Kuroba; Toru Kouhei; Takao Sugawara; Masaru Matsumoto; Hiroyuki Mase; Masao Tsunekewa; Shinji Koganezawa; Keiji Aruga, all of Kawasaki, Japan

[73] Assignee: Fujitsu Limited, Kanagawa, Japan

[21] Appl. No.: 09/213,759

[22] Filed: Dec. 17, 1998

Related U.S. Application Data

[62] Division of application No. 08/406,807, Mar. 20, 1995, Pat. No. 5,880,904, which is a continuation of application No. 07/946,359, Oct. 29, 1992, abandoned.

[30] Foreign Application Priority Data

| Nov. 22, 1991 | [JP] | Japan | 3-307976 |
|---|---|---|---|
| Jan. 7, 1992 | [JP] | Japan | 4-745 |
| Jan. 7, 1992 | [JP] | Japan | 4-840 |
| Jan. 16, 1992 | [JP] | Japan | 4-5433 |
| Mar. 12, 1992 | [JP] | Japan | 4-53177 |
| Mar. 18, 1992 | [JP] | Japan | 4-61704 |
| Mar. 19, 1992 | [JP] | Japan | 4-63640 |
| May 8, 1992 | [JP] | Japan | 4-115771 |
| Jun. 30, 1992 | [JP] | Japan | 4-171372 |
| Aug. 7, 1992 | [JP] | Japan | 4-211149 |
| Oct. 19, 1992 | [WO] | WIPO | PCTJP9201356 |

[51] Int. Cl.⁷ .............................. G11B 17/02; G11B 23/00
[52] U.S. Cl. .................................. 360/98.08; 360/99.12; 360/97.01
[58] Field of Search .................. 360/133, 97.01, 360/98.01, 98.07, 98.08, 99.08, 99.12

[56] References Cited

U.S. PATENT DOCUMENTS

| 4,639,863 | 1/1987 | Harrison et al. ............ 360/97.01 |
|---|---|---|
| 4,655,616 | 4/1987 | Duncan .................... 384/446 |
| 4,860,194 | 8/1989 | Harrison et al. ............ 360/98.01 |
| 4,864,443 | 9/1989 | Peterson .................. 360/99.12 |

(List continued on next page.)

FOREIGN PATENT DOCUMENTS

| 1305251 | 7/1992 | Canada . |
|---|---|---|
| 0204 299 | 12/1986 | European Pat. Off. . |
| 0419 022 A2 | 3/1991 | European Pat. Off. . |

(List continued on next page.)

OTHER PUBLICATIONS

IBM Technical Disclosure Bulletin; Besha et al; vol. 21, No. 2; "Disk Pack Compliance Clamp", Jul. 1978.
EDN; Sep. 16, 1991, vol. 36, #19; p. 99; Seven H. Leibson.
Newsbytes; Mar. 1992; "Ministor Removable Super–small HD's for Notebook Computers", Rohrbough.

*Primary Examiner*—Jefferson Evans
*Attorney, Agent, or Firm*—Nikaido Marmelstein Murray & Oram LLP

[57] ABSTRACT

A compact card type disk drive includes a housing (21) for accommodating a disk for storing data, a disk drive for rotating the disk, a head assembly for writing and reading data to and from the disk and an electronic circuit including at least an interface circuit (39), the latter three being accommodated in the housing. A connector (42) connected to the electronic circuit is fixed to the outside portion of the housing (21). The electronic circuit preferably contains a read/write circuit (36) and a control circuit (38). The housing (21) preferably includes a lower base (22) and an upper cover (23), and a printed circuit board (14) is disposed along the inner wall of either one, or both, of the base (22) and the cover (23). The outer dimension of the plane of the disk drive is preferably about 85.6 mm×54 mm, and typically, the outer thickness is 5 mm. Preferably, one connector (42) is disposed on either one of the minor sides of the housing (21). The connector (42) is disposed at the substantial center of the housing in the direction of its thickness and is fixed to one of the minor sides of the housing (21) which opposes the head assembly with respect to the disk.

6 Claims, 79 Drawing Sheets

U.S. PATENT DOCUMENTS

| | | | |
|---|---|---|---|
| 4,933,785 | 6/1990 | Morehouse et al. | 360/78.04 |
| 4,945,432 | 7/1990 | Matsudaira et al. | 360/98.02 |
| 4,965,684 | 10/1990 | Stefansky | 360/78.12 |
| 4,967,293 | 10/1990 | Aruga et al. | 360/78.12 |
| 4,982,296 | 1/1991 | Brown et al. | 360/77.03 |
| 5,025,335 | 6/1991 | Stefansky | 360/97.01 |
| 5,025,336 | 6/1991 | Morehouse et al. | 360/97.02 |
| 5,030,260 | 7/1991 | Beck et al. | 96/139 |
| 5,031,062 | 7/1991 | Wood et al. | 360/98.08 |
| 5,038,239 | 8/1991 | Vettel et al. | 360/98.01 |
| 5,041,924 | 8/1991 | Blackborow et al. | 360/69 |
| 5,041,932 | 8/1991 | Hamilton | 360/104 |
| 5,050,015 | 9/1991 | Hack et al. | 360/75 |
| 5,065,262 | 11/1991 | Blackborow et al. | 360/75 |
| 5,113,297 | 5/1992 | Yoshida | 360/99.06 |
| 5,241,436 | 8/1993 | Kawabata et al. | 360/97.01 |
| 5,243,495 | 9/1993 | Read et al. | 361/685 |
| 5,245,486 | 9/1993 | Hachiya et al. | 360/97.01 |
| 5,245,490 | 9/1993 | Nishikawa | 360/106 |
| 5,251,082 | 1/1993 | Elliott et al. | 360/98.07 |
| 5,257,151 | 10/1993 | Cooper et al. | 360/98.07 |
| 5,264,975 | 11/1993 | Bajorek et al. | 360/97.01 |
| 5,282,099 | 1/1994 | Kawagoe et al. | 360/97.01 |
| 5,293,282 | 3/1994 | Squires et al. | 360/77.08 |
| 5,313,350 | 5/1994 | Dion | 360/97.01 |
| 5,331,488 | 7/1994 | McAllister et al. | 360/98.08 |
| 5,377,060 | 12/1994 | Nigam | 360/99.01 |
| 5,392,175 | 2/1995 | Beecroft | 360/97.01 |
| 5,420,733 | 5/1995 | Knighton et al. | 360/97.01 |
| 5,488,523 | 1/1996 | Seaver et al. | 360/99.12 |
| 5,500,779 | 3/1996 | Diel | 360/97.01 |
| 5,502,604 | 3/1996 | Furay | 360/97.01 |
| 5,528,436 | 6/1996 | Peter | 360/99.08 |
| 5,590,006 | 12/1996 | Shafe | 360/105 |

FOREIGN PATENT DOCUMENTS

| | | | |
|---|---|---|---|
| 0 427 490 | 5/1991 | European Pat. Off. | |
| 0 427 490A2 | 5/1991 | European Pat. Off. | |
| 60-242568 | 12/1985 | Japan | |
| 61-283980 | 12/1986 | Japan | |
| 62-124671 | 1/1987 | Japan | |
| 62-259284 | 11/1987 | Japan | |
| 63-0261571 | 10/1988 | Japan | |
| 1-162287 | 1/1989 | Japan | |
| 2-13256 | 1/1990 | Japan | |
| 2-66774 | 3/1990 | Japan | |
| 2-130774 | 5/1990 | Japan | |
| 2-232880 | 9/1990 | Japan | |
| 2-306485 | 12/1990 | Japan | |
| 3-108178 | 5/1991 | Japan | |
| 3-162764 | 7/1991 | Japan | |
| 3-178017 | 8/1991 | Japan | |
| 3-214481 | 9/1991 | Japan | |
| 3-254480 | 11/1991 | Japan | |
| 3-260974 | 11/1991 | Japan | 360/98.08 |
| 4-57261 | 2/1992 | Japan | |
| 4-57279 | 2/1992 | Japan | |
| 4-57297 | 2/1992 | Japan | |
| 4-102282 | 4/1992 | Japan | |
| 4-111290 | 4/1992 | Japan | |
| 4-181587 | 6/1992 | Japan | |
| 4-325979 | 11/1992 | Japan | 360/99.08 |
| 5-174561 | 7/1993 | Japan | |

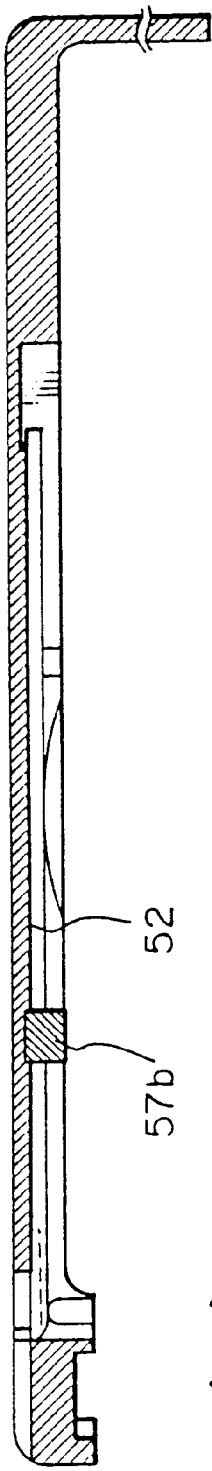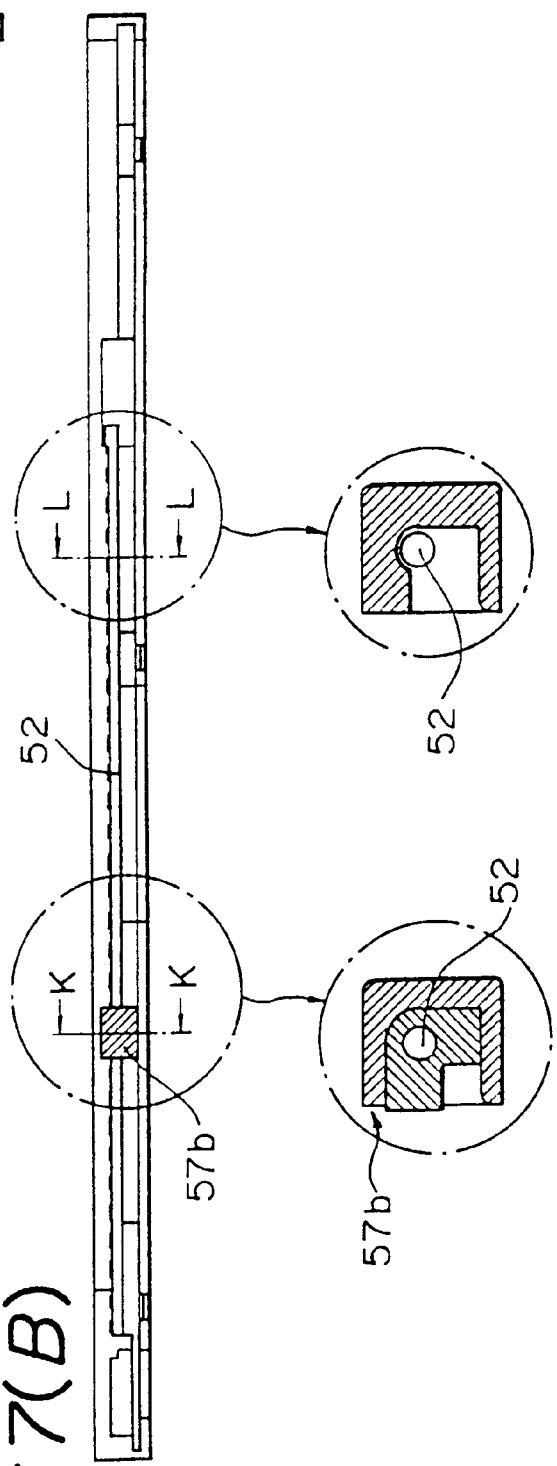
Fig. 67(A)
Fig. 67(B)

Fig. 93
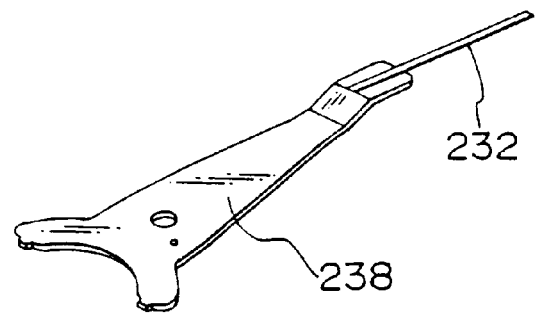
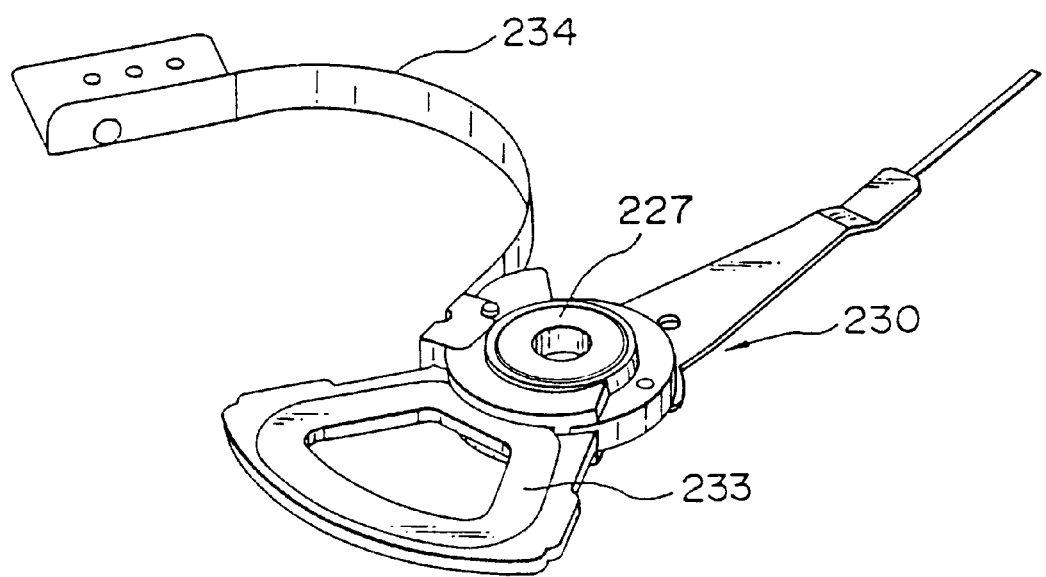

CONSTRUCTION FOR ATTACHING A DISK IN A DISK DRIVE

This is a divisional application of Ser. No. 08/406,807 filed Mar. 20, 1995, now U.S. Pat. No. 5,880,904, which is a continuation of application Ser. No. 07/946,359 filed Oct. 29, 1992 now abandoned.

BACKGROUND OF THE INVENTION

1. Field of the Invention

The present invention relates to a disk drive that can be utilized as an external memory of a computer system, and that utilizes a magnetic disk or a magneto-optical disk. More specifically, it relates to a whole construction of a disk drive having a housing of a credit card type, a circuit assembly thereof and the structure of each of the various mechanical components within the above housing.

2. Description of the Related Art

Generally, disk drives, e.g., magnetic disk drives, having at least one magnetic disk utilized as a recording medium, have been in practical use in various areas including computer systems as non-volatile memory devices. Further, in recent years, improvements in the technology of the magnetic disk drives, such as increasing the magnetic recording density of the magnetic disk, have been realized, leading to down-sizing of magnetic disk drives per se. On the other hand, computer systems, etc., have been becoming more compact, lighter in weight and lower in power consumption, as represented by a portable personal computer, owing to recent rapid development of microelectronics.

Though down-sizing of the technology of the magnetic disk drive has progressed recently as described above, the dimensions are still too large, the weight too heavy and the power consumption too high if a magnetic disk having a diameter of 2.5 inches is utilized. Therefore, it may be difficult for the current magnetic disk drives to be applied to the above portable personal computer for which compactness, lighter weight and lower power consumption are required. To meet this requirement, a magnetic disk drive utilizing a magnetic disk with a diameter of 1.89 inches has been announced in public recently. This magnetic disk drive surely has smaller dimensions than the magnetic disk drive with a diameter of 2.5 inches. However, in such a magnetic disk drive comprising a magnetic disk with a diameter of 1.89 inches, down-sizing of the magnetic disk drive has been attempted by using the prior art without making any improvements. Therefore, a problem occurs in that the dimensions of the above magnetic disk drive, especially the thickness or height, are still too large for the disk drive to be practically used as a portable device (nowadays, it is generally well known that the lower limit of the thickness thereof is as large as 10 mm). Moreover, another problem occurs in that such a magnetic disk drive cannot have sufficient durability against mechanical shock caused by external factors, such as a fall of a portable device which incorporates such a disk drive.

Further, a modular unitary disk file subsystem has been disclosed in U.S. Pat. Nos. 4639863 & 4860194, wherein an elongated printed circuit board is directly attached to the side of a housing including a head and disk assembly so as to attain thinner dimensions. However, a concrete thickness value in such a construction is not described in these prior arts. Moreover, even though the thickness of the disk drive can be reduced successfully, a new problem would occur in that the area of the disk drive including the printed circuit board and the housing is enlarged more than usual.

Taking these conditions into account, in a known portable personal computer or the like that is currently in use, an integrated circuit(IC) memory card is provisionally utilized, rather than a magnetic disk, so that the required dimensions and weight can be attained. The specifications of this IC memory card have been standardized recently {the standard specification of JEIDA (Japan Electronic Industry Development Association) and PCMIA (Personal Computer Memory Card International Association)}, where the thickness or height of the card is defined as 5 mm or 3.3 mm. A card satisfying these standard specifications is sufficiently thin and sufficiently light, and therefore the above card can be suitable for application to a portable personal computer, etc., in view of dimensions and weight.

However, presently, there are two significant disadvantages in the above IC memory card as follows.

First, computer systems utilizing the IC memory card are extremely expensive. More concretely, the cost per megabyte thereof is several hundreds of dollars/MByte, which is several times higher than a computer system utilizing flexible disk drive and is several times higher than that of hard disk drive (i.e., magnetic disk drive).

Second, the whole storage capacity of a computer system utilizing the above IC memory card is not always sufficient to comply with the current requests of users. Nowadays, an IC memory card having a storage capacity of approximately 1 MByte is mainly used. The storage capacity of the IC memory card will be increased up to the order of several MBytes to 10 MBytes in the future. On the other hand, presently, in the ideal portable personal computer, a memory system having more than 40 MBytes is actually required. Accordingly, the computer system utilizing the above IC memory card cannot substantially satisfy the current requirements for storage capacity. Moreover, in the near future, the above storage capacity that is required by users will be expected to be increased more and more. Therefore, it will be difficult for the storage capacity of the IC memory card to catch up with the required storage capacity, even with the progress of IC memory technology taken into account.

As described above, if a magnetic disk drive according to the prior art is to be utilized for a portable personal computer, it will be sufficient in respect to the cost and storage capacity, but it is not sufficient in respect to the dimensions, weight, power consumption and durability against mechanical shock. On the contrary, the IC memory card currently utilized for portable personal computers is sufficient in respect to the dimensions, weight, power consumption and durability against mechanical shock, however, the cost of the IC memory card is too expensive and the storage capacity thereof is not always satisfactory for the users. Therefore, in order to realize a suitable portable personal computer, a memory device that has both the advantages of the magnetic disk drive and the IC memory card is strongly desired.

As a strategy for overcoming the above-mentioned difficulties, it is considered to be effective to utilize the specifications of a type III PCMCIA. In this type III PCMCIA, the same dimensions as type I and type II are defined in respect to plane directions, while the thickness dimensions are allowed to be a maximum value of 10.5 mm. If one connector conforming to the type III of PCMCIA is provided, a card having the thickness of 10.5 mm can be inserted into two different kinds of slots of the type I and type II arranged in a vertical direction.

As described above, if the specification of the thickness dimension is defined as 10.5 mm, a disk drive of a card type can be realized by using the prior art without any improvements. Actually, a device having a thickness of 10.5 mm has already been announced. However, the down-sizing of the device is necessitated in personal computers, particularly notebook type personal computers, and therefore, a structure such that the two slots are arranged in a vertical direction may be disadvantageous in terms of down-sizing. On the other hand, in palm top type personal computers, only one slot can be provided in each personal computer. In other words, it is now difficult for memory devices in all areas that IC memory cards are utilized to be replaced with magnetic disk drives. Therefore, it is strongly desired that magnetic disk drives having outer dimensions conforming to the type I or type II, i.e., disk drives with a thickness equal to or less than 5 mm, be realized.

SUMMARY OF THE INVENTION

Accordingly, an object of the present invention is to provide a magnetic disk drive of lower cost and sufficient storage capacity which simultaneously has the advantages of an IC memory card such as compactness, lighter weight, lower power consumption and sufficient durability against mechanical shock.

A further object of the present invention is to provide a magnetic disk drive that has the same thickness as the IC memory card, e.g., 5 mm, a weight lighter than 70 g, stability against mechanical shock of more than 200 G and resistance to external magnetic fields of more than 1 kGauss.

To attain the above object, the disk drive according to the present invention comprises a rectangular housing, inside which is contained at least one disk that stores information, a disk driving means that forces the disk to rotate, a head assembly that performs read/write operations on the disk, and electronic circuitry. Also, at least one connector that is connected to the electronic circuitry is fixed outside the housing.

Further, the above electronic circuitry includes an interface circuit that allows communication with an external host system, a read/write circuit that receives read signals from the head assembly and provides write signals to the head assembly, a servo circuit that controls the operation of the magnetic disk and head assembly, and a control circuit that receives control signals from the host system via the interface circuit and provides the control signals to the read/write circuit and the servo circuit.

Further, the above head assembly includes a magnetic head that executes reproducing/recording operations corresponding to read/write operations of information at a predetermined position on the magnetic disk, a supporting spring mechanism that supports the magnetic head, an arm that supports the spring mechanism, and a rotary type actuator that forces the arm to rotate in either direction and the magnetic head to move to a predetermined position on the magnetic disk.

Preferably, the above housing has a base at the lower side and a cover at the upper side, and electronic components that constitute the above electronic circuitry are assembled on at least one printed circuit board which is located along either one inner wall surface or both of respective inner wall surfaces of the base and cover. More concretely, the above printed circuit board is composed of a flexible printed circuit board. Alternatively, both the base and cover are made of metal and are also used as metal based printed circuit boards.

Further, preferably, the disk drive according to the present invention has outer dimensions in plane directions of approximately 85.6 mm×54 mm and has a thickness of less than 8 mm, typically 5 mm.

Further, preferably, a plurality of insertion guide portions, which allow said housing to be inserted into a slot of a host device so that the disk drive can be in an operative condition, are provided on predetermined portions of the respective sides having longer dimensions of the housing.

Further, preferably, only one connector is attached to a portion of one of the sides with shorter dimensions of the housing. Furthermore, the connector is located in an approximately central position in respect to the thickness direction of the housing, and is attached to either one of the sides having the shorter dimensions of the housing, in a position opposite to the head assembly across the magnetic disk.

Further, preferably, the base and cover of the housing have coupling flanges, respectively, that extend outward at the outer peripheral portion thereof, excluding the portion where the connector is located, the housing being formed by jointing the above coupling flanges together. In this case, the base and cover are made of a metal including iron, a metal including aluminum or resin material. Furthermore, the jointed coupling flanges are preferably covered with at least one frame, that is constructed so that it serves as an insertion guide rail, a sealing means for ensuring that the inside of the housing remains closed, or a buffer means that protects the housing from a mechanical shock.

Further, preferably, the disk driving means includes a spindle motor that is located at the inner portion of the disk so that the disk can rotate. Further, the above spindle motor has a first fixed shaft that is fixed in a predetermined position within the housing so as to support the disk rotatably, and has a pair of first bearing means that are fixed at the upper side and lower side of the first fixed shaft, respectively, so as to hold the disk.

The above head assembly has at least one magnetic head 27 that executes reproducing/recording operations corresponding to read/write operations of the information on either surface of the upper and lower surfaces of the magnetic disk 24, at least one arm 28 that supports the magnetic head 27, and an actuator 29 that forces the arm 28 to rotate in either direction and the magnetic head 27 to move to the predetermined track on the magnetic disk 24.

The head assembly further has a rotary type actuator 29 that forces the arm 28 to rotate in either direction and the head 27 to move to the predetermined track on the magnetic disk 24, a second fixed shaft that is fixed in a predetermined position within the housing, and has a pair of second bearing means that are fixed at the upper side and lower side of the second fixed shaft, respectively. Furthermore, the above first fixed shaft and second fixed shaft are constructed to be fastened to the base by fitting them into the base.

Further, preferably, the first fixed shaft and second fixed shaft have flange portions on one portion of the first fixed shaft and second fixed shaft, respectively, wherein the flange portion of the first fixed shaft has a diameter approximately equal to or larger than the average span between the pair of first bearing means, and the flange portion of the second fixed shaft has a diameter approximately equal to or larger than the average span between the pair of second bearing means.

Further, preferably, the first fixed shaft at the disk and second fixed shaft at the actuator are rigidly coupled with the cover in respect to the thickness direction of the housing. More concretely, one end of the fixed shaft at the disk and the fixed shaft at the actuator are fixed to the cover by spot welding or by adhesion.

Further, preferably, the spindle motor has a fixed shaft that fixes the spindle motor per se in a predetermined position within the housing, a pair of bearing means that are fixed around the fixed shaft, a spindle hub that has an outer portion engaged with the central hole of the magnetic disk and has an inner portion mounted in the first fixed shaft rotatably via the bearing means, at least one rotor magnet that is fixed to the spindle hub, and at least one stator coil that is fixed to the base. In this case, the rotor magnet is located between the position of the inside diameter of the magnetic disk and the position of the outer peripheral portion of the bearing means in respect to the radial direction of the rotor magnet.

More concretely, the spindle motor is an outer ring rotating type motor, and the rotor magnet has a thickness larger than the average distance between the pair of bearing means at the upper and lower sides, and the respective centers of the magnetic disk, the rotor magnet and the pair of bearing means are located in the approximately same position in respect to the thickness direction of the housing.

Alternatively, the spindle motor is a flat type motor with an axial gap in which a magnetic gap is formed in the axial direction of the fixed shaft of the spindle, and the magnetic disk is engaged with the outer peripheral portion of the rotor magnet, and the inner peripheral portion of the rotor magnet is rotatably supported by the fixed shaft of the spindle via the bearing means, and the rotor magnet is constructed such that it also serves as a spindle hub.

In both of the above two kinds of spindle motors, the magnetic disk is preferably fixed to the spindle hub by adhesion.

Further, preferably, a load/unload assembly is provided inside the housing that allows the magnetic head to be loaded in a predetermined position on the magnetic disk and the magnetic head to be unloaded from the position thereon in connection with inserting/removing operations for inserting the housing into a slot of a host device and for removing the housing from the slot thereof. Furthermore, a locking assembly is provided inside the housing that forces the magnetic disk and actuator to be locked mechanically in a predetermined position in connection with the above inserting/removing operations.

Further preferably, the actuator includes a flat coil that is located in one end of a moving part of the arm (carriage) opposite to the magnetic head in respect to the second fixed shaft of the actuator; an upper yoke, a lower yoke and side yokes that are located around the flat coil; and a permanent magnet that is located in either one or both of the upper and lower yokes. In this case, a magnetic circuit is constituted from the upper yoke, lower yoke, side yokes and permanent magnet. Furthermore, either one or both of the upper and lower yokes are constructed such that the width of each central portion of the upper and lower yokes is larger than the width of each remaining portion thereof.

Further preferably, the actuator is a moving coil type actuator that includes an upper yoke element having a plurality of first bent portions that are bent downward at approximately right angles, respectively, and a lower yoke element having a plurality of second bent portions that are bent upward at approximately right angles, respectively. Furthermore, a closed magnetic path is formed by combining the upper and lower yoke elements with each other.

Further preferably, the disk drive according to the present invention further comprises a retraction magnet that is provided in the outer fringe part of the actuator to force the magnetic head to be in retraction, and a retracting yoke that is located around the retraction magnet and has a gap in which the retraction magnet is placed.

More concretely, the thickness of the gap is changed in the direction of displacement of the magnetic head so as to retract the magnetic head toward a predetermined position. Typically, the thickness value g of the gap is changed approximately with a relation of approximately $1/(x+x_0)$ in respect to the displacement value x of the magnetic head.

Alternatively, the area of the portion, where the retraction magnet and retraction yoke overlap with each other in the plane included in a space therebetween, is changed in the direction of displacement of the magnetic head so as to retract the magnetic head toward a predetermined position.

Additionally preferably, the disk drive according to the present invention comprises a rectangular housing which includes one magnetic disk that is equal to or less than 4.8 cm (1.89 inches), a head assembly having two magnetic heads that execute read/write operations, and further comprises one connector that is connected to the electronic circuitry outside the housing, and has outer dimensions in plane directions of approximately 85.6 mm×54 mm. In such a construction, the magnetic disk and two magnetic heads are constructed such that perpendicular magnetic recording can be executed. Typically, each of the two magnetic heads is a unitary magnetic head that has a body comprised of flexible thin sheet. Alternatively, the magnetic disk and two magnetic heads are constructed such that longitudinal magnetic recording can be executed, and each of the two magnetic heads includes a head slider with a predetermined flying height.

BRIEF DESCRIPTION OF THE DRAWINGS

The above object and features of the present invention will be more apparent from the following description of the preferred embodiments with reference to the accompanying drawings, wherein:

FIGS. 61, 62, 63, 64, 65, 66(A)–66(C), 67(A) and 67(B) are views showing one example of a locking construction of a head assembly of a disk drive according to the present invention;

DESCRIPTION OF THE PREFERRED EMBODIMENTS

Before describing the embodiments of the present invention, the related art and the disadvantage therein will be described with reference to the related figures.

Figure 1:
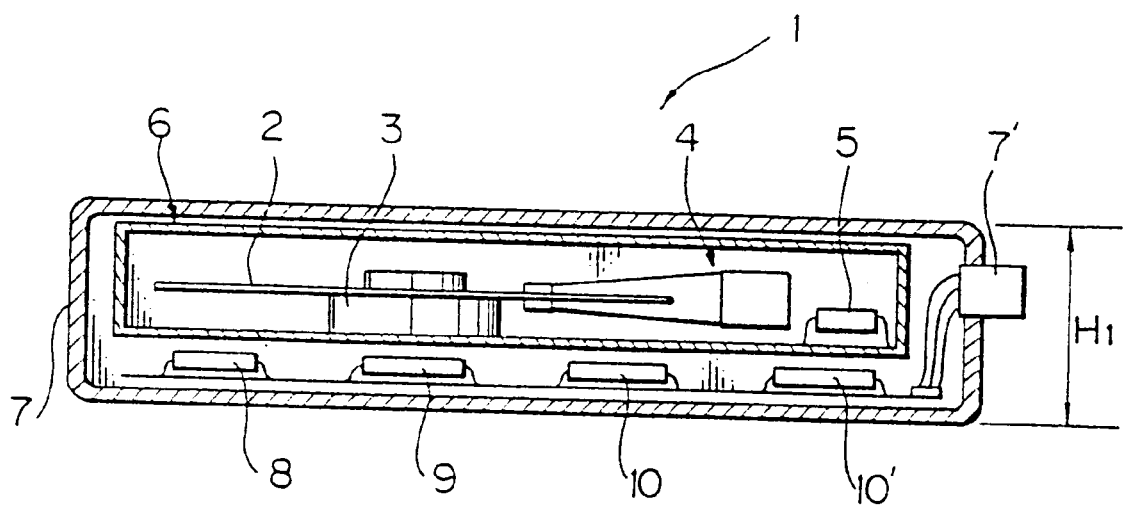
FIGS. 1, 2 are views showing an example of a disk drive structure according to a prior art.
Figure 2:
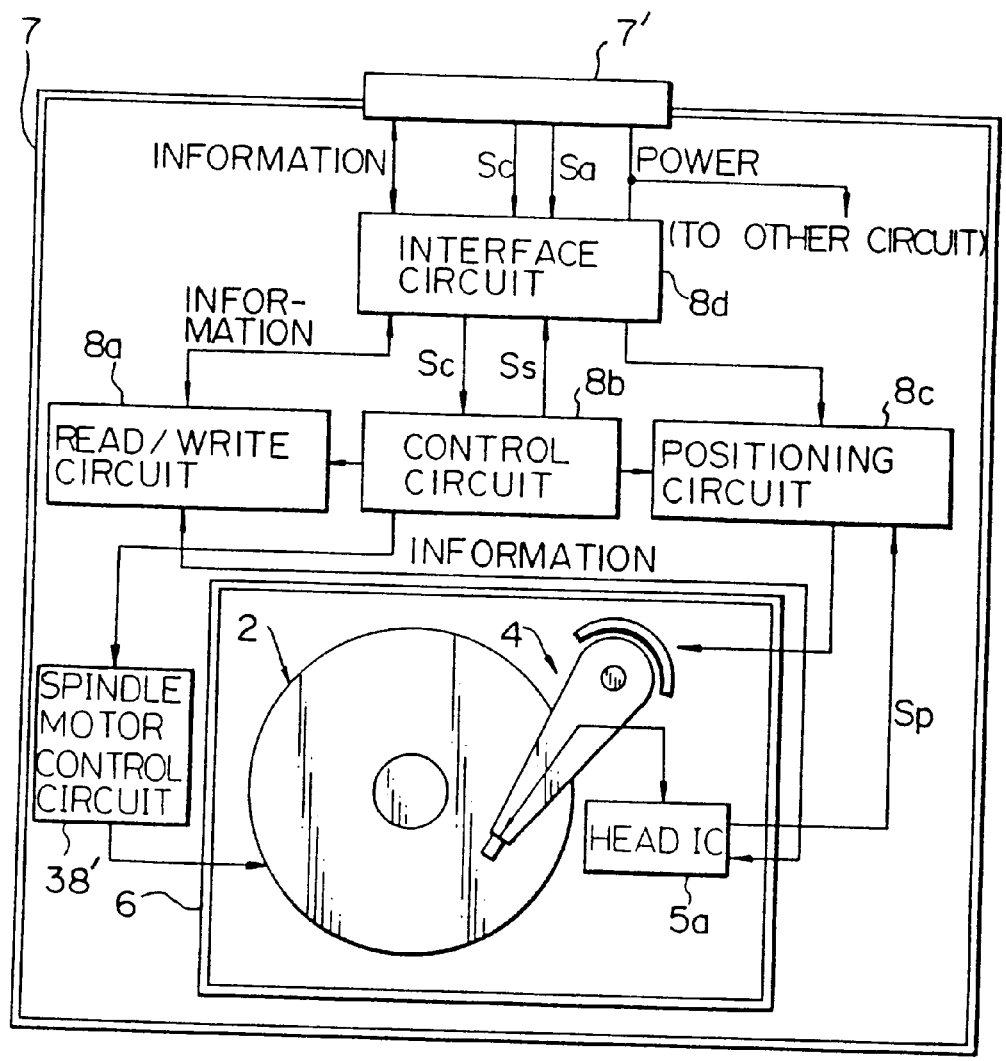

FIGS. 1 and 2 are views showing an example of a disk drive structure according to a prior art. To be more specific, FIG. 1 is a front view showing the whole structure of a disk drive according to a prior art, and FIG. 2 is a schematic diagram showing separately a circuit assembly and a mechanical assembly of the disk drive in FIG. 1.

In this case, a magnetic disk drive 1 has two housings, i.e., an inner housing 6 and an outer housing 7. As shown in FIGS. 1 and 2, a magnetic disk 2, a spindle motor 3, a magnetic head mechanism 4, a head IC 5 constituting an amplifying circuit 5a and the like are contained in the inner housing 6, which is enclosed in the outer housing 7. Further, in a space between the outer housing 7 and the inner housing 6, an IC 8 constituting a read/write circuit 8a, an IC 9 constituting a control circuit 8b, an IC 10 constituting a positioning circuit 8c and an IC 10' constituting an interface circuit 8d are incorporated. Furthermore, a connector 7' is attached in the outer housing 7.

Such a magnetic disk drive 1 is usually stored in a predetermined place, and is carried and connected to an external host system, such as a host computer (not illustrated) by utilizing the connector 7', as occasion demands. Further, information can be read (reproduced) off the magnetic disk 2 and the information can be written (recorded) on the above magnetic disk 2, utilizing the read/write circuit 8a.

More specifically, in the above circuit configuration, control signals $S_c$ and address signals $S_a$ are sent from the host computer to the interface circuit 8d via the connector 7'. Further, the control signals $S_c$ are input to the control circuit 8b, and status signals $S_s$ indicating the current status of the magnetic disk drive 1 are issued from the control circuit 8b to the interface circuit 8d. Also, the interface circuit 8d is coupled to the positioning circuit 8c, which determines the position of the magnetic head mechanism 4 on the magnetic disk 2 in accordance with instructions from the host computer. The information of the above position read by the magnetic head mechanism 4 is sent back to the positioning circuit 8c as position signals $S_p$, via the amplifying circuit 5a, so that accurate positioning can be performed by means of servo control. Further, power is supplied to all the above circuits, together with any other associated circuits.

In the above-mentioned prior art, the inner and outer housings 6, 7 form a double structure, where the disk drive 1 has the inner housing 6 that includes main mechanical components, and has the outer housing 7 that surrounds the inner housing 6 and that includes mainly electronic circuitry. Owing to such a double structure, the lower limit of the thickness $H_l$ (FIG. 1) of the outer housing 7, i.e., the height dimension of the disk drive 1 is likely to be limited to a certain minimum value. Consequently, it becomes difficult to realize a disk drive having a thickness as small as that of an IC memory card and having overall dimensions that conform to those of the IC memory card, according to the prior art as illustrated in FIGS. 1 and 2. Therefore, a disk drive in which the outer dimensions thereof, the whole thickness in particular, can be reduced remarkably by providing a housing of a single structure, is highly desired.

Figure 3:
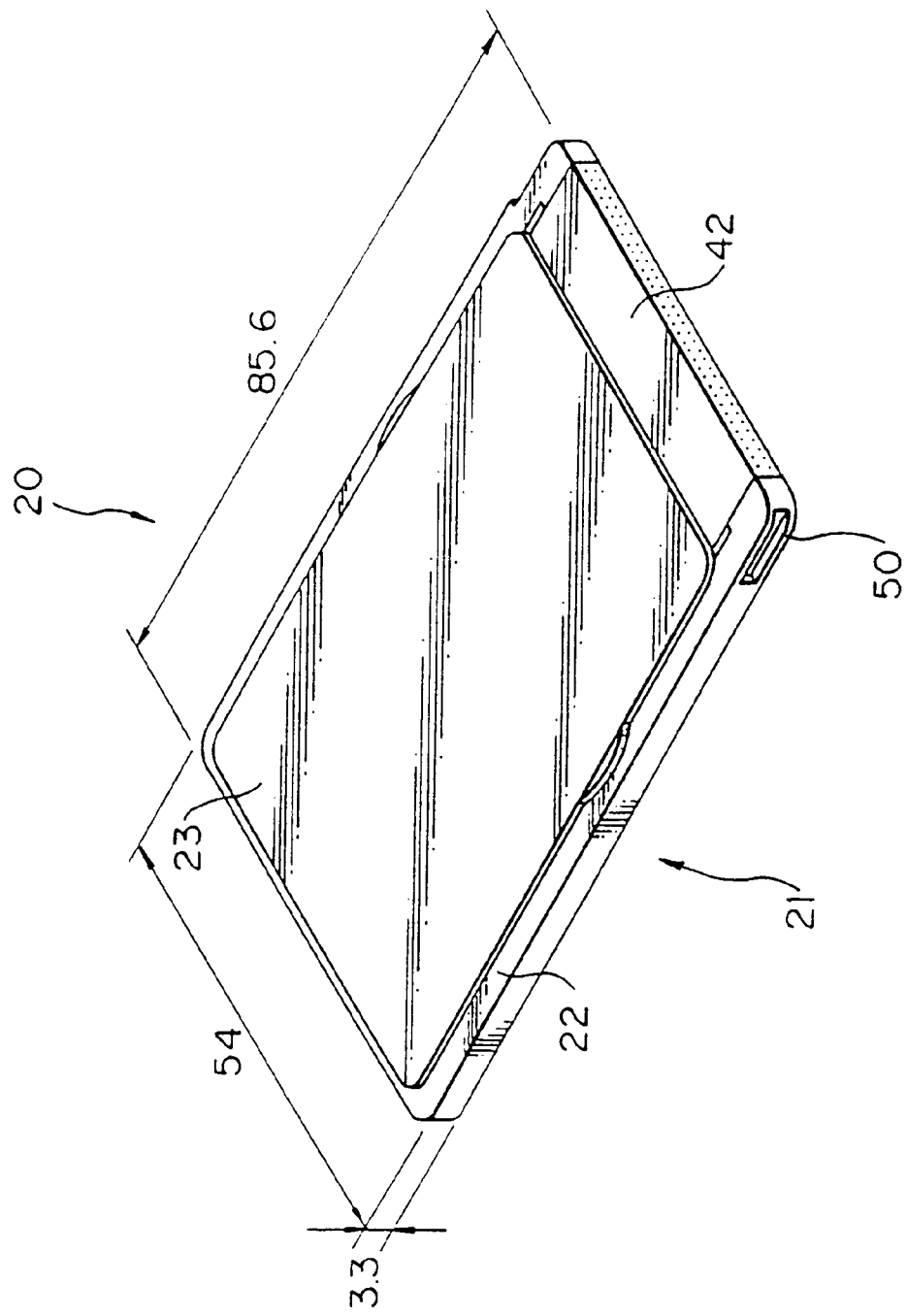
FIGS. 3, 4, 5, 6, 7, 8 and 9 are views showing a first preferred embodiment of a disk drive structure according to the present invention.
Figure 4:
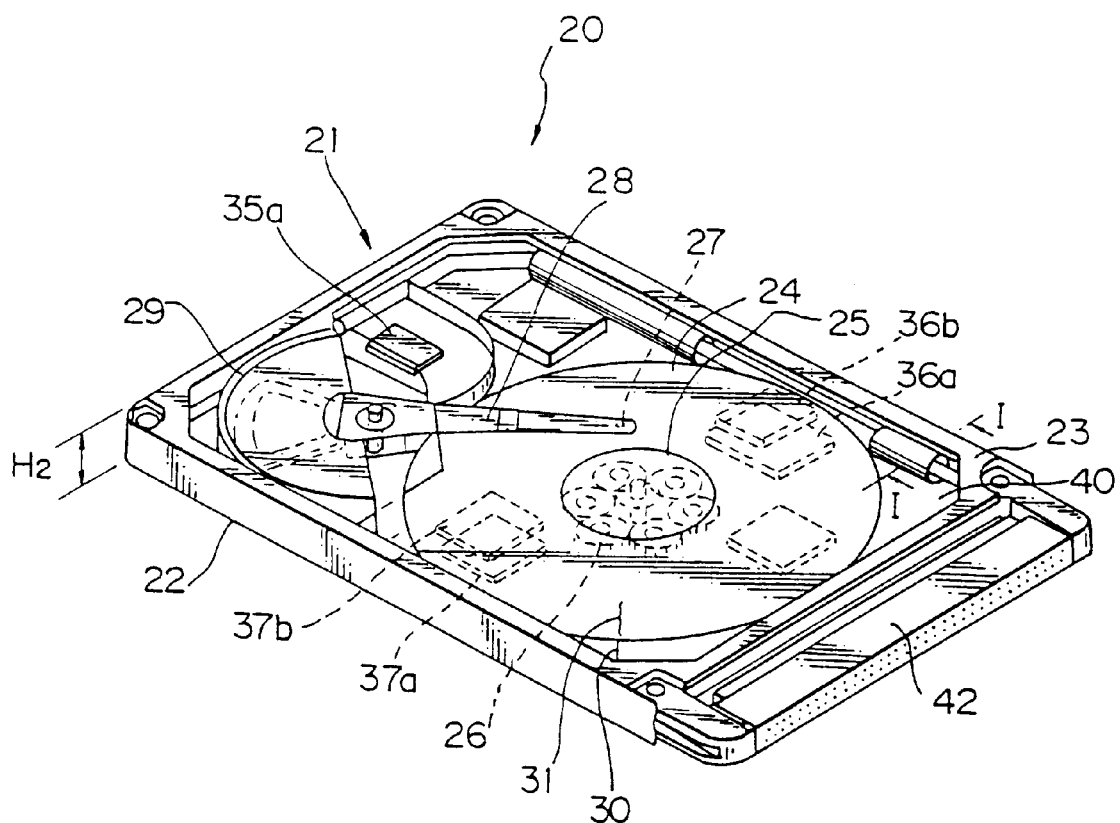
Figure 5:
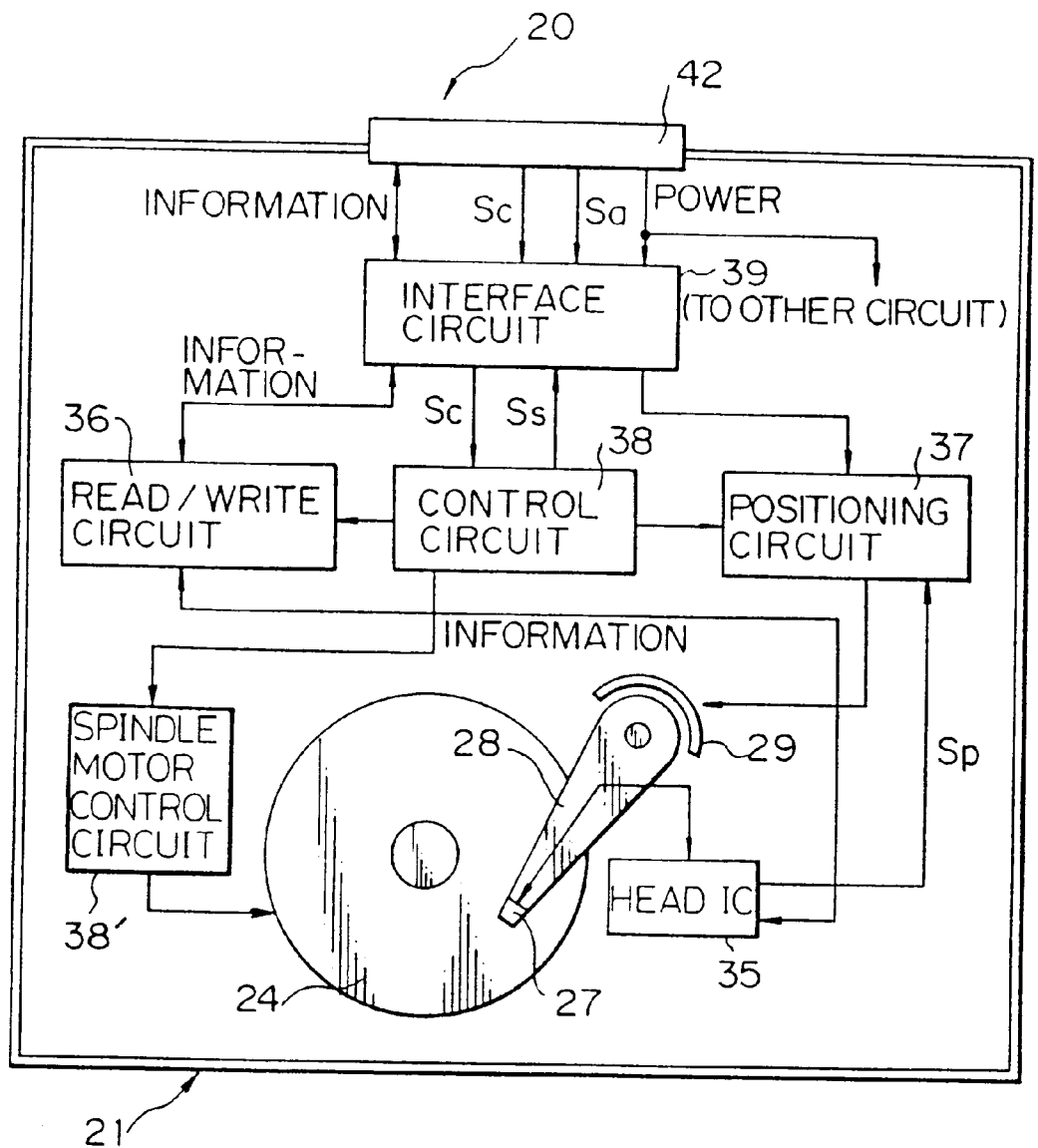
Figure 6:
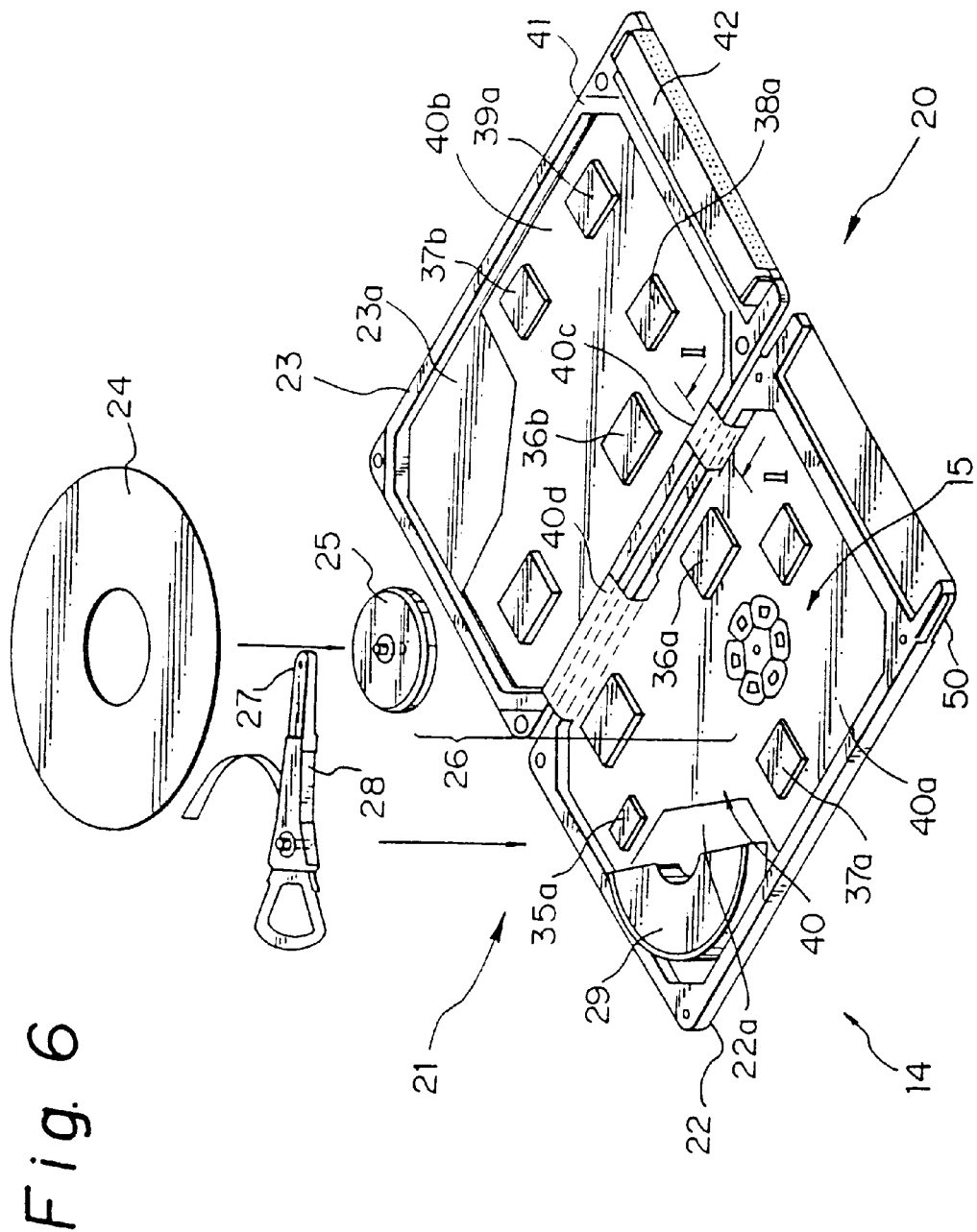
Figure 7:
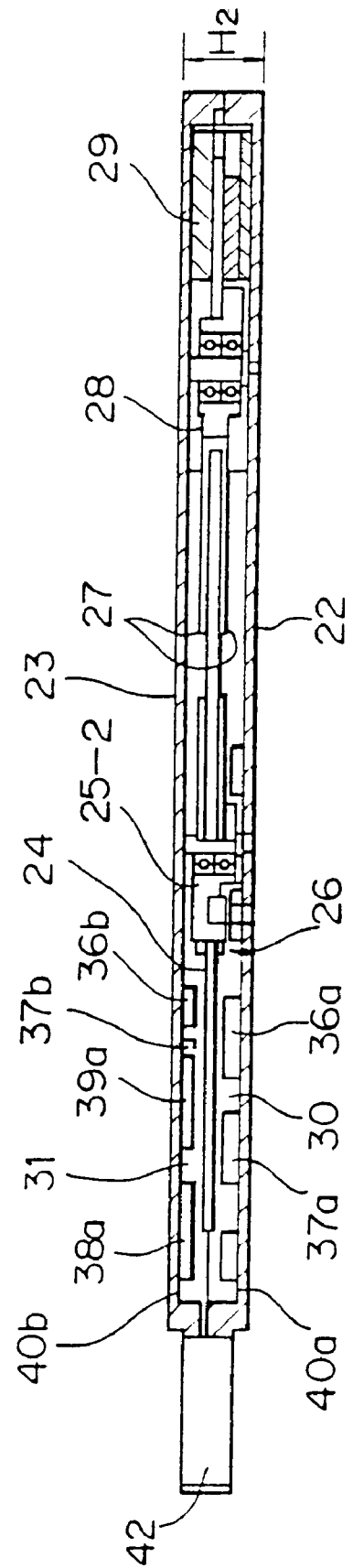
Figure 8:
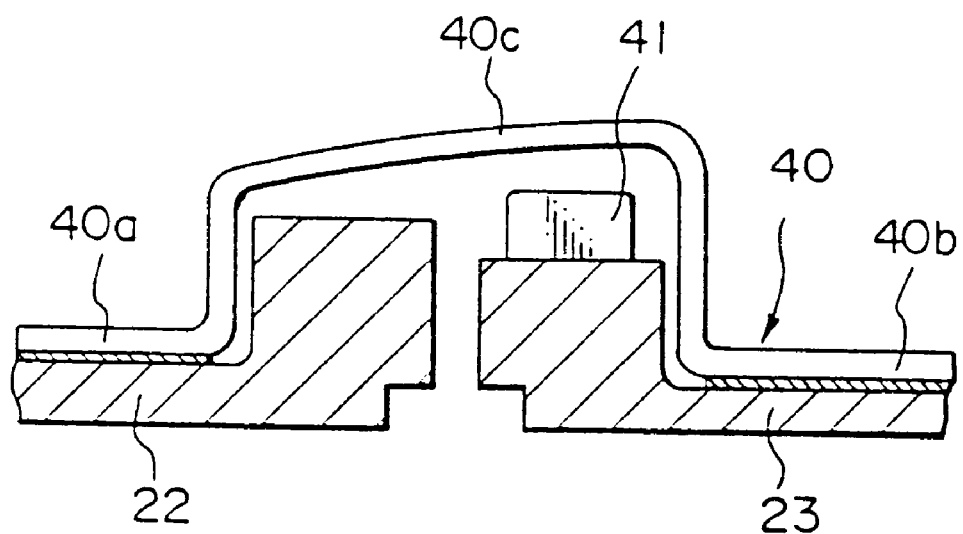
Figure 9:
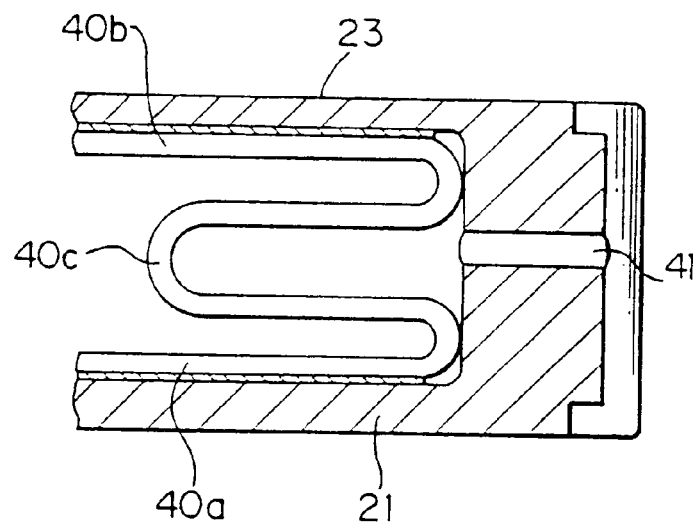

FIGS. 3, 4, 5, 6, 7, 8 and 9 are views showing a first preferred embodiment of a disk drive structure according to the present invention. To be more specific, FIG. 3 is a perspective view showing an outer appearance of a magnetic disk drive and the dimensions thereof; FIG. 4 is a perspective view partially showing the construction within a housing; FIG. 5 is a schematic diagram separately showing a circuit assembly and a mechanical assembly illustrated in FIG. 4 separately; FIG. 6 is an exploded perspective view showing the construction of FIG. 4 in more detail; FIG. 7 is a sectional front view of FIG. 4; FIG. 8 is an enlarged sectional view taken along a line I—I of FIG. 4; and FIG. 9 is an enlarged sectional view taken along a line II—II of FIG. 6.

In the first preferred embodiment, as illustrated in these figures, a magnetic disk drive 20 comprises a single rectangular housing 21 that is constituted from a base at the lower side and a cover at the upper side. Further, the housing 21 has outer dimensions in plane directions of approximately 85.6 mm×54 mm and has a thickness of less than 8 mm, typically 5 mm or 3.3 mm; namely, the above magnetic disk drive 20 can have the same size as that of the currently used IC memory card of type II of PCMCIA.

In this case, unlike the prior art as shown in FIGS. 1 and 2, one magnetic disk 24 preferably having a diameter of 48 mm or 1.89 inches that stores information, a disk driving means 15 that forces the magnetic disk to rotate, a head assembly that performs read/write operations on the magnetic disk 24, and electronic circuitry that is composed of electronic components 70 are contained in a closed space within the above single housing 21.

Further, the above disk driving means 15 has a spindle motor 26 that is located at the inner portion of the magnetic disk 24 so that the magnetic disk can rotate and a fixed shaft 25 of spindle that is fixed in a predetermined position within the housing 21 so as to support the magnetic disk 24 rotatably.

Furthermore, the above head assembly has at least one magnetic head 27 that executes reproducing/recording operations corresponding to read/write operations of the information on either surface of the upper and lower surfaces of the magnetic disk 24, at least one arm 28 that supports the magnetic head 27, and an actuator 29 that forces the arm 28 to rotate in either direction and the magnetic head 27 to move to the predetermined track on the magnetic disk 24.

Further, in some other preferred embodiments, a head with a small pressing load is utilized as the above magnetic head. For example, when the contact type magnetic head, disclosed in Japanese Unexamined Patent Publication (Kokai) No. 3-178017 is utilized as the magnetic head 27, an extremely small load of several tens of mg can be used. On the other hand, in the flying type head as shown in FIGS. 4 to 7, it is possible for a head with a relatively small load of several hundreds of mg to be utilized. Further, by applying the negative pressure type head slider and load/unload mechanism to the disk drive according to the present invention, the friction of the head, caused when a spindle motor starts up, can be substantially neglected. By virtue of such advantages, a spindle motor, that starts up with a relatively low power voltage, can be realized.

Furthermore, the above electronic circuitry includes an interface circuit 39 that allows communication with an external host computer, a read/write circuit 36 that receives read signals from the head assembly and provides write signals to the head assembly, a servo circuit that is comprised of a positioning circuit 37 and an amplifying circuit (head IC) 35 to control the operations of the magnetic disk 24 and the head assembly, and a control circuit 38 that receives control signals $S_c$ from the external host computer via the interface circuit 39 and provides the control signals $S_c$ to the read/write circuit 36 and the servo circuit. More specifically, the control signals $S_c$ and address signals $S_a$ are sent from the host computer to the interface circuit 39 via the connector 42. Further, the control signals $S_c$ are input into the control circuit 38, and status signals $S_s$ indicating the current status of the magnetic disk drive 20 are issued from the control circuit 38 to the interface circuit 39. Also, the interface circuit 39 is coupled to the positioning circuit 37, which determines the position of the magnetic head 27 on the magnetic disk 24 in accordance with instructions from the host computer. Here, the information of the above position read by the magnetic head 24 is sent back to the positioning circuit 37 as position signals $S_p$, via the amplifying circuit 35, so that accurate positioning can be performed by means of servo control. Further, power is supplied to all the above circuits via the connector 42, together with any other associated circuits.

Hereinafter, with regard to the various signals in the interface circuit in the present invention, some additional explanation will be given. As the specifications of the interface utilized for the connector 42, the following specifications can be used; namely, SCSI (Small Computer System Interface), IDE (or PC/AT) and PCMCIA-ATA(AT Attachment) which will become the standards of the industry in the near future. Among these interface specifications, with regard to SCSI and IDE, in particular, their electrical specifications are different from the electrical specifications of the IC memory card fabricated in accordance with PCMCIA. Accordingly, it is impossible for a disk drive fabricated in accordance with SCSI or IDE, and the above IC memory card to be used in common. On the other hand, since PCMCIA-ATA provides an extended function of PCMCIA PC Card Standard, a disk drive fabricated in accordance with PCMCIA-ATA and a disk drive fabricated in accordance with usual PCMIA can be inserted into the same slot of a host computer. Therefore, in preferred embodiments, the PCMCIA-ATA can be recommended as the interfaces of choice.

Furthermore, a power supply voltage of preferably 3–3.3 V, should be used. In conventional electronic circuits, power consumption can be reduced by operating the circuits at a relatively low voltage. An IC memory operative at a lower voltage can be obtained due to the recent progress in the design of electronic circuits. However, the decreasing of a voltage supplied to mechanical components does not always lead to a reduction in power consumption. On the contrary, in such a case, the ratio of power consumption of electronic circuits for driving the mechanical components to power consumption of the mechanical components per se is likely to be rather increased. The main designs for effectively decreasing applied voltage are as follows. First, a spindle motor can be improved and therefore the start-up operation at a lower voltage can be realized. Second, the diameter of bearing means can be made smaller and therefore a load torque can be reduced. Third, a head with a lower pressure load can be adopted and therefore a load torque during start-up operation can be reduced. Fourth, a housing made of metal including iron can be adopted and therefor shielding against various electrical noises can be improved.

Furthermore, as shown in FIG. 6, a plurality of insertion guide portions 50 are provided on predetermined portions of the respective sides having longer dimensions of the housing 21. The above insertion guide portions 50 are intended to allow the housing 21 to be inserted into a slot of a host computer so that the disk drive can be placed in an operative condition, if the respective connectors of the host computer and disk drive are connected with each other. These insertion guide portions 50 are constructed to have a thickness of less than the whole thickness of the housing 21.

As apparent from FIG. 7, the disk 24 is located approximately in the central position in respect to the thickness direction of the housing 21. Accordingly, there exists a flat space 30 between the disk 24 and the base 22, and another flat space 31 between the disk 24 and the cover 23.

In the vicinity of the arm 28 in the space 30, an IC 35a is incorporated, that constitutes a first stage amplifying circuit 35 for amplifying very small read signals reproduced by the magnetic head 27. Further, in the space 30, ICs for processing analog signals, e.g., an IC 36a that constitutes a part of the read/write circuit 36 and an IC 37a that constitutes a part of the positioning circuit 37, are also incorporated.

On the other hand, in a space 31 that is positioned on the opposite side of the space 30 with respect to the disk 24 and is separated from the space 30 by the disk 24, ICs for processing digital signals, e.g., an IC 36b that constitutes the remaining part of the read/write circuit 36, an IC 36b that constitutes the remaining part of the positioning circuits 37, an IC 38a that constitutes the control circuit 38 and an IC 39a that constitutes the interface circuit 38 are incorporated.

All the electronic components 70 that include the above-mentioned ICs 36a–39a are assembled on the respective surfaces of a first body portion 40a and a second body portion 40b of a printed circuit board 14, which are attached close to the inner wall surfaces of the base 22 and cover 23, respectively, and the above electronic components 70 are contained within the housing 21, together with the printed circuit board 14. Preferably, the above printed circuit board (PCB) 14 is a flexible printed circuit board (FPC) 40 that is bent into the lower first body portion 40a and the upper second body portion 40b. In this case, the above flexible printed circuit board 40 has two bands of connecting portions 40c, 40d by which the lower first body portion 40a and the upper second body portion 40b are coupled with each other. Hereinafter the reason why the longer side of the housing 21 is selected as the bent portions (the connecting portions) of the FPC40 in which the upper and lower portions thereof are integrated with each other, will be explained in detail. As illustrated in FIGS. 4 and 6, FPC circuit patterns at the upper and lower sides are connected on the FPC. The signals flow from the magnetic head through the connector, via the head IC, demodulation circuit (analog) in the read/write circuit and digital processing circuit. As described above, in view of the analog circuit portion and digital circuit portion being separated between the lower side and upper side of the FPC., respectively, the signals output from the demodulation circuit and the control signals are arranged to pass through the connecting portions. As the position where these connecting portions are located, both the shorter sides and longer sides of the housing may be selected. Also as described above, the connector is attached to one of the shorter sides, while the head actuator is located in the vicinity of one of the shorter sides. Accordingly, if the upper and lower sides of the FPC are connected with each other in the shorter side, they must be connected at the side of the head actuator. Such a connecting structure is disadvantageous in that the overall path for the signals becomes longer. On the contrary, if the upper and lower sides of the FPC are connected with each other in the longer side, the above-mentioned signal flow can be realized without any difficulties in arranging circuit patterns. However, when a disk with a diameter of 4.8 cm (1.87 inches) is incorporated inside a housing of memory card size, the disk is likely to protrude outside the housing and strike the longer sides of the housing. To avoid this problem, a part of the connecting portions where the disk protrudes outside the housing is cut out. In such a construction, the connecting portions can be reasonably located at the longer side of the housing. In this case, it is advantageous that the connecting portions are separated into two parts as shown in FIG. 6, so that the elastic force that is generated in the connecting portions when the FPC is bent back, can be reduced.

As illustrated in FIG. 8, the above connecting portions 40c (40d) are located across the base 22 and cover 23. Further, when the housing 21 is in a closed condition such that the cover 23 covers over the base 22, the connecting portions 40c (40d) are curved so that they protrude inside the housing 21 as shown in FIG. 9. As apparent from FIG. 9, since the connecting portions are constructed to have excess length, it becomes possible for the base 22 and cover 23 to be arranged in plane directions and for the various components to be incorporated inside the housing 21. As the excess length of the connecting portions becomes large, the components can be incorporated more easily, while the protruding parts formed by this excess length are likely to interfere with the disk 24 and the other mounted components. To avoid this difficulty, it is proposed that these protruding parts be bent back further so that they are folded together in multiple layers. More concretely, in the condition that the base 22 and cover 23 are arranged in plane directions, such a folded structure can be realized by forcing down the center of the bridge portion of the FPC40 with a wire. In the condition that the base 22 is overlaid with the cover 23, the cover 23 adheres closely to the base 22 via a packing 41, and therefore the whole space within the housing 21 where the disk, etc., are contained is closed up tightly. In this case, to reduce the pressure difference between the inside and outside of the housing caused by the temperature rise during operation of the disk drive, an air filter for circulation is attached to the housing. In that sense, it cannot always be said that the space within the housing is perfectly closed up. However, dust in the air can be prevented from entering the housing. Therefore, the structure, in which the air filter is provided, is also usually referred to as a tightly closed structure.

Further, the connector 42 is attached to either one of two sides having shorter dimensions of the housing 21. Here, the above connector 42 is located in a position opposite to the actuator 29 across the disk 24 and is located in the approximately central position in respect to the thickness direction of the housing 21, so that mechanical support of the whole disk drive can be achieved by means of the connector 42 with good balance of weight.

The magnetic disk drive of the present invention does not incorporate a vibration-free support mechanism that is employed in general devices, but employs a mechanical support using a connector which makes a feature.

The connector which has as many as 68 pins produces a considerably large holding force but still consideration must be given to cope with the disturbance. The disturbance which is internally generated stems from (1) vibration due to the unbalanced spindle and (2) seek reaction of the actuator. Furthermore, external vibration and shocks are added thereto. Here, first, countermeasure is taken against the above two causes of internal generation.

First, vibration due to the unbalanced spindle generates while the spindle is revolving and becomes a cause of error in position. Therefore, attention is given in an effort to minimize the amount of residual imbalance, and support conditions are contrived too to reduce the effect. Generally speaking, the vibration due to imbalance is determined by a moment of the center of rotation of the spindle and the center of gravity or the distance of the fulcrum. In the present invention which accomplishes the support using the connector, therefore, the spindle is disposed on a side close to the connector and the actuator is disposed on a side remote from the connector. The moment that is generated can be decreased by about 40% compared with that of the constitution fabricated in an opposite manner, and the error in position due to the vibration of imbalance can be decreased by 40%. When completely balanced, only the moment of rotation is generated which does not change irrespective of the position of the actuator. In principle, therefore, there arises no adverse effect even when the actuator is disposed on the side remote from the connector.

To cope with the reaction of the actuator, first, the connector accomplishes the linear support; i.e., considerably rigid support is accomplished in the direction of rotation to suppress the rotary motion of the whole drive caused by the moment generated by the actuator thereby to suppress the error in position caused by the turn of the drive. The connector is disposed at the center in the thickness direction of the drive and, further, the center of gravity of the actuator is brought into this position, so that there takes place no motion due to the seek reaction (moment) in the up-and-down direction or in the twisting direction. This makes it possible to suppress error in position, fluctuation of floatation, etc. caused by the motion in the directions outside the planes.

More concretely, the connector 42 is fixed on the cover 23 of the housing 21 and is connected to the second body portion 40b of the FPC 40, on which the digital electronic components such as the IC 39a of the interface circuit 39 are assembled. Further, a part of the second body portion 40b, that is connected to the connector 42, is covered with the packing 41.

A similar construction of the above-mentioned disk drive has been disclosed in Japanese Unexamined Patent Publication (Kokai) No. 60-242568. However, in such a known construction, it is not described clearly that all the electronic components including analog and digital components are incorporated within a single housing, unlike the above first preferred embodiment.

On the contrary, the disk drive having the construction according to the present invention as illustrated in the first preferred embodiment is intended to accommodate all the electronic components, as well as the disk and various mechanical components by utilizing the spaces within a single housing effectively. Consequently, the disk drive 20 can have a single housing structure and can have a thickness dimension of approximately 5 mm which is the same as that of an IC memory card of the above-mentioned type II PCMCIA. Therefore, the disk drive 20 becomes thinner and more compact than any disk drive according to a prior art, and it can be more easily used for a portable computer than the prior art disk drive.

Furthermore, since the connecting portions 40c, 40d are previously formed in the above-mentioned FPC 40, it becomes unnecessary to provide a connector component for connecting two body portions 40a, 40b to each other. Owing to the above advantage, the disk drive 20 can have an even thinner dimension as desired for a suitable and portable memory device.

As described above, the construction of the disk drive in the first preferred embodiment has also the following features.

First, an analog circuit portion for processing analog signals and a digital circuit portion for processing digital signals are separated from each other at the lower side and upper side of the housing, respectively.

Second, a substrate of the disk, that is generally made of metal including aluminum, is located between the above two separated circuit portions; namely, the disk substrate has a function of electromagnetically shielding the above two circuit portions from each other.

In such a construction, it becomes possible for analog signals in the analog circuit portion to be prevented from suffering negative influence due to electromagnetic waves generated by the digital circuit portion. In other words, the disk drive in the first preferred embodiment has a structure in which a counter measure against various electric noises cab be taken without increasing the thickness dimension of the disk drive. In this case, it will be also possible in the future for the thickness of the disk drive to be reduced to 3.3 mm which is the same as that of the type I PCMCIA IC memory card.

Further, since the structure of such a disk drive is resistant to electric noises, a disk drive operative at a lower power supply voltage can be realized and power consumption in the disk drive can be reduced.

Figure 10:
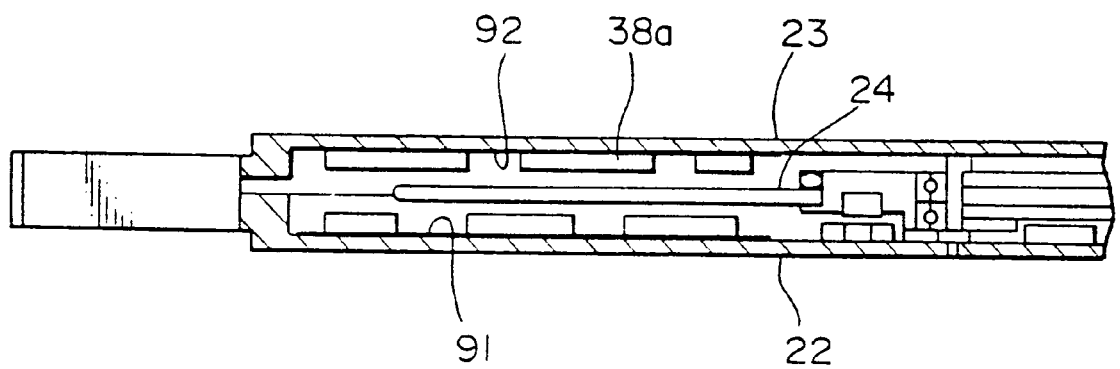
FIG. 10 is a view showing a second preferred embodiment of a disk drive structure according to the present invention.

FIG. 10 is a view showing a second preferred embodiment of a disk drive structure according to the present invention. To be more specific, FIG. 10 is a sectional front view showing the main part of a disk drive relating to the second preferred embodiment of the present invention. From now on, any component that is the same as a component mentioned before will be referred to using the same reference number.

In the second preferred embodiment shown in FIG. 10, metal based printed circuit boards 91, 92 are utilized instead of the flexible printed circuit board 40 in the first preferred embodiment described above. As illustrated in FIG. 10, both of a base 22 and a cover 23 are made of metal including iron, and on the respective inner wall surfaces of the base 22 and cover 23, the metal based printed circuit boards 91, 92 are directly formed, respectively. Further, ICs 35a–39b (in FIG. 10, only IC 38a is shown) are directly assembled on the metal based printed circuit boards 91, 92.

According to the second preferred embodiment, it is unnecessary for the printed circuit board to be adhered to the inner wall surfaces of the base 22 and cover 23. Therefore, the above second preferred embodiment has an advantage in that the sequences for assembling electronic components become simpler than the assembling sequences in the first preferred embodiment.

Figure 11A:
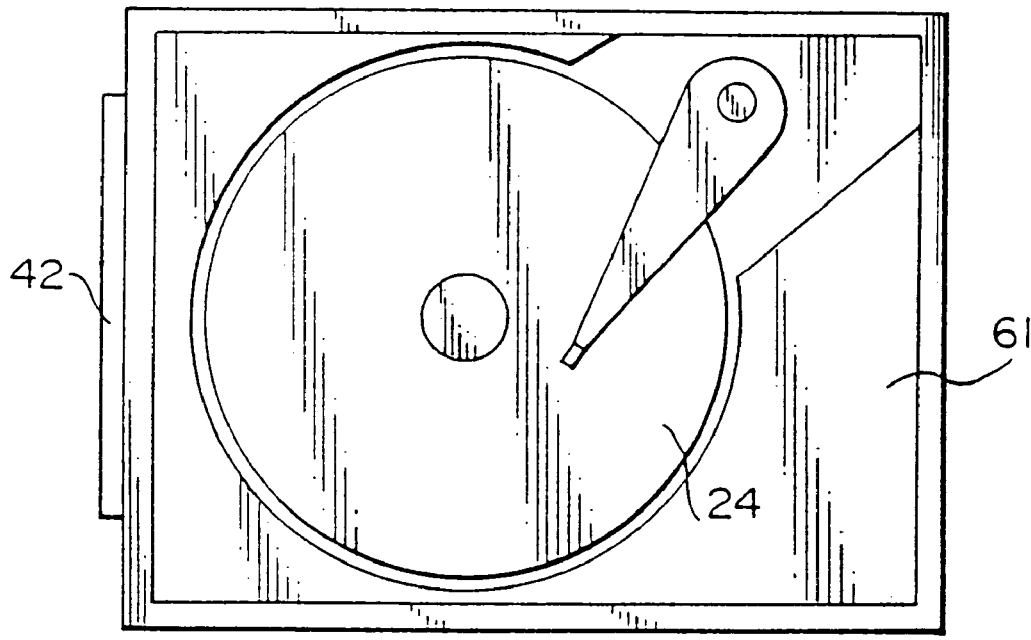
FIGS. 11(A) and 11(B) is a view showing a third preferred embodiment of a disk drive structure according to the present invention.
Figure 11B:
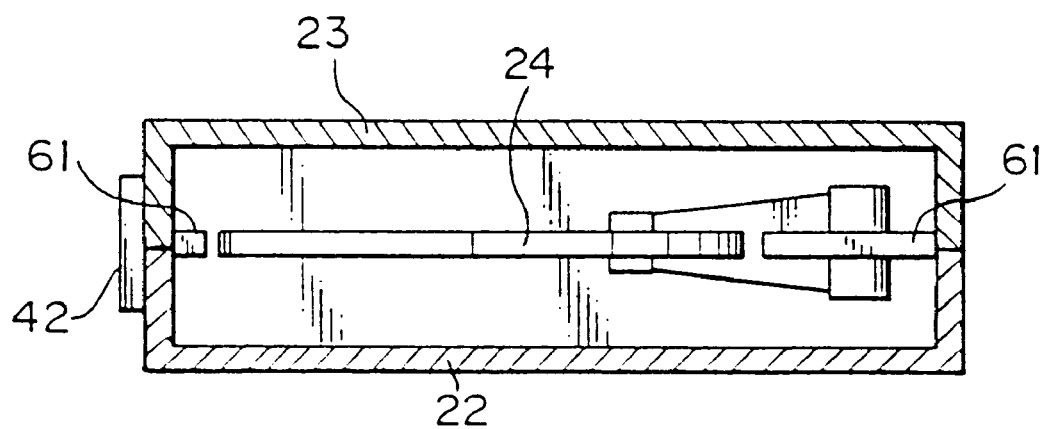

FIG. 11 is a view showing a third preferred embodiment of a disk drive structure according to the present invention. To be more specific, (A) of FIG. 11 is a simplified top view and (B) of FIG. 11 is a simplified front view, showing the characteristics of the third preferred embodiment.

As illustrated in (A) and (B) of FIG. 11, a supplementary shielding sheet 61 is provided in a form such that a surrounding region outside the disk 24 and inside the base 22 and cover 23 is covered with the above supplementary shielding sheet 61. In this construction, the lower analog circuit portion and the upper other digital circuit portion within the housing 21 as in FIG. 7 can be separated electromagnetically from each other. The third preferred embodiment as shown in FIG. 11 can be effectively applied in a case where the whole region where the analog and digital circuit portions within the housing 21 are located cannot be completely covered with the disk 24 alone.

Figure 12A:
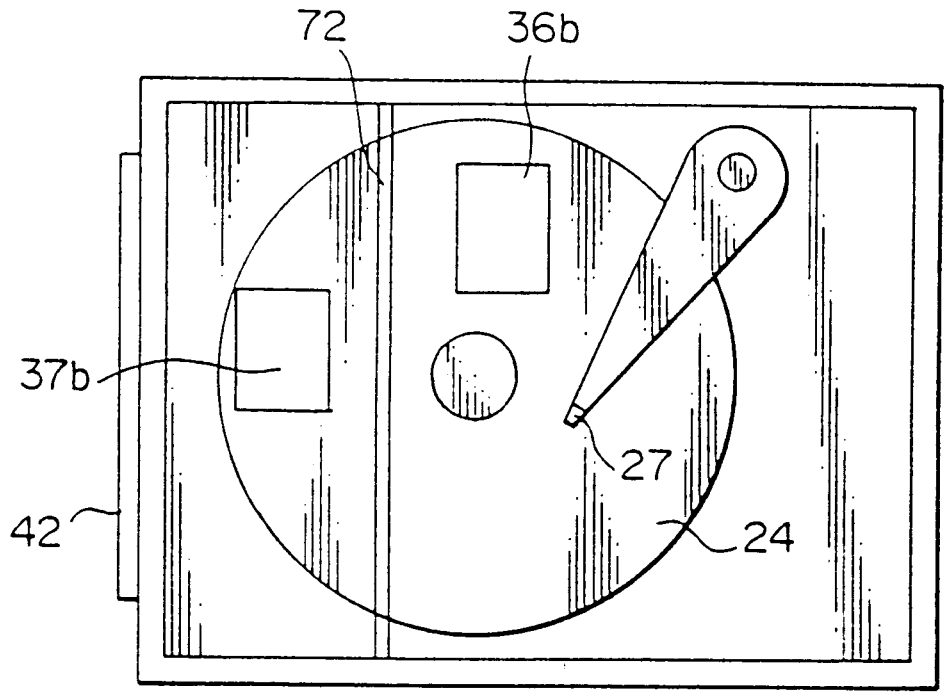
FIGS. 12(A) and 12(B) is a view showing a fourth preferred embodiment of a disk drive structure according to the present invention.
Figure 12B:
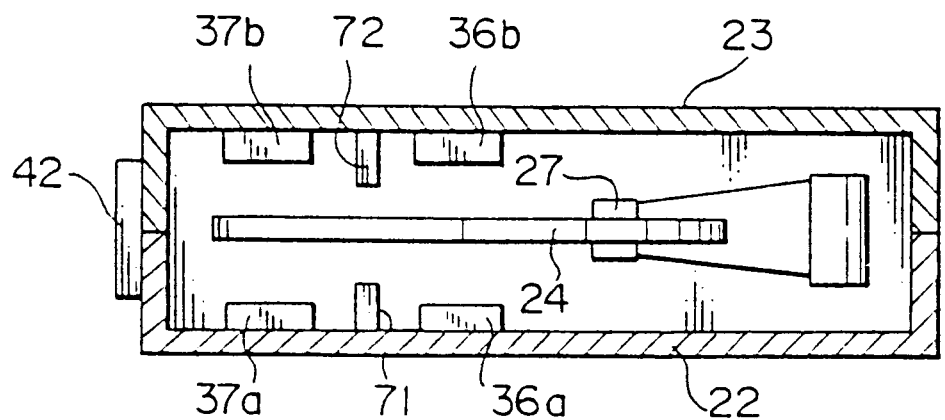

FIG. 12 is a view showing a fourth preferred embodiment of a disk drive structure according to the present invention. To be more specific, (A) of FIG. 12 is a simplified top view and (B) of FIG. 12 is a simplified front view, showing the characteristics of the fourth preferred embodiment.

As illustrated in (A) and (B) of FIG. 12, first and second shielding walls 71, 72 each having the form of a rib are formed inside the base 22 and cover 23, respectively. The first shielding wall 71 at the side of the base 22 is located between the IC 36a and IC 37a. This first shielding wall 71 serves to prevent a reproducing/recording circuit block and a positioning circuit block, both analog circuit portions, from interfering with each other. Further, the second shielding wall 72 at the side of the cover 23 is located between the IC 36b and IC 37b. This second shielding wall 72 serves to prevent a reproducing/recording circuit block and a positioning circuit block, both digital circuit portions, from interfering with each other, similar to the first shielding wall 71. In other words, the above first and second shielding walls 71, 72 are constructed such that the analog circuit portion and the digital circuit portion are partitioned among individual function blocks, respectively. In such a construction, it can be ensured that electromagnetic shielding is performed more efficiently than the shielding in the third preferred embodiment shown in FIG. 11.

Figure 13A:
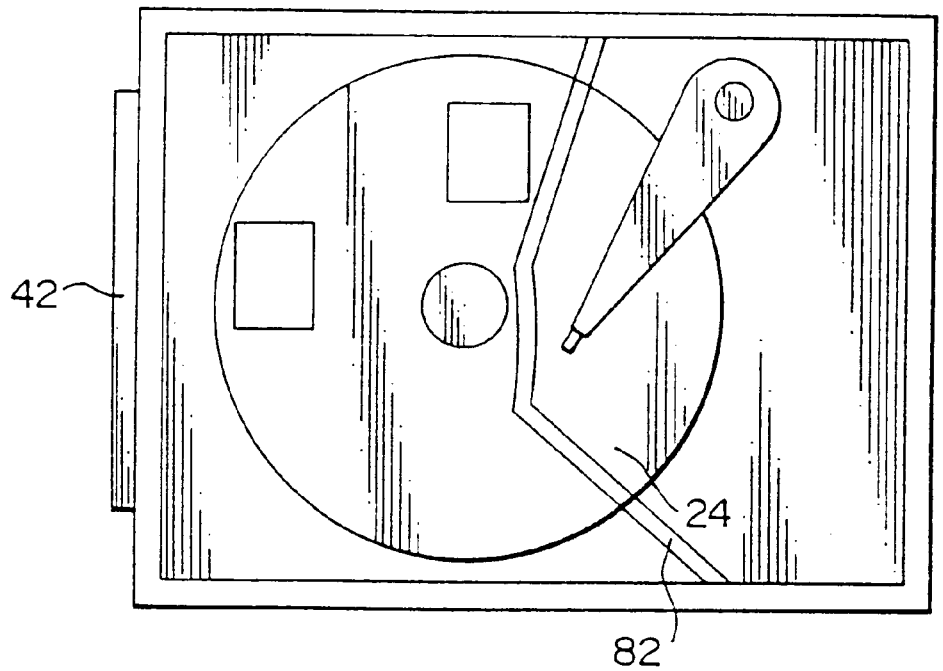
FIGS. 13(A) and 13(B) is a view showing a fifth preferred embodiment of a disk drive structure according to the present invention.
Figure 13B:
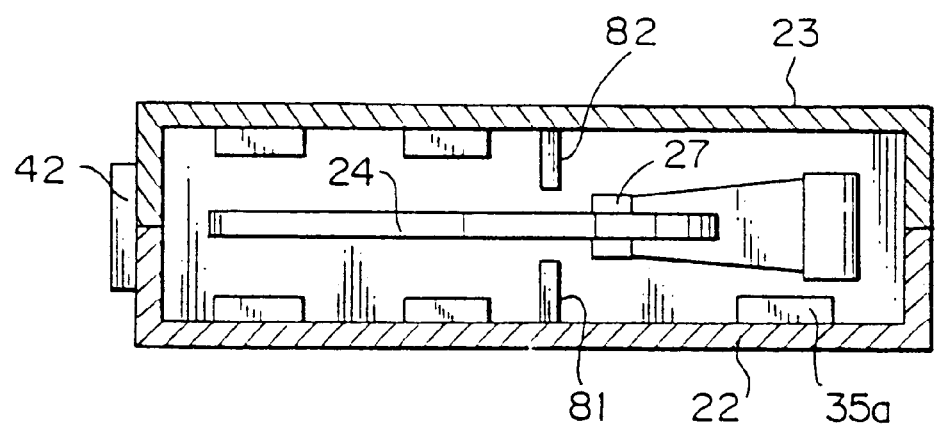

FIG. 13 is a view showing a fifth preferred embodiment of a disk drive structure according to the present invention. To be more specific, (A) of FIG. 13 is a simplified top view and (B) of FIG. 13 is a simplified front view, showing the characteristics of the fifth preferred embodiment.

As illustrated in (A) and (B) of FIG. 13, first shielding wall parts 81 and second shielding wall parts 82 each having the form of a rib protrude toward the disk 24 inside the base 22 and cover 23, respectively. More concretely, the first and second shielding wall parts 81, 82 are formed along the boundary of a region within which the magnetic head 27 moves. In such a construction, the magnetic disk 27 and the IC 35a constituting the first stage amplifying circuit, that are most likely to suffer influence due to various electric noises, can be protected from electromagnetic waves generated by the other circuit portions.

Figure 14:
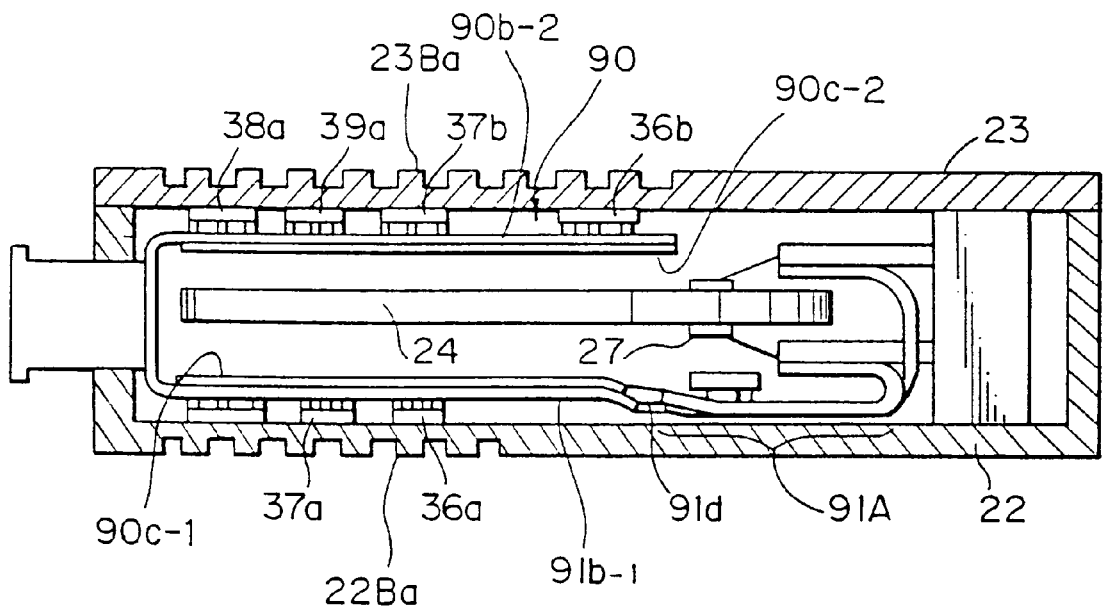
FIG. 14 is a view showing a sixth preferred embodiment of a disk drive structure according to the present invention.

FIG. 14 is a view showing a sixth preferred embodiment of a disk drive structure according to the present invention. To be more specific, FIG. 14 is a sectional front view showing the main part of a disk drive relating to the sixth preferred embodiment of the present invention.

In FIG. 14, the flexible printed circuit board 90 is preferably used as a printed circuit board 14 (FIG. 6). This flexible printed circuit board 90 has a double structure in which circuit patterns 90b-1, 90b-2 are formed on one surface of a film substrate 90a, while overall earth patterns 90c-1, 90c-2 are formed on the other surface of the film substrate 90a excluding bent portions thereof. Further, the above flexible printed circuit board 90 is provided along the inner wall of the housing 21. In this case, the circuit patterns 90b-1, 90b-2 face the inner wall surfaces of the bases 22 and cover 23, respectively, while the overall earth patterns 90c-1, 90c-2 face the lower and upper surfaces of the disk 24, respectively.

Further, in FIG. 14, ICs 36a, 37a are assembled on the circuit patterns 90b-1 of the flexible printed circuit board 90, and are adhered closely to the inner wall of the base 22. On the other hand, Ics 36b, 37b, 38a and 39a are assembled on the circuit patterns 90b-2 of the flexible printed circuit board 90, and are adhered closely to the inner wall of the cover 23. On the surface of the base 22 and cover 23, heat radiating fins 22Ba, 23Ba are formed. Respectively, by virtue of the above heat radiating fins 22Ba, 23Ba, the heat generated by the ICs 36a–39a can be effectively radiated through the base 22 and cover 23 to the outside of the housing 21.

Here, it is assumed that electromagnetic waves are generated from the circuit pattern 90b-2 dealing with digital signals and are directed toward the other circuit pattern 90b-1 dealing with analog signals. In the construction of the sixth preferred embodiment, the above circuit pattern 90b-1 can be effectively shielded from the electromagnetic waves by means of the overall earth patterns 90c-1, 90c-2, as well as the disk 24.

Further, a portion 90A of the flexible printed circuit board 90, that is placed near the magnetic head 27, represents the portion on which an IC 35a is assembled. In respect to the portion 90A, the circuit pattern 90b-1 is formed on the surface opposite to the surface of the other portion of circuit pattern 90b-1 by utilizing through holes 90d. Consequently, the IC 35a can be located in the vicinity of the magnetic head 27. In such a construction, the electrical path from the magnetic head 27 through the IC 35a becomes shorter, and therefore the reproducing signals (read signals) are less apt to suffer influence due to external disturbances, such as electrical noises.

Figure 15:
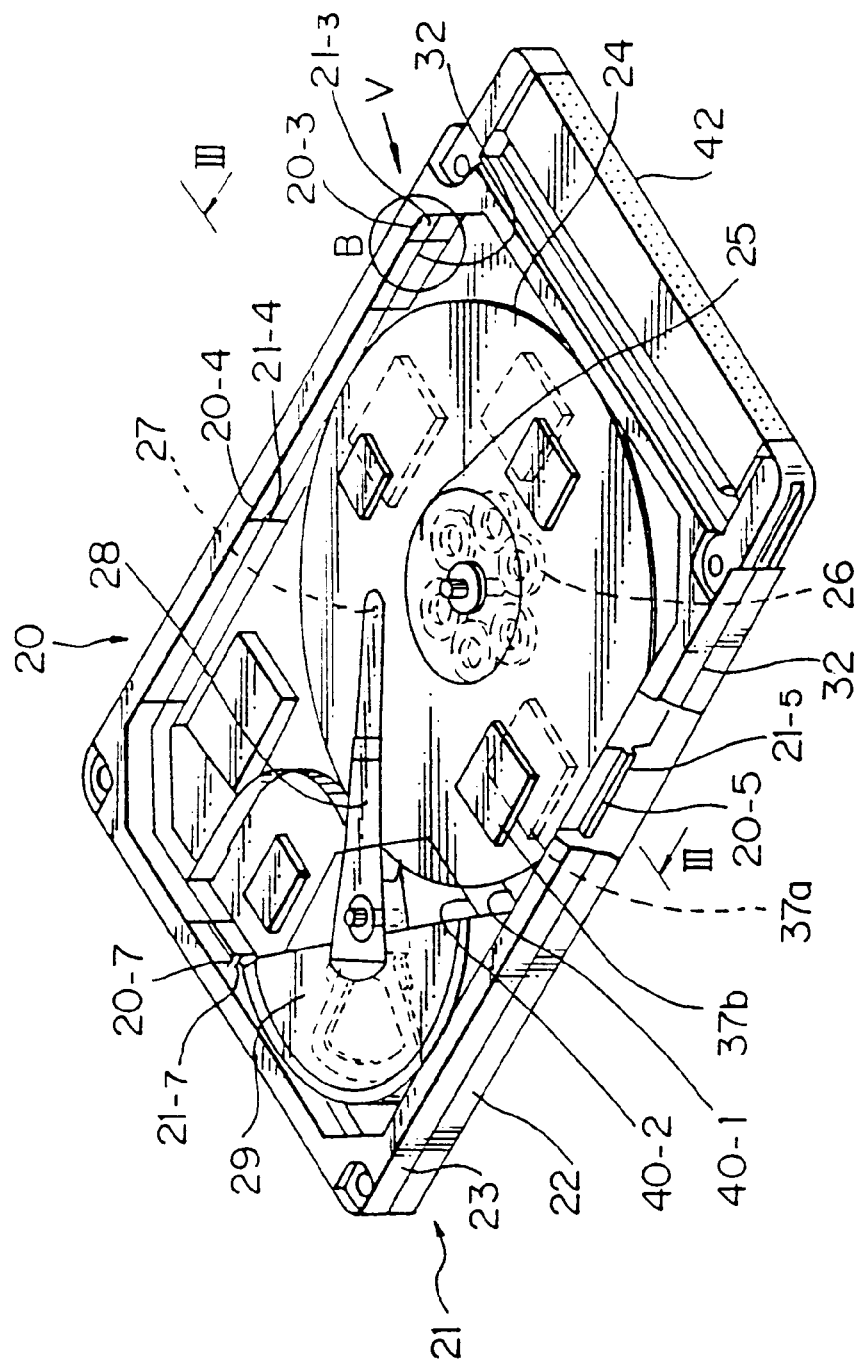
FIGS. 15, 16, 17, 18 and 19 are views showing a seventh preferred embodiment of a disk drive structure according to the present invention.
Figure 16:
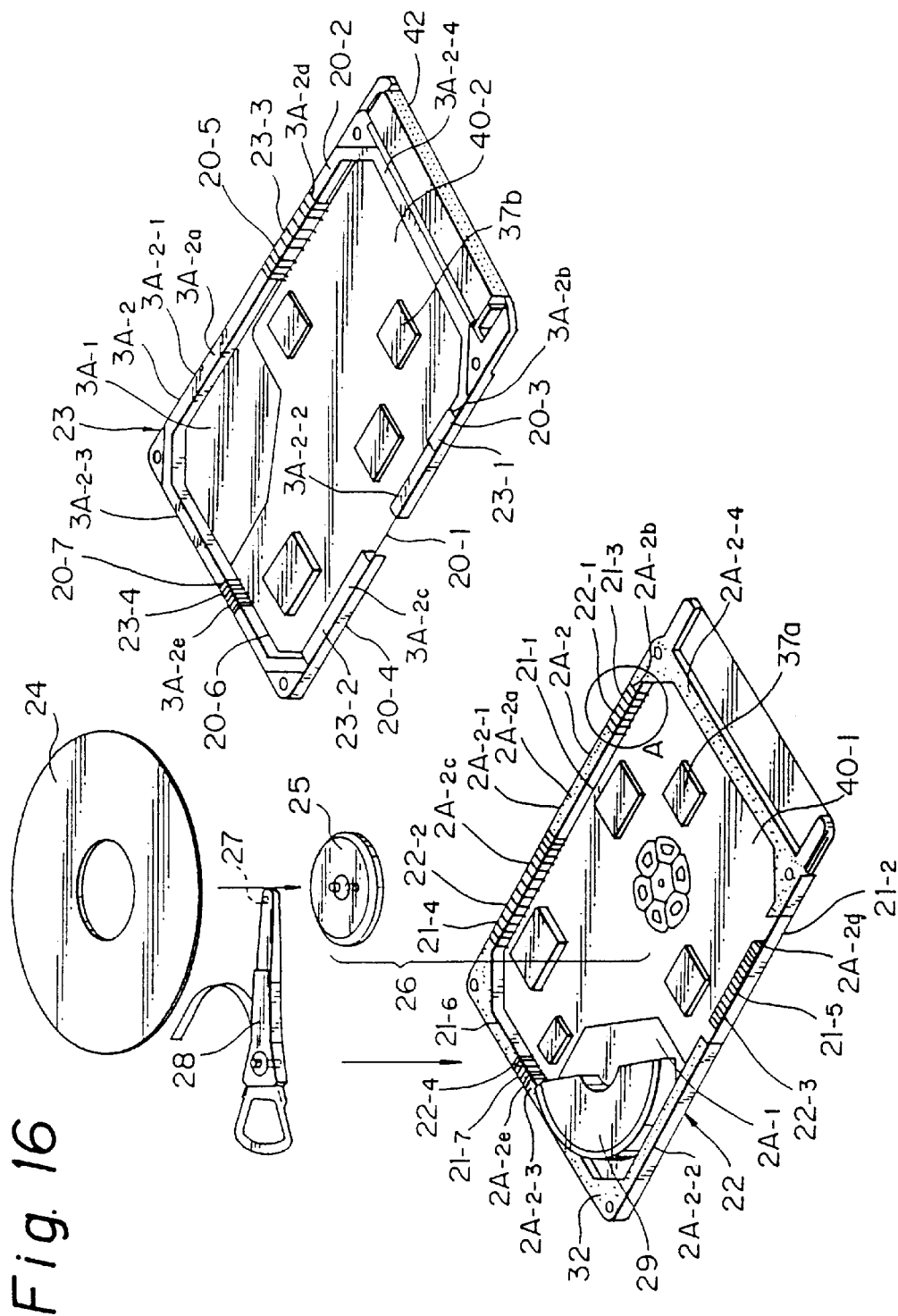
Figure 17:
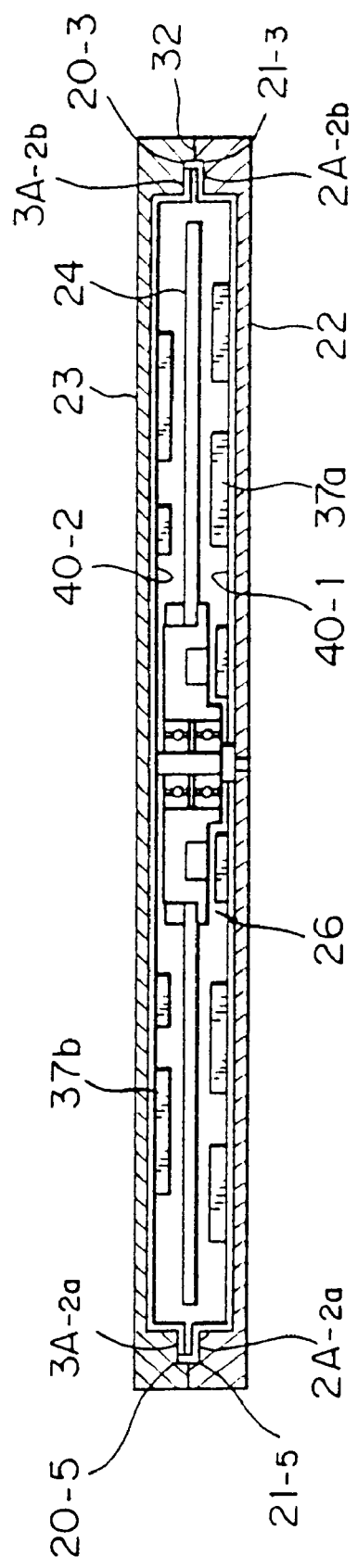
Figure 18:
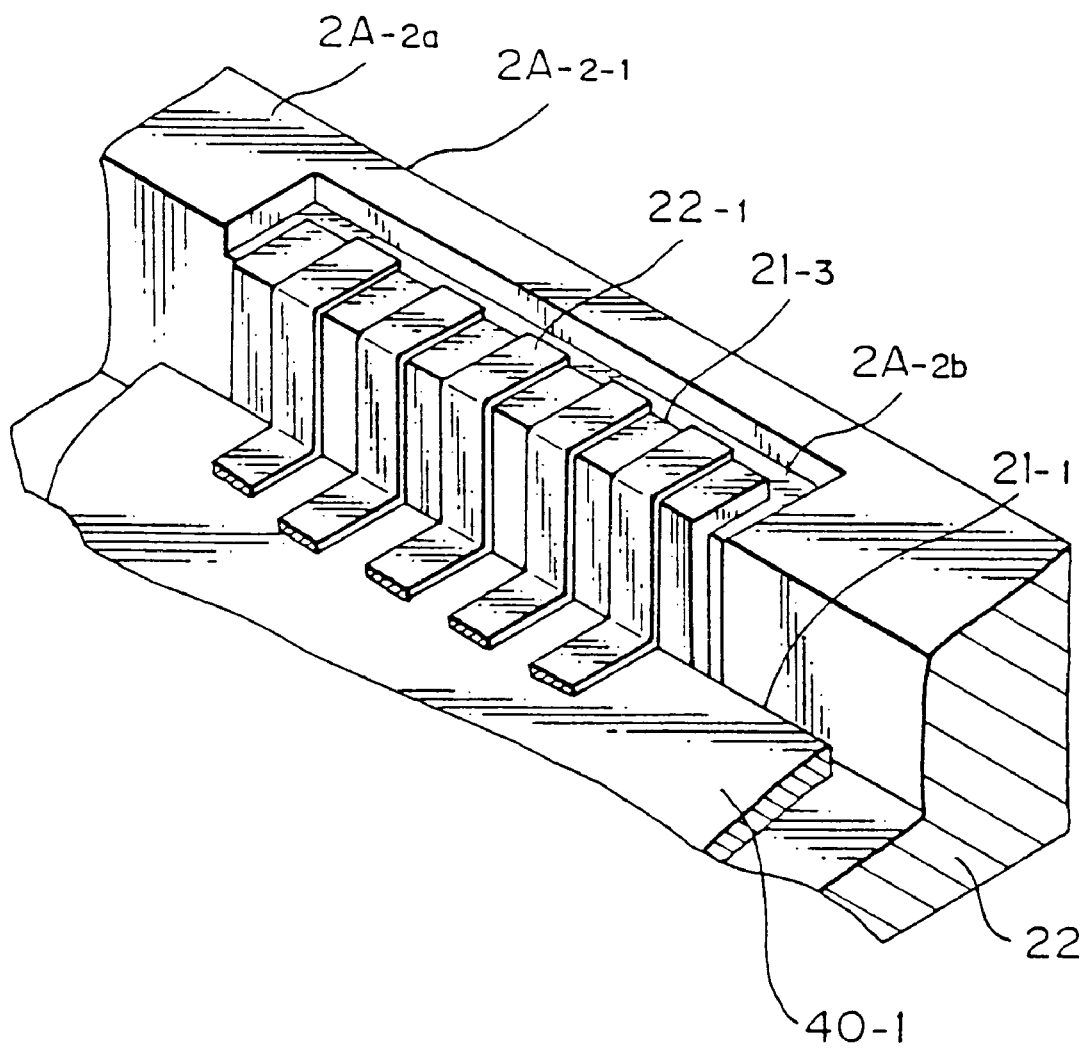
Figure 19:
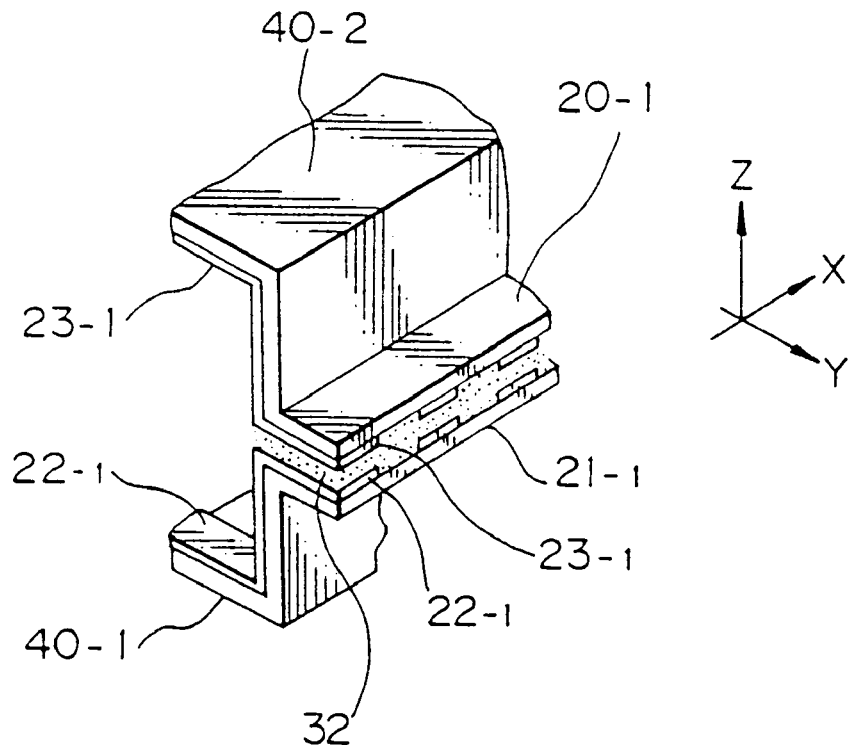

FIGS. 15, 16, 17, 18 and 19 are views showing a seventh preferred embodiment of a disk drive structure according to the present invention. To be more specific, FIG. 15 is a perspective view showing the inside of a magnetic disk drive; FIG. 16 is an exploded perspective view showing the construction of FIG. 15 in more detail; FIG. 17 is a sectional view taken along a line III—III of FIG. 15; FIG. 18 is an enlarged perspective view showing a portion of FIG. 16 enclosed within a circle A; and FIG. 19 is an enlarged perspective view in which a portion of FIG. 15 enclosed within a circle B is see from the side shown by an arrow V.

In these figure, 40-1 denotes a first printed circuit board element preferably made of a flexible printed circuit board on which an IC 37a, etc., is assembled. The above first printed circuit board element 40-1 is placed on the inner wall surface 2A-1 of a base 22 made of metal, adhering to the above inner wall surface 2A-1 thereof. In this case, the reference numerals of ICs other than IC 37a and IC 37b (referred to hereinafter) are omitted to simplify the explanation of FIGS. 15 to 19.

Further, the first printed circuit board element 40-1 has two tongue portions 21-3, 21-4 that are projected outward one side 21-1 of a pair of two longer sides 21-1, 21-2 positioned along the longer direction of the above first printed circuit board element 40-1, and has a portion 21-5 that is projected outward from the other side 21-2 thereof. Furthermore, this first printed circuit board element 40-1 has a tongue portion 21-7 that is projected outward from one shorter side 21-6 of the above first printed circuit board element 40-1. On the tongue portions 21-3, 21-4, 21-5 and 21-7, a plurality of terminals 22-1, 22-2, 22-3 and 22-4 are formed, respectively.

The base 22 includes a rib-shaped first fringe portion 2A-2 having a rectangular frame form over the whole circumference of the above base 22. Further, the above first fringe portion 2A-2 comprises a pair of longer sides 2A-2-1, 2A-2-2 and a pair of shorter sides 2A-2-3, 2A-2-4. Preferably, the upper surface 2A-2a of this fringe portion 2A-2 has a flat face.

Further, as illustrated enlarged in FIG. 18 shallow recessed parts 2A-2b, 2A-2c and 2A-2d are formed in the predetermined positions of the longer sides 2A-2-1, 2A-2-2 on the upper flat surface 2A-2a of the fringe portion 2A-2, while another shallow recessed part 2A-2e is formed in the predetermined positions of one shorter side 2A-2-3 thereon.

Also in FIG. 18, the above tongue portions 21-3, 21-4, 21-5 and 21-7 are constructed to rise up once along the first fringe portion 2A-2 and further to be bent outward from the first fringe portion 2A-2. Furthermore, the tongue portions 21-3, 21-4, 21-5 and 21-7 are projected on the longer sides 2A-2-1, 2A-2-2, and the shorter side 2A-2-3 and finally are contained in the shallow recessed parts 2A-2b, 2A-2c, 2A-2d and 2A-2e. The terminals 22-1–22-4, i.e., a first group of terminals, are located so that they are exposed on the upper surface 2A-2a of the first fringe portion 2A-2.

Further, in FIGS. 15 to 19, 40-2 denotes a second printed circuit board element preferably made of a flexible printed circuit board on which an IC 37b, etc., is assembled, similar to the second printed circuit board element 40-1. The above second printed circuit board element 40-2 is placed on the inner wall surface 3A-1 of a cover 23 made of metal, and adhered to the above inner wall surface 3A-1 thereof.

Furthermore, the second printed circuit board element 40-2 has two tongue portions 20-3, 20-4 that are projected outward from one side 25-1 of a pair of two longer sides 20-1, 20-2 positioned along the longer direction of the above second printed circuit board element 40-1, and has a portion 20-5 that is projected outward from the other side 20-2 thereof. Furthermore, this second printed circuit board element 40-2 has a tongue portion 20-7 that is projected outward from one shorter side 20-6 of the above second printed circuit board element 40-2. On the tongue portions 20-3, 20-4, 20-5, and 20-7, a plurality of terminals 23-1, 23-2, 23-3 and 23-4 are formed, respectively.

The cover 23 includes a rib-shaped second fringe portion 3A-2 having a rectangular frame form over the whole circumference of the above cover 23. Further, the above second fringe portion 3A-2 comprises a pair of longer sides 3A-2-1, 3A-2-2 and a pair of shorter sides 3A-2-3, 3A-2-4. Preferably, the upper surface 3A-2a of this fringe portion 3A-2 has a flat face.

Further, similar to the construction relating to the first fringe portion 2A-2 described above, shallow recessed parts 3A-2b, 3A-2c and 3A-2d are formed at predetermined positions of the longer sides 3A-2-1, 3A-2-2 on the upper flat surface 3A-2a of the fringe portion 3A-2, while another shallow recessed part 3A-2e is formed at a predetermined position of one shorter side 3A-2-3 thereon.

The above tongue portions 20-3, 20-4, 20-5 and 20-7 are constructed to rise up once along the second fringe portion 3A-2 and further to be bent outward from the second fringe portion 3A-2. Furthermore, these tongue portions 20-3, 20-4, 20-5 and 20-7 are projected on the longer sides 3A-2-1, 3A-2-2 and the shorter side 3A-2-3 and finally are contained in the shallow recessed parts 3A-2b, 3A-2c, 3A-2d and 3A-2e. The terminals 23-1–23-4, i.e., a second group of terminals are located such that they are exposed on the upper surface 3A-2a of the second fringe portion 3A-2.

Further, in this construction, a fixed shaft 25 of a spindle, a magnetic disk 24, at least one magnetic head 27, at least one arm 28, an actuator 29 and the like are assembled inside the base 22, and then the cover 23 is arranged in a predetermined position on the base 22 in such a manner that the base 22 is covered with the cover 23. Furthermore, the upper surface 2A-2a of the first fringe portion 2A-2 and the upper surface 3A-2b of the first fringe portion 3A-2 are fixed together over the whole circumference by utilizing an anisotropic conductive adhesive 32.

In the condition that the cover 23 is combined with the base 22 as described above, the second tongue portions 20-3, 20-4, 20-5 and 20-7 in the cover 23 face the first tongue portions 21-3, 21-4, 21-5 and 21-7 in the base 22, respectively, and the second group of terminals 23-1–23-4 face the first group of terminals 22-1–22-4, respectively. Consequently, as illustrated in FIG. 17, the above second tongue portions 20-3, 20-4, 20-5 and 20-7 are arranged so as to be contained in the shallow recessed parts 2A-2b, 2A-2c, 2A-2c and 2A-2d of the base 22, respectively, while the above first tongue portions 21-3, 21-4, 21-5 and 21-7 are arranged to be contained in the shallow recessed parts 3A-2b, 3A-2c, 3A-2c and 3A-2d of the cover 23, respectively. In such an arrangement, the second tongue portions 20-3, 20-4, 20-5 and 20-7 and first tongue portions 21-3, 21-4, 21-5 and 21-7 are firmly fastened together by means of the anisotropic conductive adhesive 32. Here, all the tongue portions 20-3, 20-4, 20-5, 20-7, 21-3, 21-4, 21-5 and 21-7 can be held in the respectively corresponding shallow recessed parts 2A-2b, 3A-3b, etc., and therefore the above tongue portions 20-3, 21-3, etc., have no disadvantageous influence on the respective adhering surfaces of the cover 23 and base 22. Therefore, the first and second fringe portions 2A-2, 3A-2 can be adhered to each other in such a manner that the first fringe portion 2A-2 is substantially perfectly glued to the second fringe portion 3A-2 over the whole circumference thereof.

Further, as illustrated in FIG. 19, the anisotropic conductive adhesive 32 has electrically conductive characteristics in respect to the direction of the Z-axis, i.e., in the direction where this anisotropic conductive adhesive 32 is pressed between two tongue portions, while it does not have any electrically conductive characteristics in respect to the direction of the X-axis and Y-axis. Consequently, the terminal 23-1 of the cover 23 and the corresponding terminal 22-1 of the base 22 can be electrically connected to each other. Further, electrical connections can be performed between the other terminals 23-2, 23-3 and 23-4 of the cover 23 and the respectively corresponding terminals 22-2, 22-3 and 22-4 of the base 22 in a similar manner.

In the seventh preferred embodiment described above, the whole circumference of the fringe portions 2A-2, 3A-2 are coated with the anisotropic conductive adhesive 32. However, alternatively, it is possible for only the respective tongue portions in the base 22 and cover 23 to be coated with the anisotropic conductive adhesive 32, or it is also possible for the fringe portions 2A-2, 3A-2 and the tongue portions to be partially coated with the anisotropic conductive adhesive 32.

In this case, since the printed circuit board is separated into two different elements respectively corresponding to the base 22 and cover 23, the above base 22 and cover 23 can be treated independently. Therefore, the seventh preferred embodiment has an advantage in that the process for assembling the magnetic disk 24, the spindle 25, the magnetic head 27 and the like inside the housing 21 becomes relatively simple. Further, since all the tongue portions are held in respectively corresponding shallow recessed parts, the base 22 and cover 23 can be fixed together closely by means of the anisotropic conductive adhesive 32 over the whole circumference. Therefore, the seventh preferred embodiment has another advantage in that a sufficiently closed condition within the housing 21 can be ensured.

Figure 20:
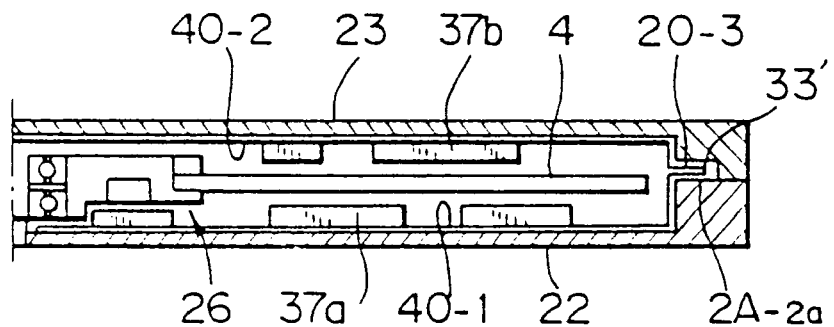
FIG. 20 is a view showing one example of a change in the enclosure part of tongue portions in the seventh preferred embodiment as in FIG. 17.

FIG. 20 is a view showing one example of a change in the enclosure part of tongue portions in the seventh preferred embodiment as illustrated in FIG. 17. In FIG. 20, the structure inside the housing 21 is illustrated more briefly to simplify the explanation.

As shown in FIG. 20, at least one concave stepped part 33' is provided as the enclosure part of tongue portions only at the side of the cover 23, unlike the construction of FIG. 17. Further, in FIG. 20, the respective tongue portions 21-1, 20-1 in the base 22 and cover 23 are contained in a space between the above recessed stepped part 33 and the upper surface 2A-2a of the fringe portion 2A-2 of base 22, in a condition such that the respective tongue portions 21-1, 20-1 in the base 22 and cover 23 overlap each other.

Figure 21:
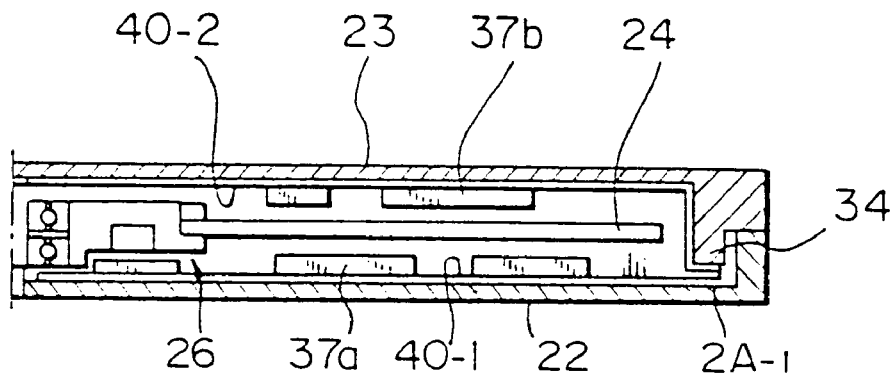
FIG. 21 is a view showing another example of a change in the enclosure part of tongue portions in the seventh preferred embodiment as in FIG. 17.

FIG. 21 is a view showing another example of a change in the enclosure part of tongue portions in the seventh preferred embodiment as in FIG. 17. Also in FIG. 21, similar to FIG. 20, the structure inside the housing 21 is illustrated more briefly to simplify the explanation.

As shown in FIG. 21, at least one convex part 34 is provided as the enclosure part of tongue portions in the fringe portion 3A-2 of the cover 23, unlike the construction of FIG. 17. Further, in FIG. 20, the respective tongue portions 21-1, 20-1 of the base 22 and cover 23 are contained in a space between the above convex part 34 and the inner wall surface 2A-1 of the base 22, in a condition such that the respective tongue portions 21-1, 20-5 of the base 22 and cover 23 overlap each other.

Figure 22:
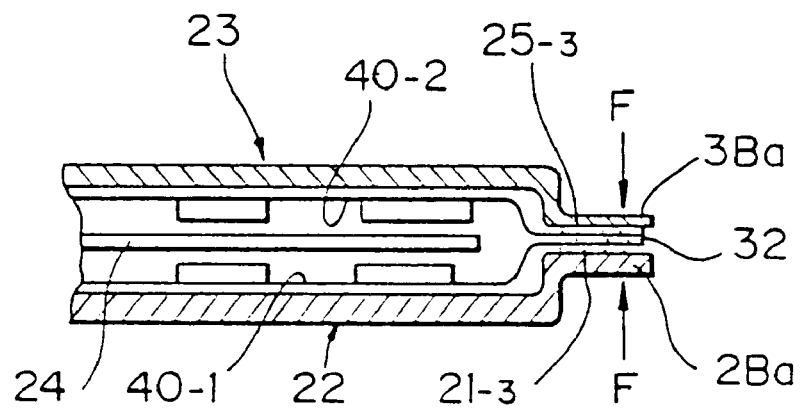
FIG. 22 is a view showing an eighth preferred embodiment of a disk drive structure according to the present invention.

FIG. 22 is a view showing an eighth preferred embodiment of a disk drive structure according to the present invention. In FIG. 22, the main part of the structure inside the housing 21 is illustrated.

As shown in FIG. 22, the base 22 and cover 23, that are made by press forming a metal plate, have flange portions 2Ba, 3Ba in the circumferences of the above base 22 and cover 23, respectively. Further, in FIG. 22, the respective tongue portions 21-3, 20-3 of the flexible printed circuit board elements 40-1, 40-2 are coated with the anisotropic conductive adhesive 32 and are held between the above two flange portions 2Ba, 3Ba. Finally, the base 22 and cover 23 are fixed together by applying a pressure F on the flange portions 2Ba, 3Ba and adhering them to each other.

Figure 23:
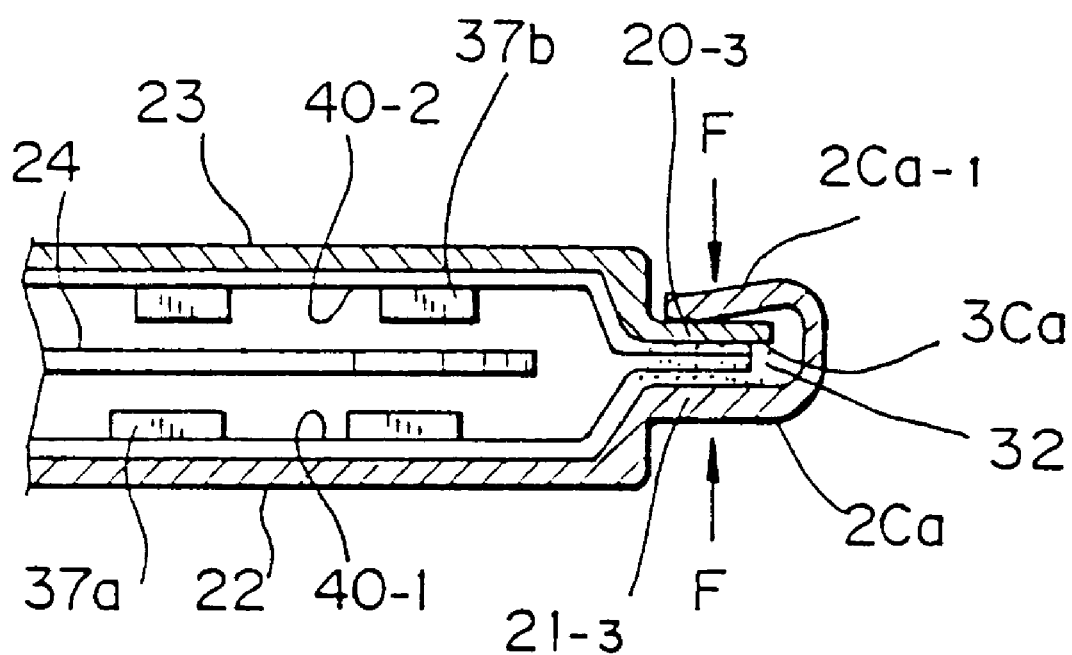
FIG. 23 is a view showing a ninth preferred embodiment of a disk drive structure according to the present invention.

FIG. 23 is a view showing a ninth preferred embodiment of a disk drive structure according to the present invention. Also in FIG. 23, similar to FIG. 22, the main part of the structure inside the housing 21 is illustrated.

As shown in FIG. 22, the base 22 and cover 23, that are made by press forming a metal plate, have other flange portions 2Ca, 3Ca in the circumferences of the above base 22 and cover 23, respectively. Here, the dimension of the overhang of one flange portion 2Ca is twice as long as that of the overhang of the other flange portion 3Ca. First, the respective tongue portions 21-3, 20-3 of the flexible printed circuit board elements 40-1, 40-2 are coated with the anisotropic conductive adhesive 32 and are held between the above two flange portions 2Ca, 3Ca. Next, the former flange portion 2Ca is folded back in such a manner that it covers the latter flange portion 3Ca, and a bent portion 2Ca-1 is formed at the upper side of the flange portion 3Ca as illustrated in FIG. 23. Finally, the base 22 and cover 23 are adhered together by applying a pressure F to the flange portion 2Ca and the bent portion 2Ca-1 and by fitting the inner flange portion 3Ca into the outer flange portion 2Ca. In this construction, fitting and adhering of the flange portions are simultaneously performed, so the electronic components such IC 37a, 37b can be tightly enclosed in the housing 21 with higher reliability.

Figure 24:
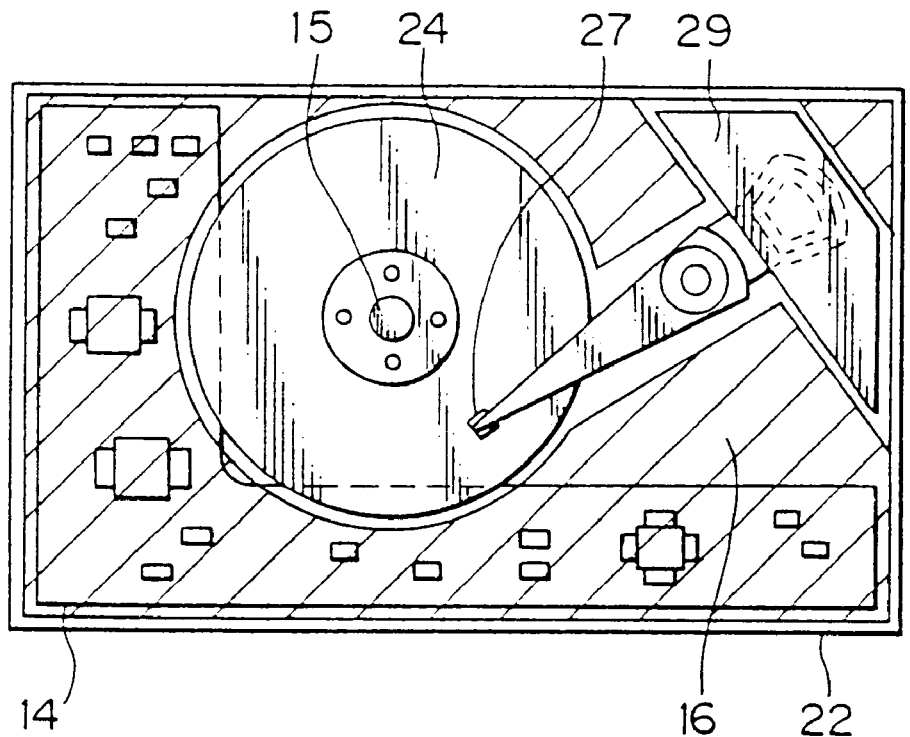
FIGS. 24 and 25 are views showing a tenth preferred embodiment of a disk drive structure according to the present invention.
Figure 25:
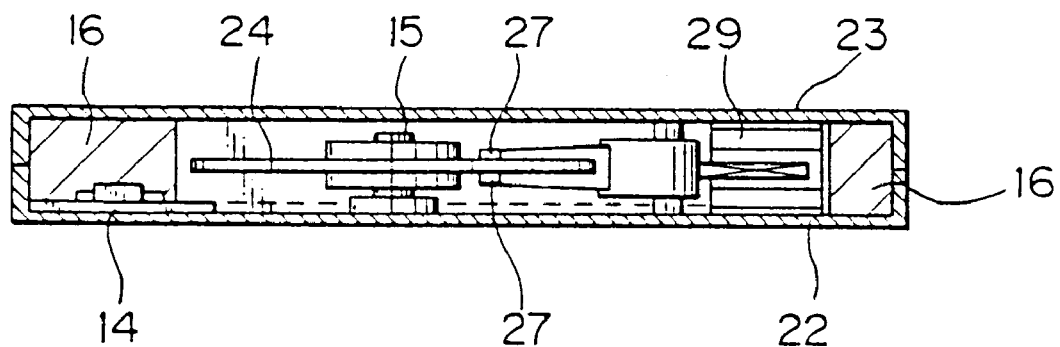

FIGS. 24 and 25 are views showing a tenth preferred embodiment of a disk drive structure according to the present invention. To be more specific, FIG. 24 is a schematic flat view showing the whole disk drive structure and FIG. 25 is a schematic sectional front view showing the structure inside the housing.

In these figures, similar to all the other previous embodiments, one magnetic disk 24 preferably having a diameter of 48 mm or 1.89 inches, a disk driving means 15, a head assembly that includes magnetic heads 27, an actuator 29, etc., electronic circuitry and a printed circuit board 14 such as a flexible printed circuit board are contained in a closed space within a single housing 21, which is constituted by a base 22 and cover 23 and has the same dimensions as the outer dimensions of the type II PCMCIA IC memory card. In FIGS. 24 and 25, the connector 42 is omitted.

Further, in the remaining space within the housing 21 other than a movable space where the magnetic disk 24, the disk driving means 15, the head assembly and the other enclosed components as described above can be moved, a filler 16 having a form corresponding to the concavity and convexity of the remaining space is placed in the remaining space. Preferably, the above filler 16 is made of a resin material, such as polycarbonate resin or epoxy resin.

In this construction, the unoccupied space can be reduced to the minimum dimensions required. Therefore, the deformation of the housing 21, that may occur by applying various external forces thereto, can be easily prevented, and disadvantageous vibrations of the enclosed components within the housing 21 can be also avoided.

Figure 26:
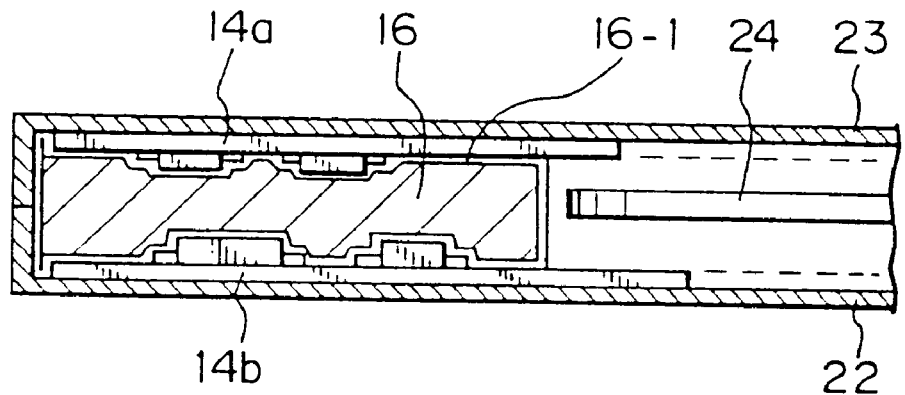
FIG. 26 is a view showing an eleventh preferred embodiment of a disk drive structure according to the present invention.

FIG. 26 is a sectional view showing an eleventh preferred embodiment of a disk drive structure according to the present invention. In FIG. 26, only the main part of the structure inside the housing 21 relating to the characteristics of the eleventh preferred embodiment is illustrated.

The construction of the above eleventh preferred embodiment is similar to that of the tenth preferred embodiment described before. However, the construction of the eleventh embodiment is different from that of the tenth embodiment in the following points:

first, the printed circuit board 14 is divided into a lower printed circuit board part 14a and an upper printed circuit board part 14b, that are composed of flexible printed circuit board material or thinly-made printed circuit board material and that are laid separate from each other on the inner wall surfaces of the base 22 and cover 23, respectively; and, second, a magnetic material 16-1, that is fabricated by mixing an adhesive made of resin with a magnetic powder such as Mn-Zn ferrite, is coated on the outer peripheral surface of the above-mentioned filler 16.

Also in the construction of the eleventh preferred embodiment, similar to that of the tenth preferred embodiment, the deformation of the housing 21 can be firmly prevented by virtue of the filler 16. Here, both of the printed circuit board parts 14a, 14b are usually located in proximity to the magnetic head, and therefore electromagnetic noises are likely to leak from these printed circuit board parts 14a, 14b. Consequently, such electromagnetic noises are superimposed on reproducing/recording signals (read/write signals) and the signal-to-noise (S/N) ratio may be deteriorated. However, in the construction of the eleventh preferred embodiment, since the magnetic material 16-1 serves to electromagnetically shield the electromagnetic noises, deterioration of the signal-to-noise (S/N) ratio can be avoided.

Figure 27:
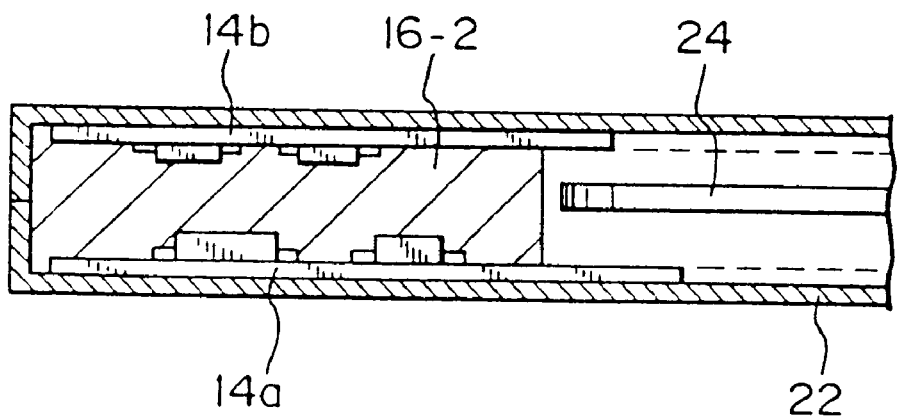
FIG. 27 is a view showing a twelfth preferred embodiment of a disk drive structure according to the present invention.

FIG. 27 is a sectional view showing a twelfth preferred embodiment of a disk drive structure according to the present invention. Also in FIG. 27, only the main part of the structure inside the housing 21 relating to the characteristics of the twelfth preferred embodiment is illustrated.

The construction of the above twelfth preferred embodiment is similar to that of the tenth and eleventh preferred embodiments described before. However, the construction of the twelfth embodiment is different from that of the other embodiments in that a conductive filler 16-2, which is formed by forcing a conductive material to be included in an insulating filler, such as polycarbonate resin or epoxy resin, is placed in the above-mentioned space in the housing 21.

Also in the construction of the twelfth preferred embodiment, similar to that of the eleventh preferred embodiment, the deformation of the housing 21 can be firmly prevented by virtue of the conductive filler 16-2. Further, in the construction of the twelfth preferred embodiment, since the conductive filler 16-2 also serves to electromagnetically shield from electromagnetic noises, deterioration of the signal-to-noise (S/N) ratio can be avoided, similar to the eleventh preferred embodiment.

Figure 28:
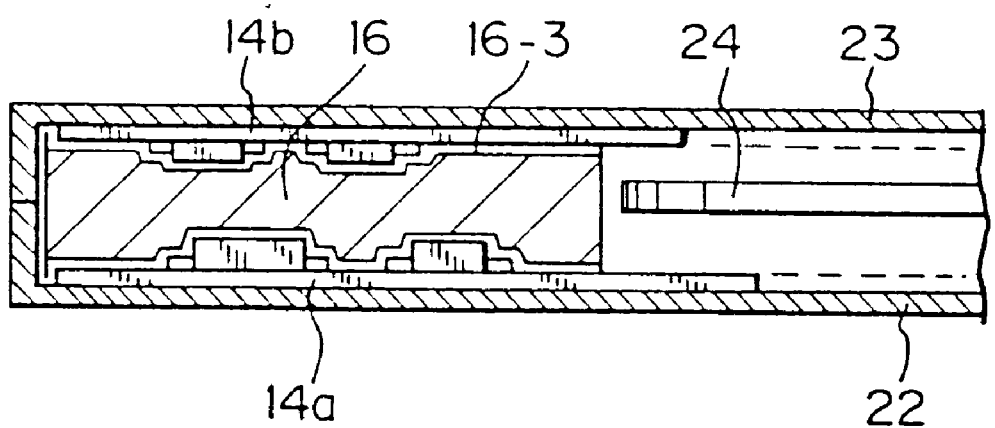
FIG. 28 is a view showing a thirteenth preferred embodiment of a disk drive structure according to the present invention.

FIG. 28 is a sectional view showing a thirteenth preferred embodiment of a disk drive structure according to the present invention. Also in FIG. 28, the main part of the structure inside the housing 21 is illustrated.

In FIG. 28, an elastic adhering film 16-3 composed of an elastic adhesive including rubber, etc., is coated on the outermost peripheral surface of the filler 16. Further, the filler 16 enclosed with an elastic adhering film 16-3 is placed in the above-mentioned space in the housing 21. In this construction, the above filler 16 fits snugly with the base 22, cover 23 and each of the enclosed components within the housing 21 by virtue the elastic adhering film 16-3. Therefore, the thirteenth preferred embodiment has an advantage that the vibrations of the above filler 16, which are likely to be generated during operation of the disk drive, can be surely prevented.

Figure 29:
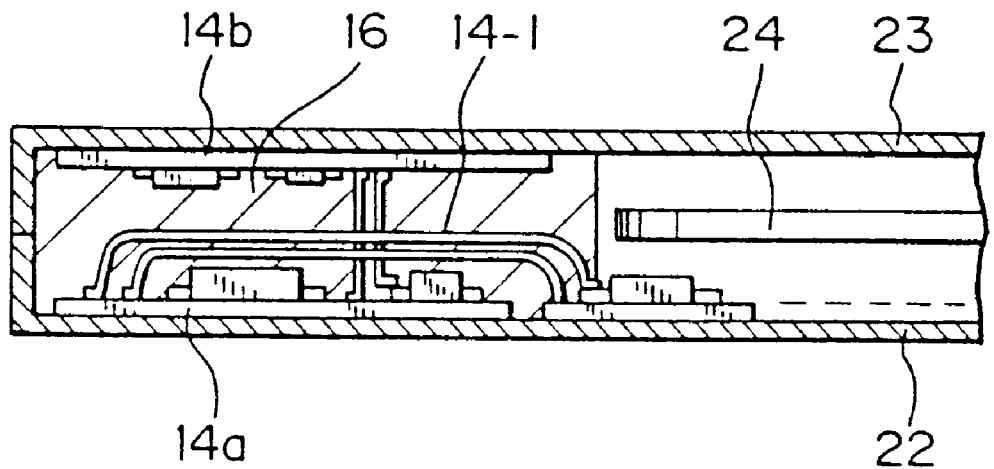
FIG. 29 is a view showing a fourteenth preferred embodiment of a disk drive structure according to the present invention.

FIG. 29 is a sectional view showing a fourteenth preferred embodiment of a disk drive structure according to the present invention. Also in FIG. 29, the main part of the structure inside the housing 21 is illustrated.

In FIG. 29, at least one signaling lead wire 14-1 is embedded in a filler 16, corresponding to the predetermined positions of the lower and upper printed circuit board parts 14a, 14b as described in FIG. 26. Further, the above filler 16 is placed in the above-mentioned space, similar to the thirteenth preferred embodiment, etc. In this construction, similar to the tenth preferred embodiment as illustrated in FIG. 25, the deformation of the housing 21, that may occur by applying various external forces thereto, can be easily prevented. Moreover, the wiring connection further necessitated in the lower printed circuit board part 14a or in the upper printed circuit board part 14b individually and the wiring connection between the lower and upper printed circuit board parts 14a, 14b can be realized simultaneously.

Figure 30A:
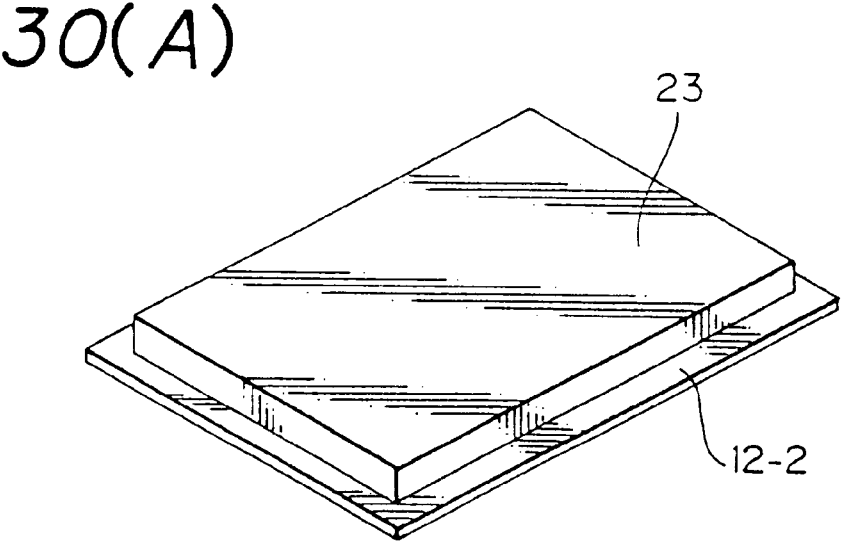
FIGS. 30(A), and 30(B), 31, 32, 33 and 34 are views showing a fifteenth preferred embodiment of a disk drive structure according to the present invention.
Figure 30B:
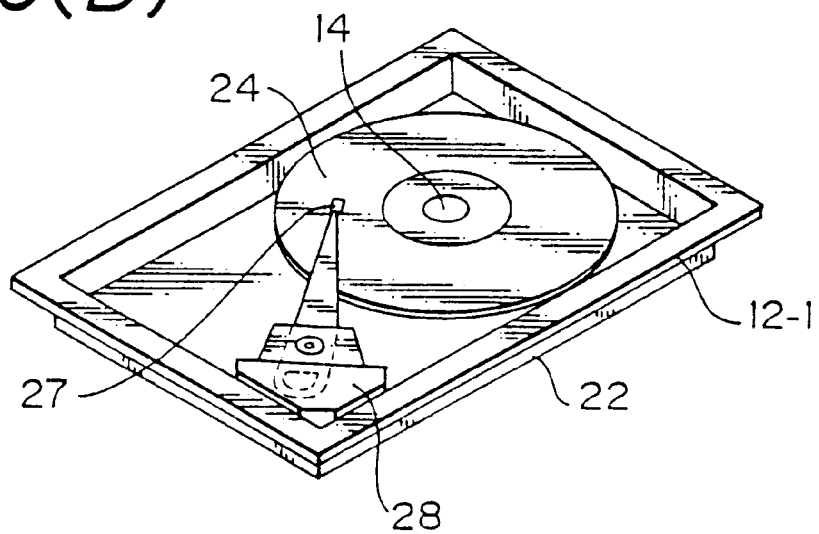
Figure 31:
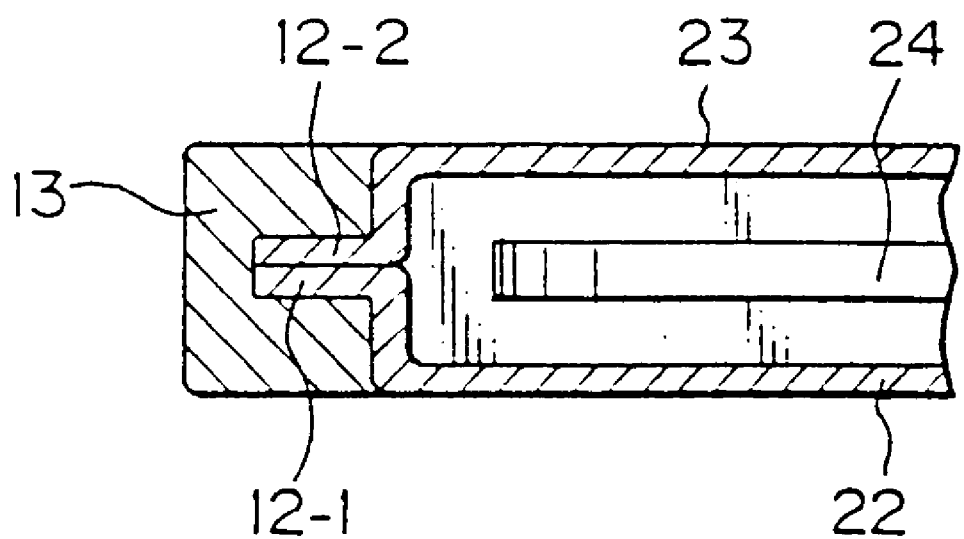
Figure 32:
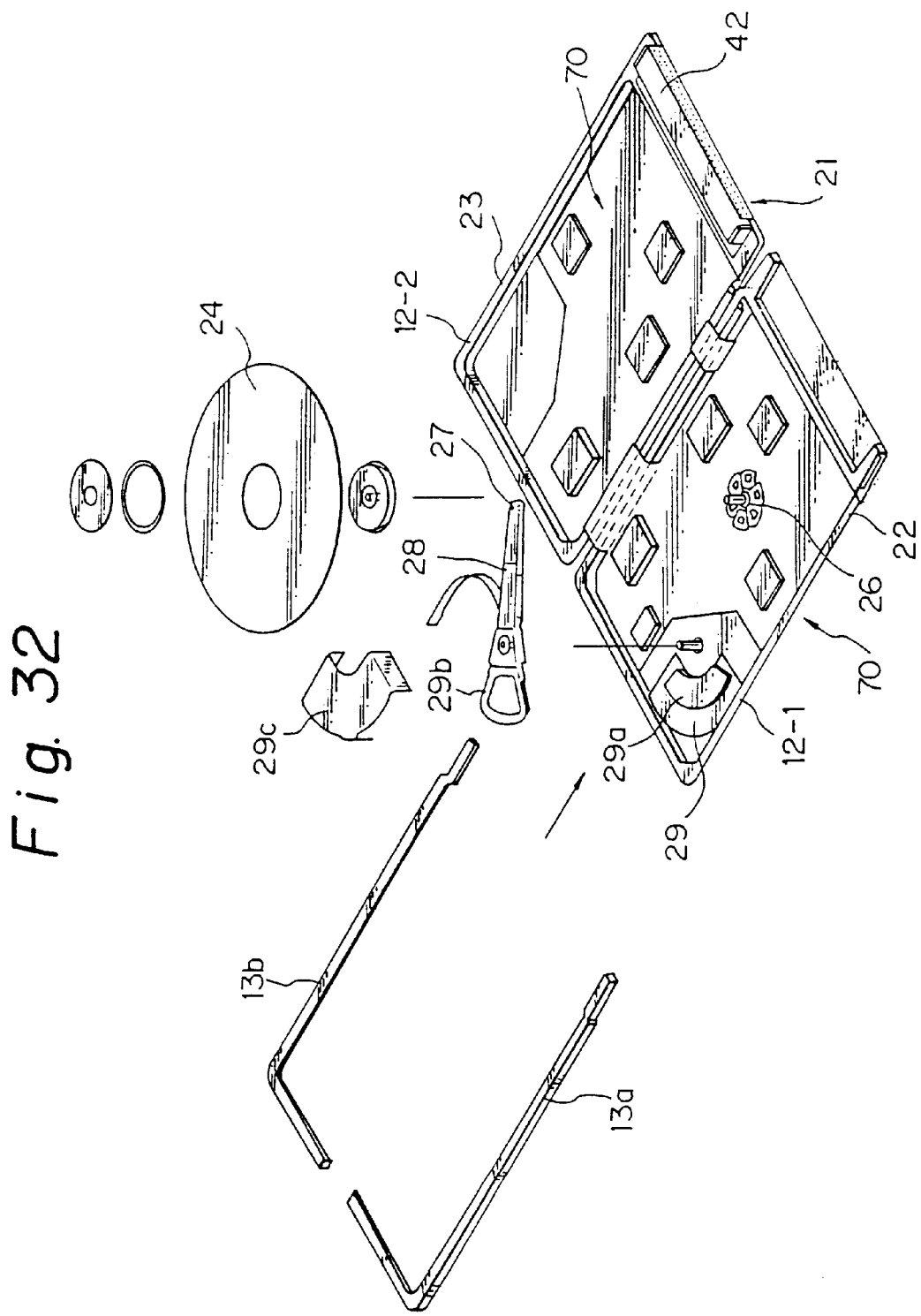
Figure 33:
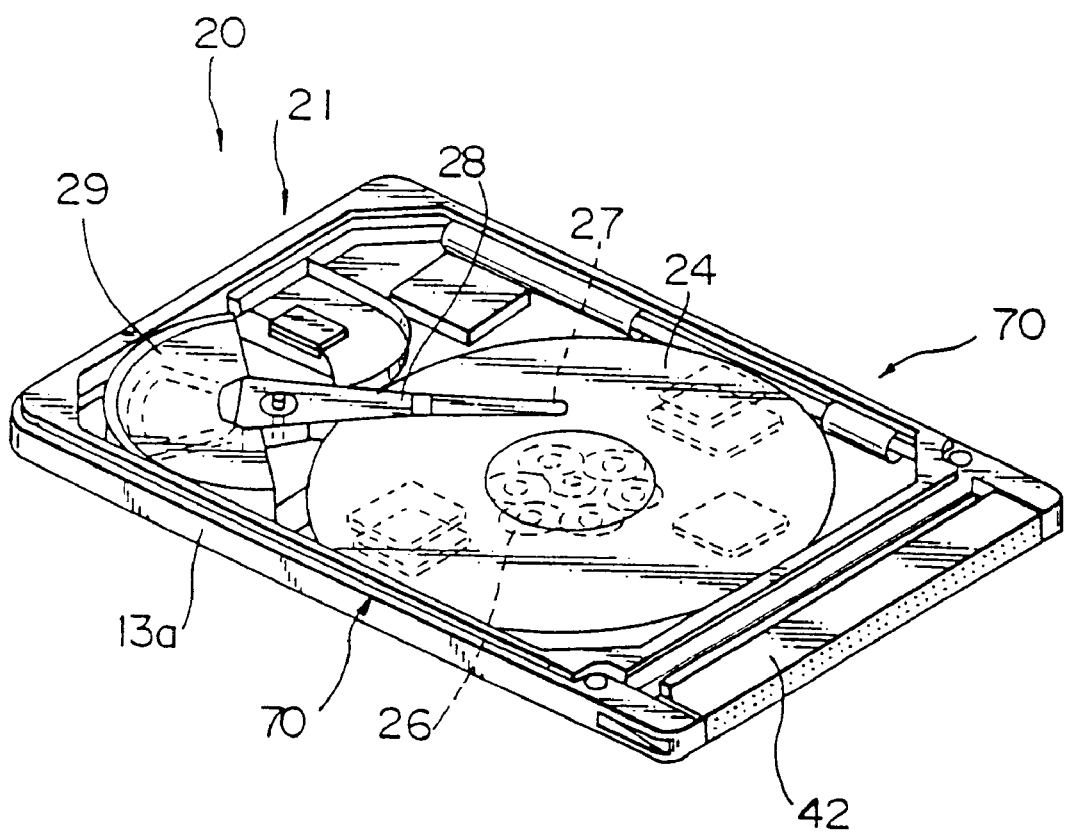
Figure 34:
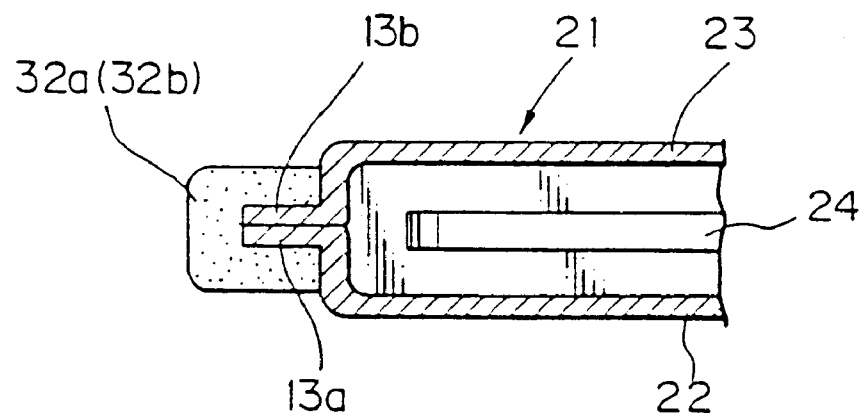

FIGS. 30, 31, 32, 33 and 34 are views showing a fifteenth preferred embodiment of a disk drive structure according to the present invention. To be more specific, FIG. 30 is a schematic exploded perspective view showing an essential construction; FIG. 31 is a schematic enlarged sectional view showing an essential construction; FIG. 32 is an exploded perspective view showing a disk drive structure in more detail; FIG. 33 is a perspective view showing the inside of a disk drive; and FIG. 34 is an enlarged sectional view showing the main part of a disk drive in more detail.

In the fifteenth preferred embodiment, as illustrated in these figures, a disk drive 20 comprises a single thin rectangular housing 21 that is constituted by a base 22 and a cover 23 and that has outer dimensions of approximately 85.6 mm×54 mm×5 mm which are the same as an IC memory card of type II of PCMCIA, similar to the other embodiments described before. More concretely, each of the above base 22 and cover 23 are fabricated by forming a metal plate with a height of 4 to 5 mm by means of drawing into a form of a vessel. Typically, a height of the base 22 is 2 mm, while a thickness of the cover 23 is 3 mm. The steel plate with the thickness of 0.4–0.5 mm is formed by means of drawing and the base 22 and cover 23 each having an opening in one side and each having a vessel form. Accordingly, if this base 22 and cover 23 are combined together, the total thickness, i.e., a thickness dimension of the rectangular housing 21, becomes 5 mm.

Figure 48A:
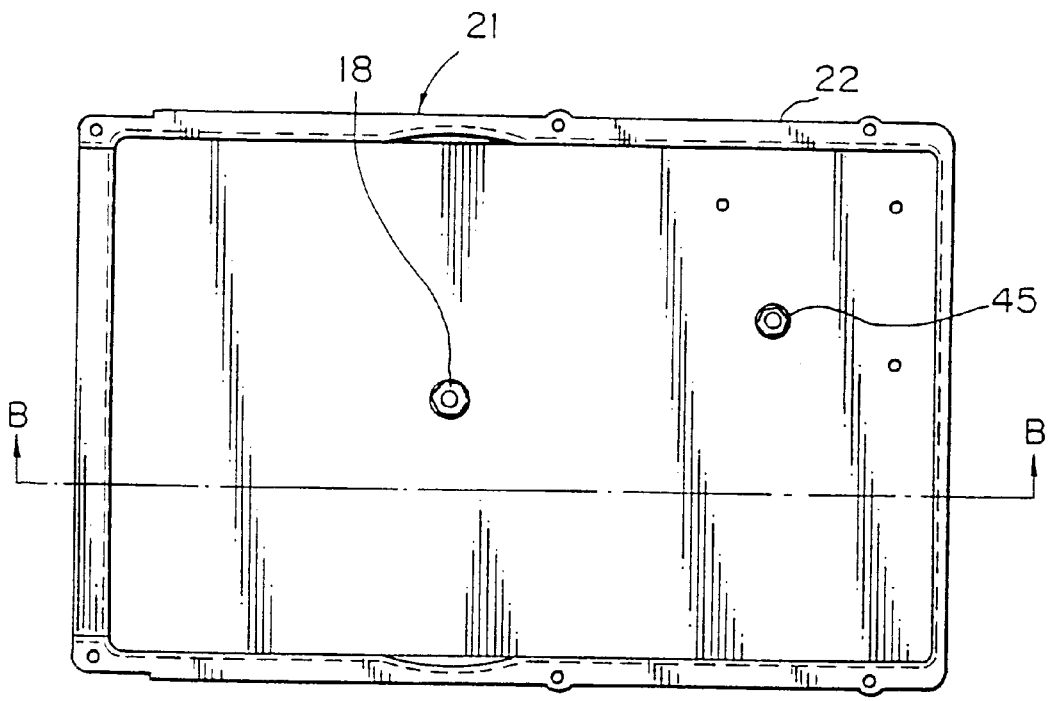
FIGS. 48(A), 48(B) and 49 are views showing a fifth preferred embodiment of a fixed shaft construction of a disk drive according to the present invention.

Hereinafter, the reason why the height of the base 22 is designed to be different from the height of the cover 23 will be explained in detail. As described above, according to the specification of type II of PCMCIA, both the longer sides of the housing serve as the insertion guide portion to the host computer, and therefore the related longer sides are limited to 3.3 mm in length. Since this portion touches with the outer peripheral of the disk having a diameter of 1.89 inch, i.e., 48 mm, it is preferable to dispose the disk at the center of the width of the housing. Further, in correspondence with the above arrangement of the disk, it is required to form a gun barrel shaped recess such as shown in FIG. 48 to each of the base and cover. Such complicated drawing reduces the area of a flange surface and also strength of both the base and the cover and coupling intensity therebetween. In order to avoid this, the height of the base is shifted with respect to that of the cover, and thus thinner one of the flange surfaces can be surely obtained. Note that it is also preferable to dispose the disk at the center of the width of the housing, since the electronic parts, mounted on the inner walls of the base and the cover, have the same maximum height at the base side and the cover side.

Further, in one of the shorter sides of the rectangular housing 21, a space for fixing a connector 42 is provided. In the other shorter side and two longer sides of the housing 21, as illustrated in FIG. 34, coupling flanges 12-1, 12-2, extend outward at the outer peripheral portion of the above base 22 and cover 23, respectively, in accordance with the characteristics of the fifteenth preferred embodiment.

The rectangular housing 21 includes at least one magnetic disk 24, a spindle motor 26, at least one magnetic head 27, at least one arm 28, an actuator 29, electronic components 70 and the like, similar to the embodiments described before, e.g., the first preferred embodiment shown in FIGS. 3 to 9. Here, the actuator 29 comprises a magnet portion 29a composed of at least one permanent magnet, a yoke portion 29c located in such a manner that it encloses the permanent magnet, and a movable coil portion 29b located inside the yoke portion 29c. In this case, the detailed explanation of the above disk drive structure other than the portion of the coupling flanges 12-1, 12-2 is omitted to clarify the characteristics of the fifteenth preferred embodiment.

As typically shown in FIG. 32, the base 22 is combined with the cover 23 by overlapping the respectively corresponding coupling flanges 12-1, 12-2 of the base 22 and cover 23 with each other. Further, the coupling flanges 12-1, 12-2 are preferably jointed and fastened together by spot welding, if both of the base 22 and cover 23 are made of metal including iron. Alternatively, hermetic sealing to some extent can be guaranteed if the seam-welding is effected in which spot welding is continuously carried out. When the base and the cover are made of a metal other than iron or a resin material, the coupling flanges are joined together by such means as wrap-seaming, screws or riveting. Metal including iron can be joined together by such means, as a matter of course. Alternatively, if both of the base 22 and cover 23 are made of metal including aluminum or made of a resin material, these coupling flanges 12-1, 12-2 are preferably jointed and fastened together by screws or rivets. Further, in the outer peripheral portion of the above jointed coupling flanges 12-1, 12-2, a frame 13 composed of a pair of L-shaped frame elements 13a, 13b is attached to force the jointed coupling flanges 12-1, 12-2 to be closed up tightly. Each of these L-shaped frame elements 13a, 13b are made of so-called engineering plastic, e.g., polyamide resin or polyphenylenesulfide resin and have a sectional form having a recess corresponding to the outer shape of the jointed coupling flanges 12-1, 12-2, as illustrated in FIG. 34. In this case, the L-shaped frame elements 13a, 13b are fixed to the jointed coupling flanges 12-1, 12-2 of the housing 21 by adhesion utilizing adhesive or by welding the frame elements 13a, 13b per se, and serve as a sealing means so that it can be ensured that the inside of the housing 21 remains in a closed condition.

In this construction, the mechanical strength and the condition of tightness of the housing 21, whose coupling flanges 12-1, 12-2 are fastened together as described above, can be improved remarkably. Further, since each of the L-shaped frame elements 13a, 13b serves as a buffer means that absorbs the mechanical shock caused by external factors such as a fall of the disk drive 20, deformation, damage or the like to the housing 21 can be prevented.

Furthermore, since the disk drive 20 is the same size as an IC memory card, it may become possible for the disk drive 20 to be compatible with the currently used IC memory cards and to be connected to an external device, e.g., a host computer. In this case, each of the L-shaped frame elements 13a, 13b serves as an insertion guide rail that guides the housing 21 of the disk drive 20 toward the host computer so that the housing 21 can be easily inserted into the host computer.

Figure 35:
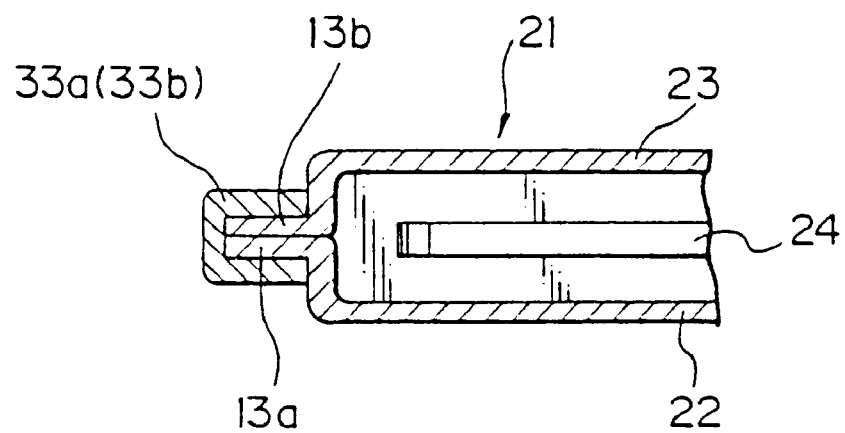
FIG. 35 is a view showing a sixteenth preferred embodiment of a disk drive structure according to the present invention.

FIG. 35 is a sectional view showing a sixteenth preferred embodiment of a disk drive structure according to the present invention. In FIG. 35, only the main part of the structure inside the housing 21 relating to the characteristics of the sixteenth preferred embodiment is illustrated.

The construction of the above sixteenth preferred embodiment is similar to that of the fifteenth preferred embodiment described before. However, the construction of the sixteenth embodiment is different from that of the other embodiments in that the frame 13 is composed of metal frame elements 33a, 33b, instead of the frame elements 13a, 13b of resin material. In this case, each of the above metal frame elements 33a, 33b is directly fitted with the jointed coupling flanges 12-1, 12-2 of the housing 21 and is finally fixed to the jointed coupling flanges 12-1, 12-2 applying predetermined pressure to the metal frame elements 33a, 33b.

In this construction, the process of adhering the frame 13 to the coupling flanges 12-1, 12-2 as in the fifteenth preferred embodiment becomes unnecessary. Therefore, the sequences for fixing the frame 13 can be more simplified as a whole and the cost of fabrication of the disk drive can be reduced.

Figure 36:
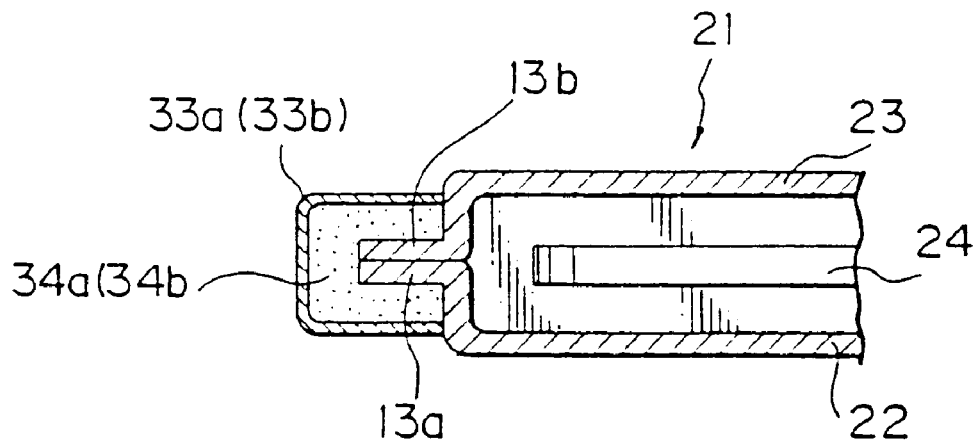
FIG. 36 is a view showing a seventeenth preferred embodiment of a disk drive structure according to the present invention.

FIG. 36 is a sectional view showing a seventeenth preferred embodiment of a disk drive structure according to the present invention. Also in FIG. 36, only the main part of the structure inside the housing 21 relating to the characteristics of the seventeenth preferred embodiment is illustrated.

The construction of the above seventeenth preferred embodiment is similar to that of the fifteenth preferred embodiment described before. However, the construction of the seventeenth embodiment is different from that of the other embodiment in that the frame 13 has a double structure such that rubber frame elements 34a, 34b each having a recess are overlaid with metal frame elements 33a, 33b, respectively. In this case, first, each of the rubber frame elements 34a, 34b is fixed to the jointed coupling flanges 12-1, 12-2 by means of an adhesive including gum, etc. Next, the metal frame elements 33a, 33b are directly fitted with the rubber frame elements 34a, 34b, respectively. Finally, the above metal frame elements 33a, 33b are firmly fixed to the rubber frame elements 34a, 34b and the coupling flanges 12-1, 12-2 by applying predetermined pressure to the metal frame elements 33a, 33b.

In the construction of the seventeenth embodiment, it is necessary for two kinds of frame elements to be fixed separately due to the double structure of the frame, and therefore the sequences of fixing the frame are more involved than those of fixing the frame in the fifteenth and sixth preferred embodiments. However, the above seventeenth embodiment has an advantage in that the degree of tightness in the jointed coupling flanges 12-1, 12-2 can become higher than the fifteenth and sixth preferred embodiments and further mechanical shock caused by a fall of the disk drive can be absorbed more effectively than the above-mentioned embodiments by virtue of the rubber frame elements 34a, 34b.

Furthermore, in this case, it is also possible for the rubber frame elements 34a, 34b and the metal frame elements 33a, 33b to be combined into a unified form in advance. In this manner, the unified form can be easily attached to the outer peripheral portion of the jointed coupling flanges 12-1, 12-2.

Figure 37:
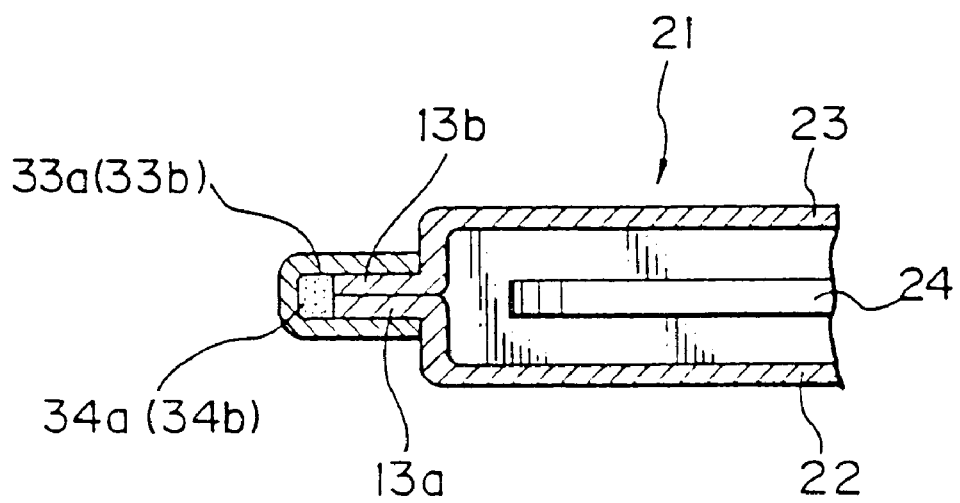
FIG. 37 is a view showing an eighteenth preferred embodiment of a disk drive structure according to the present invention.

FIG. 37 is a sectional view showing an eighteenth preferred embodiment of a disk drive structure according to the present invention. Also in FIG. 37, only the main part of the structure inside the housing 21 relating to the characteristics of the eighteenth preferred embodiment is illustrated.

The construction of the above eighteenth preferred embodiment is similar to that of the seventeenth preferred embodiment described before. However, the construction of the eighteenth embodiment is different from that of the seventeenth embodiment in that the respective recesses of the metal frame elements 33a, 33b of the former embodiment are formed to become relatively deep and that the respective bottom parts of the above metal frame elements 33a, 33b are previously filled with rubber elements 34c, 34d. In this construction, the metal frame elements 33a, 33b are fitted with the jointed coupling flanges 12-1, 12-2 and firmly fixed thereto by pressing, in a form such that the rubber elements 34c, 34d contact the outer side portion of the jointed coupling flanges 12-1, 12-2. The eighteenth embodiment has the same advantage as the seventeenth embodiment described before.

Figure 38:
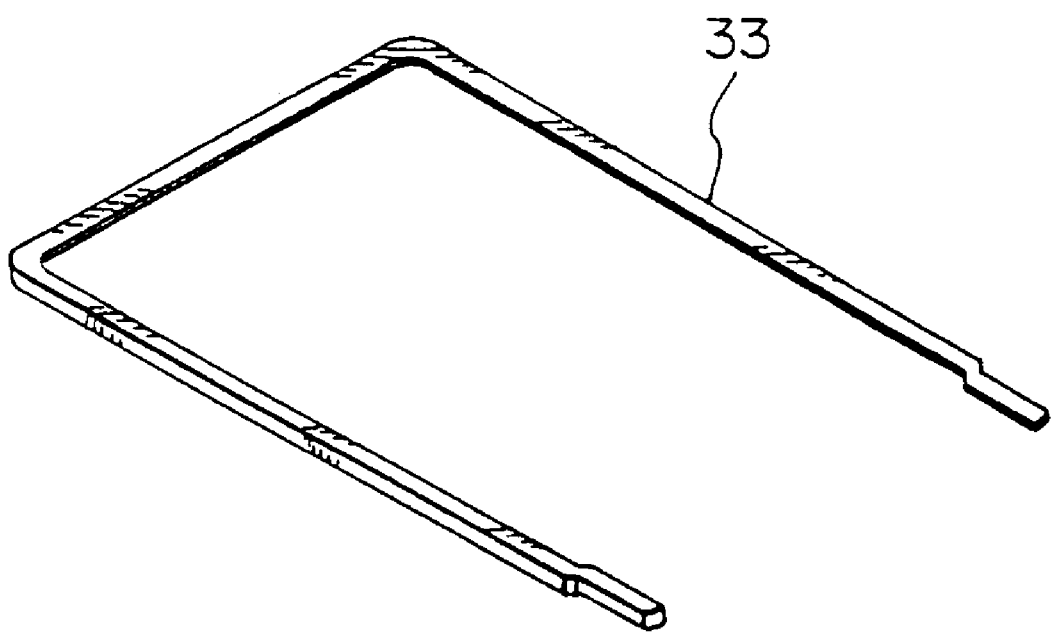
FIG. 38 is a view showing another example of a frame applied to a disk drive according to the present invention as in FIG. 32.

FIG. 38 is a view showing another example of a frame applied to a disk drive according to the present invention as illustrated in FIG. 32. In the fifteenth to eighteenth embodiments described above, examples utilizing a pair of L-shaped frame elements were illustrated in all cases. However, as shown in FIG. 38, it is also possible for a single unified U-shaped frame 33 to be utilized instead of the L-shaped frame elements. Though not diagramed, furthermore, the base and the cover may be joined together by using the frame only or by using the frame and the adhesive agent in combination without relying upon the welding, wrap-seaming, screws or riveting explained with reference to FIG. 32.

In all the embodiments relating to a disk drive structure according to the present invention as described above, preferably, at least one reinforcing stud in the thickness direction of the base 22 and cover 23 is provided inside the housing 21, since the clearance between the base 22 and cover 23 inside the housing 21 is so small that deformation of the housing 21 may occur when extremely large external forces are applied. By virtue of the above reinforcing stud, the mechanical strength of the housing 21 in respect to the thickness direction thereof can be sufficiently ensured even against extremely large external forces.

Further, in each case of the above-mentioned embodiments relating to a disk drive structure, an example in which the present invention is applied to a magnetic disk drive has been illustrated. However, it should be noted that the present invention can be also applied to a magneto-optical disk drive and an optical disk drive. Naturally, a magneto-optical disk drive and an optical disk drive can be utilized instead of a magnetic disk drive in all the embodiments described hereinafter.

The structure of the spindle of the magnetic disk drive according to the present invention will now be described with reference to FIGS. 39 and 40. The structure of a portion including bearing means of the head actuator is essentially the same as the structure described below, and is not mentioned here.

As mentioned earlier, the magnetic disk drive of the present invention has a thickness which is as small as less than 5 mm, and in which the base 22 and the cover 23 constituting the housing are made of a thin plate or, preferably, a steel plate formed by press having a thickness of 0.4 to 0.5 mm. Therefore, the magnetic disk drive is essentially weak against the external force in the direction of thickness thereof. In order to reinforce the strength, therefore, it has been attempted to erect studs between the base and the cover as mentioned earlier. However, it is not allowed to effect such a reinforcement in the portion where the disk 24 exists or in the portion where the actuator moves. Preferably, therefore, a structure is put into practice which has a fixed shaft 18 and in which the center shaft of the spindle and the center shaft of the actuator are of the type of outer wheel rotation that plays the role of the above-mentioned stud.

Figure 42:
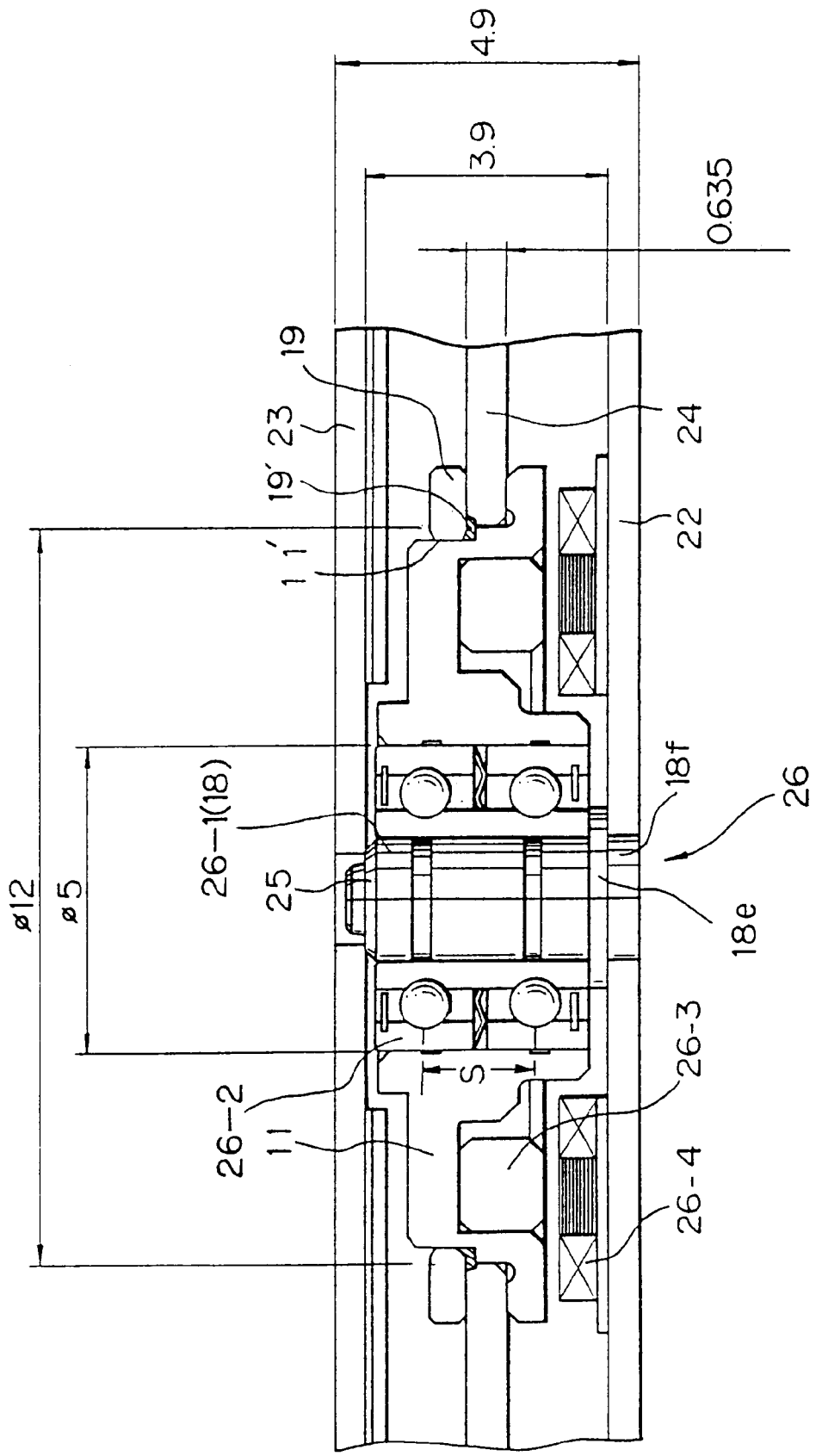
FIG. 42 is a view for explaining the relationship of the diameter of each fixed shaft and the average span between each pair of bearing means as shown in FIG. 39.

FIG. 42 is a diagram illustrating the structure of a preferred spindle of the present invention. The magnetic disk 24 is held by the spindle hub 11 which is supported by the fixed shaft 18 via bearing means 26-2. The fixed shaft 18 is fixed to the base 22 by caulking. In addition to the caulking, the fixed shaft may be fastened to the base by welding, forced fitting, adhesion or by using a screw as will be described later. On the other hand, the spindle motor 26 has a rotor magnet 26-3 fitted to the recessed portion in the spindle hub 11 and has a stator coil 26-4 fastened to the base 22 and opposed to the rotor magnet 26-3, and rotates the magnetic disk.

Figure 49:
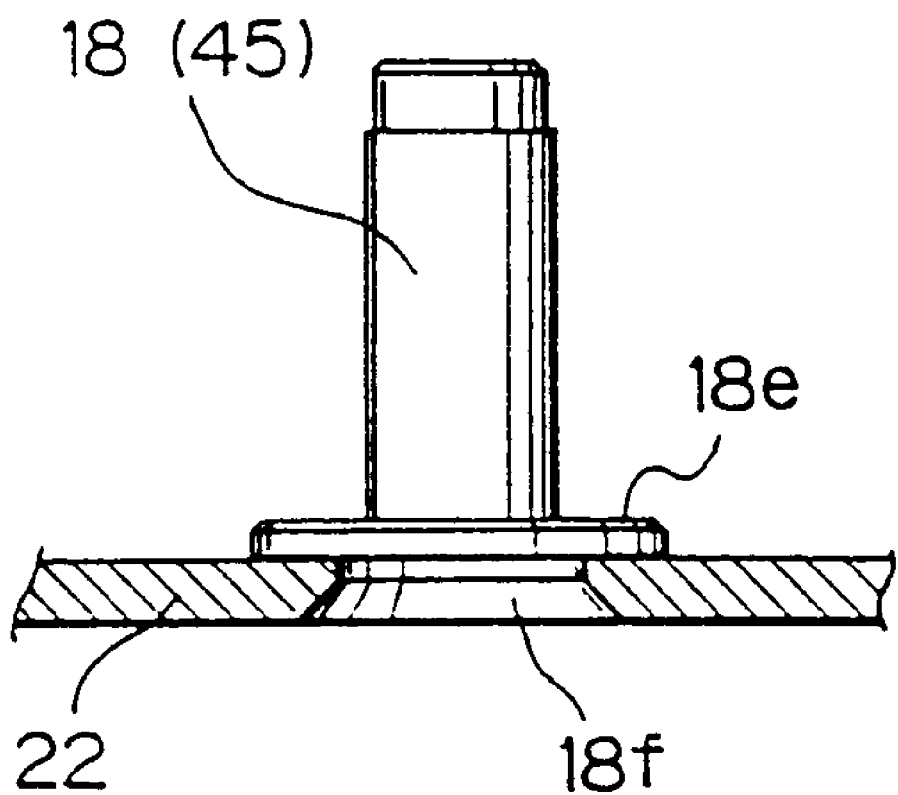

First, the structure of the fixed shaft 18 shown in FIG. 42 will be described in detail with reference to FIG. 28 and FIG. 49. Referring to FIG. 49, the fixed shaft 18 is constituted by a portion for mounting the bearing, a lower thin flange portion 18e, and a further lower caulking portion 18f. The caulking portion 18f is inserted in a predetermined hole in the base 22, and is fastened to the base 22 by cold caulking or hot caulking.

The flange portion 18e of the fixed shaft 18 exhibits two functions as described below. A first function is that the fixed shaft is erected perpendicularly to the surface of the base maintaining good precision owing to the presence of the flange. A second function is that it serves as a reference plane for the bearing means. In the magnetic disk drive of the present invention, the distance between a pair of bearings in the bearing means 26-2 becomes very short since the housing has the thickness of smaller than 5 mm. The tilt precision of the magnetic disk can be improved by increasing the distance between the upper bearing and the lower bearing. In the disk drive of the present invention however, the upper bearing and the lower bearing are almost in contact with each other as shown in FIG. 42 and a sufficient distance is not maintained. In the present invention, therefore, the lower end surface of the inner wheel of the bearing is abutted to the upper surface of the flange 18e that serves as a dimensional reference of the fixed shaft 18 in order to maintain good tilt precision. In order to favorably realize this, it is desired that the outer diameter of the flange portion is as great as possible. In this embodiment, the outer diameter of the flange is set to be nearly equal to or greater than an average distance between the pair of bearings of the bearing means 26-2.

The coupling means between the fixed shaft 18 and the cover 23 will be described later.

Figure 43:
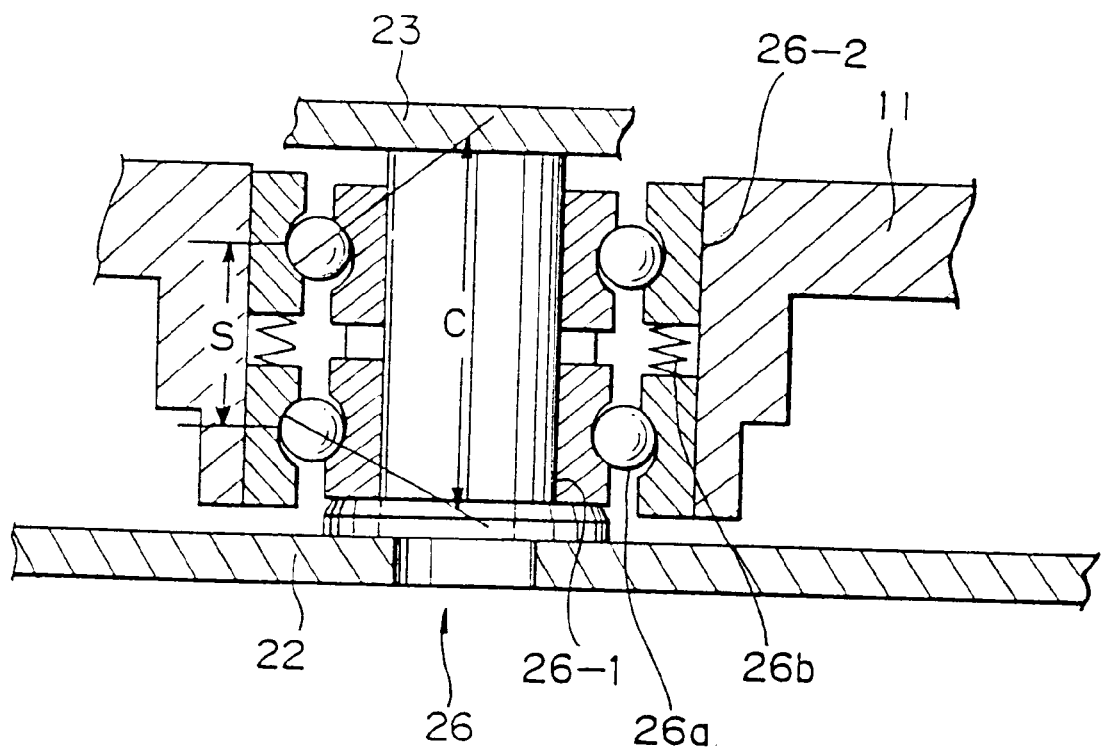
FIG. 43 is a view for explaining bias means on the outer ring portions of bearing means as shown in FIG. 39.

FIG. 43 is a diagram which illustrates the pre-load of the bearing means of FIG. 42. In this case, the first and second bearing means can have substantially the same structure.

Being limited by the thickness of the housing as described above, the distance between the pair of bearings of the bearing means is very short and a sufficiently large rigidity against the moment is not obtained. As shown in FIG. 43, therefore, a pre-load means such as a spring 26b is provided between the upper outer wheel and the lower outer wheel of the bearing means in order to give a predetermined load in the axial direction. Here, the two exterpolation lines link the points at which a roller 26a comes in contact with the outer wheel and the inner wheel. The distance D between the two intersecting points at which the two exterpolation lines intersect the center of revolution of the spindle can be increased to be longer than the average distance S between the pair of bearings of the bearing means by using the pre-load employed in the embodiment. In FIG. 43, the distance is about twice as great as the average distance S and, hence, the rigidity against the moment which is about twice as great is obtained.

Next, a preferred embodiment of the bearing means will be described in conjunction with FIG. 42. This embodiment uses a unitary shaft-type bearing in which the upper and lower inner wheels are formed as a unitary structure. Such a bearing constitution makes it possible to obtain more improved precision than that of the combination of the conventional bearings which have been split into upper and lower sides. Further, the bearing means can be mounted on the fixed shaft 18 by simply fitting and adhering the hollow hole (inner circle) of the integrally formed inner wheel onto the fixed shaft. Therefore, the bearing means can be fitted to the fixed shaft 18 separately from fitting the means that gives the pre-load.

Figure 50:
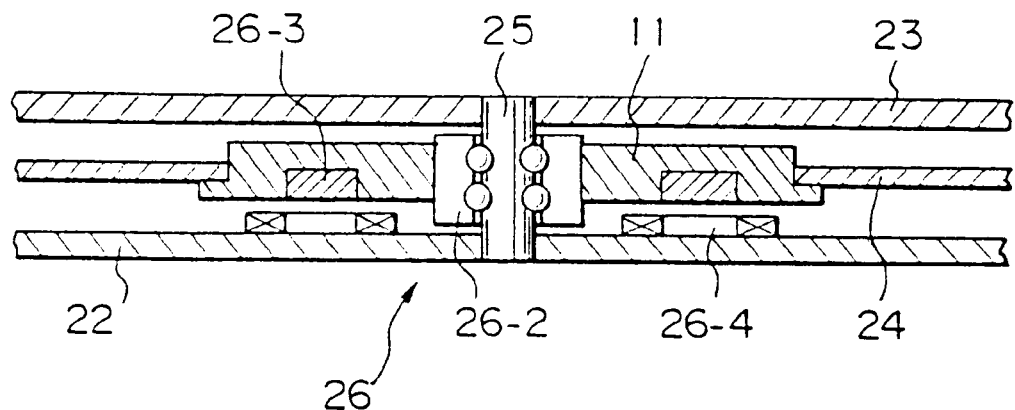
FIG. 50 is a view showing a first preferred embodiment of a whole spindle motor construction of a disk drive according to the present invention.

As shown in FIG. 50, furthermore, it is allowable to directly fasten the shaft to the base without forming a hollow hole that is shown in FIG. 42 in the shaft that corresponds to the inner wheel of the unitary shaft-type bearing. This method, however, involves the following problem. First, the part constituting the bearing requires a high degree of machining precision for which it is difficult to effect such machining as flanging. Second, the bearing material has such a high hardness that inhibits assembling that involves plastic deformation such as caulking. In this case, therefore, means is employed such as fastening by using a screw or slightly forced fitting which, however, is not capable of offering a high degree of fastening strength.

Described below with reference to FIG. 42 are methods of fastening the fixed shaft 18 to the base 22 by welding. FIG. 42 is a diagram for explaining the fastening by caulking, but to which reference is also made here for explaining the welding since it has quite the same appearance.

According to a first method, the lower end of the fixed shaft 18 inserted in a through hole of the base 22 is fastened to the inner edge of the through hole by laser spot welding.

According to a second method, a portion that corresponds to the flange of the fixed shaft around the through hole is fastened from the lower surface of the base by laser spot welding.

According to a third method, no through hole is formed in the base 22, no base insertion portion is formed in the fixed shaft 18, and the lower surface of the flange, i.e., the lower end surface of the fixed shaft 18 is fastened from the lower surface of the base by spot welding.

The above-mentioned methods of fastening the base 22 and the fixed shaft 18 together by welding can be replaced by the method of fastening using an adhesive. In this case, however, the bonding strength by adhesion is inferior to that of welding, as a matter of course.

Described below is another embodiment of the method of fastening the fixed shaft which is different from the methods shown in FIG. 42.

Figure 39:
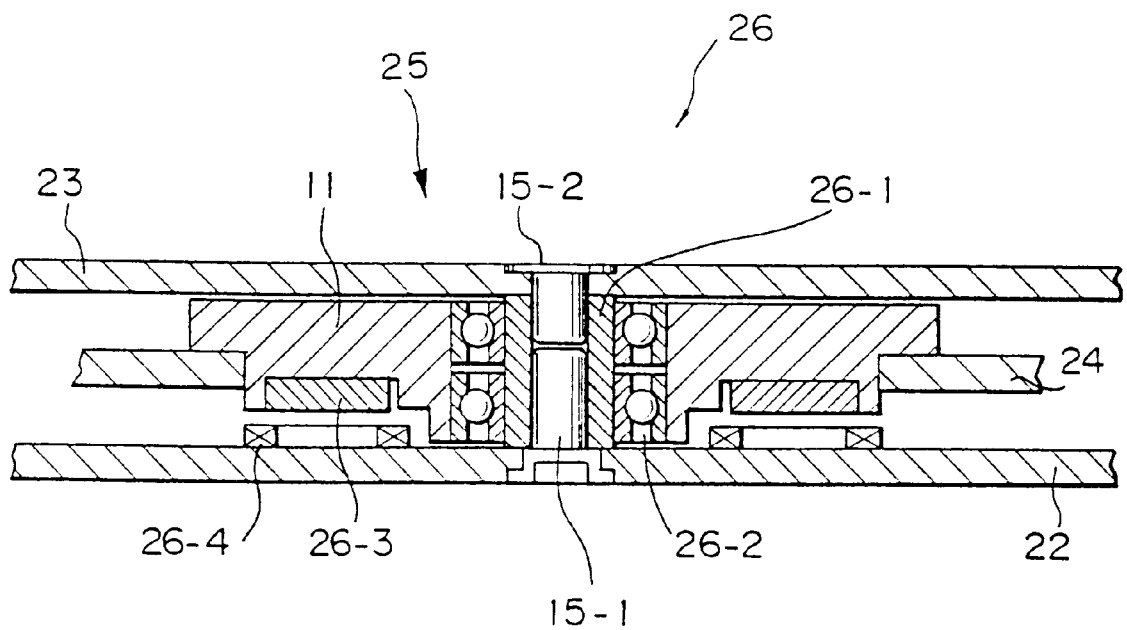
FIG. 39 is a view showing a first preferred embodiment of a fixed shaft construction of a disk drive according to the present invention.

FIG. 39 is a diagram illustrating a second embodiment of the structure of the fixed shaft in the magnetic disk drive of the present invention. In this embodiment, a substantial fixed shaft is a hollow shaft designated at 20-1 which is fitted and adhered to a pin 15-1 that is fastened by caulking to the base 22, and is thus erected on the base 22. A second pin 15-2 which forms a pair together with the first pin 15-1 has the same diameter as the first pin 15-1 and further has a flange portion. The second pin 15-2 is inserted in a stepped hole of the cover 23 from the outer surface side of the cover 23, and is bonded to the fixed shaft 26-1 using an adhesive agent. The second pin 15-2 is further fastened to the cover 23 by adhesion or spot welding. In FIG. 39 unlike in FIG. 42, the bearing means is not the unitary shaft-type bearing but consists of a pair of bearings 26-2 having separate inner wheels and which are fastened by adhesion to the fixed shaft 26-1.

Figure 40:
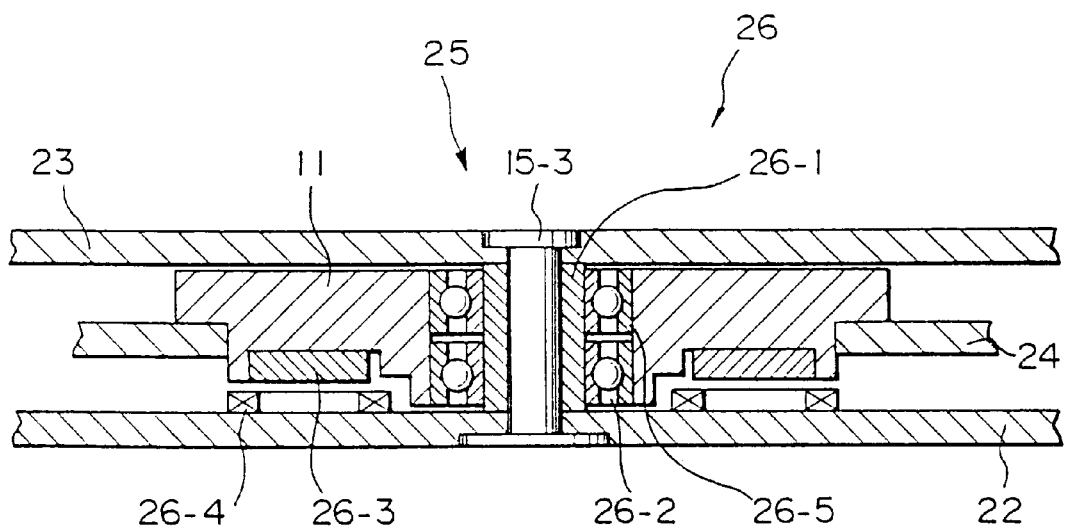
FIG. 40 is a view showing a second preferred embodiment of a fixed shaft construction of a disk drive according to the present invention.

FIG. 40 is a diagram illustrating a third preferred embodiment of the structure of the fixed shaft in the magnetic disk drive of the present invention. Like FIG. 39, FIG. 40 representatively illustrates in cross section and on an enlarged scale the structure of the fixed shaft in the spindle motor 26.

What makes the structure of this third preferred embodiment different from the second embodiment is that a pin 15-3 of a shape shown is used instead of two pins 15-1 and 15-2, and the pin 15-3 is fastened by welding to the base 22 and is further fastened to the cover 23 in a plastically deformed manner.

Concretely speaking, the pin 15-3 is passed through the stepped hole of the base 22 in a first stage. In a next stage, the flange portion of the pin 15-3 is fastened to the stepped bottom surface of the base by electric spot welding or by laser spot welding. Moreover, the fixed shaft 20-1 to which the bearing means 26-2 is adhered is inserted and adhered in the pin 15-3. In the final stage, the pin 15-3 is fitted in the stepped hole of the cover 23, and the head of the pin 15-3 is crushed by the plastic working so as to be fastened to the cover 23.

Figure 41:
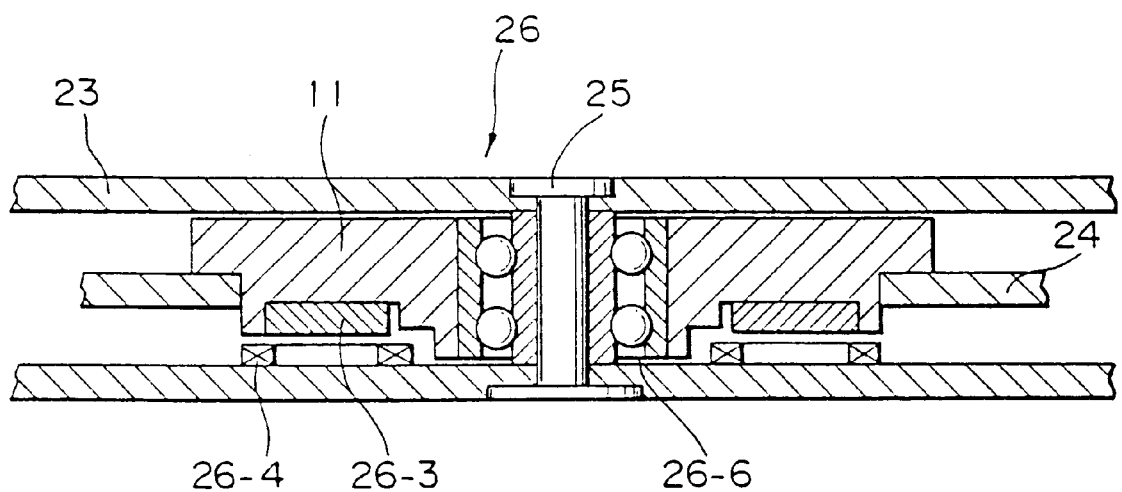
FIG. 41 is view showing a third preferred embodiment of a fixed shaft construction of a disk drive according to the present invention.

FIG. 41 is a diagram which illustrates a fourth preferred embodiment of the structure of the fixed shaft in the magnetic disk drive of the present invention. Like FIG. 39, FIG. 41 representatively illustrates in cross section and on an enlarged scale the structure of the fixed shaft in the spindle motor 26.

What makes the structure of this fourth favorable embodiment different from the third embodiment is that the bearing means has an inner wheel and an outer wheel that are constituted as a unitary structure. In this bearing constitution, not only the inner wheel but also the outer wheel are formed as a unitary structure making a difference from the unitary shaft-type bearing structure shown in FIG. 42. That is, in this embodiment, a pre-load is exerted in the step of fabricating the inner wheel, balls and outer wheel. Accordingly, no pre-load or no precision control is required in the step of assembling the magnetic disk drive, and the rotational precision of the spindle is improved.

Figure 44:
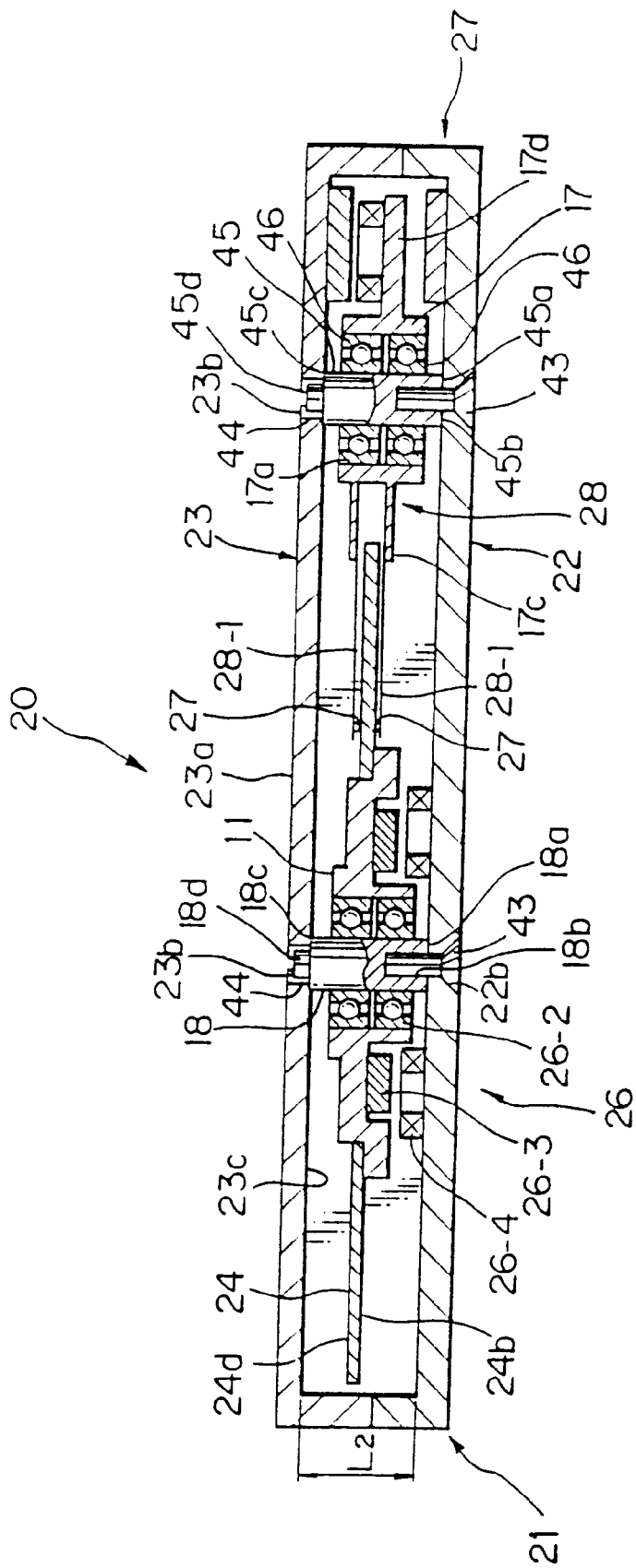
FIGS. 44, 45 and 46 are views showing a fourth preferred embodiment of a fixed shaft construction of a disk drive according to the present invention.

FIG. 44 is a diagram illustrating a fifth preferred embodiment or the structure of the fixed shaft in the magnetic disk drive of the present invention. This embodiment is different from the first to fourth embodiments with respect to that the fixed shaft 18 is fastened to the base 22 by using a screw 43 and that the bearing means 26-2 which is not of the unitary shaft-type is directly adhered to the fixed shaft 18 which is not hollow but is solid.

Described below is the structure of fastening the fixed shaft 18 to the cover 23.

Figure 45:
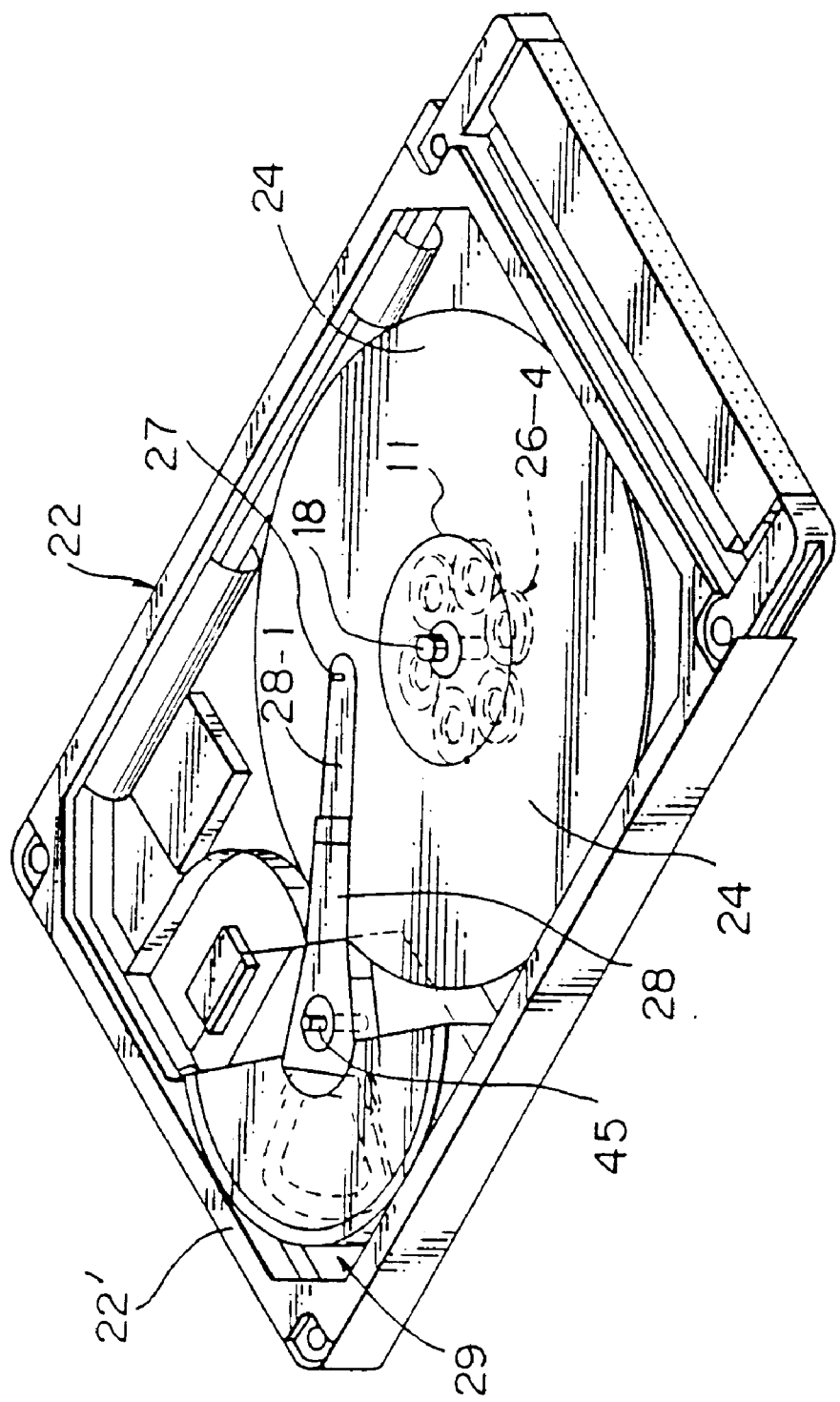

FIG. 45 is a diagram showing the internal structure of the housing of when the cover 23 is removed, i.e., showing the end of the spindle 18 and the end of the actuator shaft 45.

Figure 46:
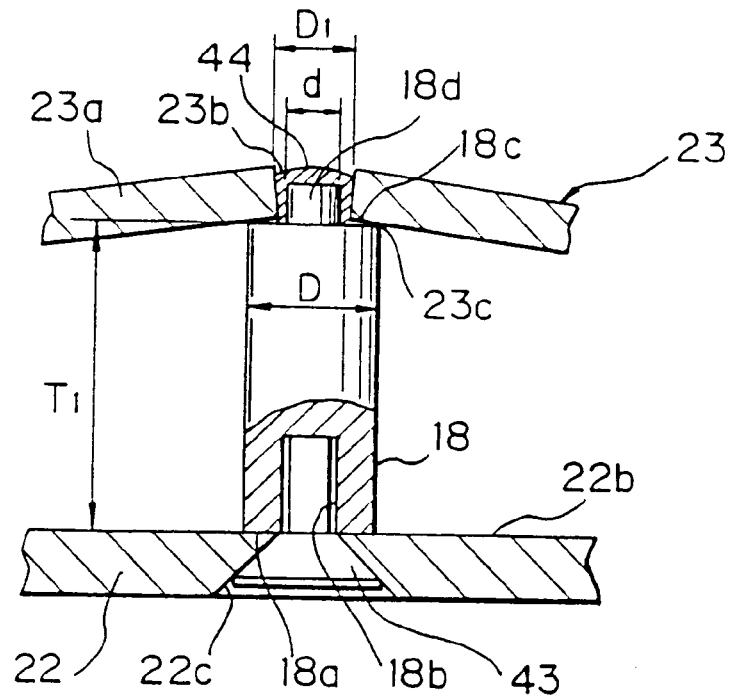

FIG. 46 is a diagram illustrating a preferred embodiment for fastening the fixed shaft 18 in the magnetic disk drive of the present invention shown in FIG. 42 to the cover 23. In FIG. 46, the coupling portion between the fixed shaft 18 and the base 22 is different from that of FIG. 42, but the coupling to the cover 23 is the same, and there will be no problem in the description. Moreover, the coupling between the actuator shaft 45 and the cover 23 is the same and is not described again, here.

A stepped portion 18c is formed at the upper part of the fixed shaft 18, and a small-diameter portion 18d having a diameter D smaller than the diameter D of the fixed shaft 18 is formed at an upper part of the stepped portion 18c so as to protrude from the end of the fixed shaft 18.

Moreover, a length $T_1$, from the bottom surface 18a of the fixed shaft 18 (from the lower surface of flange 18f in FIG. 42) to the stepped portion 18c is slightly greater (by about 0.02 to 0.06 mm in this embodiment) than a distance $L_2$ from the upper surface 22b of the base 22 to the lower surface of the cover 23. Further, a through hole 23b has been formed in a portion of the cover 23 that faces the insertion hole 22c formed in the base 22. In this embodiment, the inner diameter $D_1$ of the through hole 23b is smaller than the outer diameter D of the fixed shaft 18, but is greater than the diameter d of the small-diameter portion 18d at the end of the fixed shaft ($D>D_1>d$). When the cover 23 is mounted on the base 22, therefore, the small-diameter portion 18d of the fixed shaft 18 is inserted in the through hole 23b of the cover 23.

From now on, various embodiments of a fixed shaft construction of a disk drive according to the present invention will be described with reference to FIG. 39 to FIG. 49.

FIG. 39 is a view showing a first preferred embodiment of a fixed shaft construction of a disk drive according to the present invention. In FIG. 39, an enlarged schematic sectional view of a fixed shaft construction in a spindle motor 26 is illustrated representatively, and an illustration of a fixed shaft construction in a head assembly is omitted because the latter construction is substantially the same as the former construction.

As shown in FIG. 39, a spindle motor 26 located at the inner portion of the magnetic disk 24 has a first fixed shaft 26-1 constituting the main part of a fixed shaft 25 of spindle, that is fixed in a predetermined position of the base 22 within said housing 21 so as to support the magnetic disk 24 rotatably. Further, the above spindle motor 26 has a pair of first bearing means 26-2 that are fixed around the fixed shaft 26-1 at the upper and lower sides thereof, respectively, in order to support the disk fixing shaft 26-1. Furthermore, the above spindle motor 26 has a spindle hub 11 that has the outer portion engaged with the central hole of the magnetic disk 24 and has the inner portion rotatably mounted on the fixed shaft 26-1 via the first bearing means 26-2. Also, the above spindle motor 26 has at least one rotor magnet 26-3 that is fixed to the spindle hub 11 and at least one stator coil 26-4 that is fixed to the base 22, facing the rotor magnet 26-3.

Further, a head assembly has a similar construction in respect to the driving mechanism. More specifically, the head actuator includes a fixed subsidiary shaft that is also fixed in a predetermined position within the housing 21 and includes a pair of second bearing means that are fixed around the fixed subsidiary shaft at the upper and lower sides thereof, respectively, in order to support the fixed subsidiary shaft, as well as the magnetic head, arm and actuator as described before.

Further in FIG. 39, 15-1, 15-2 denote a first pin and a second pin, respectively, that constitute the spindle 25 together with the fixed main shaft 26-1. The above first pin 15-1 is mainly composed of a shaft portion which has a diameter of a size that allows the first pin 15-1 to be engaged with a central hole of the fixed main shaft 26-1 and which has a length shorter than the fixed shaft 26-1 and which is made of metal with high mechanical strength. Further, on one end of the above first pin 15-1, a flange portion with a form that allows the above first pin 15-1 to be fitted into a hole with a stepped part previously formed in the base 22 and to be finally fixed thereto by forcing plastic deformation of the flange portion, is provided. On the other hand, the second pin 15-2 which forms a pair with the first pin 15-1 is mainly composed of a shaft portion which has a diameter of a size that allows the second pin 15-1 to be engaged with a central hole of the fixed shaft 26-1, similar to the first pin 15-1. Further, on one end of the above second pin 15-2, another flange portion, which has a diameter that allows the second pin 15-2 to be fitted into the larger diameter portion of another hole with a stepped part previously formed in cover 23 facing the base 22, is provided.

In the first preferred embodiment of a fixed shaft construction of a disk drive, as in FIG. 39, the flange portion of the first pin 15-1 is inserted into the hole with a stepped part of the base 22 and then plastic deformation of the flange portion of the first pin 15-1 is performed in such a manner that the above flange portion is enlarged toward the outer peripheral portion thereof by means of caulking, so that the first pin 15-1 is mounted vertically to the inside surface of the base 22. Further, the second pin 15-2 is inserted from the outer surface of the cover 23 into the other hole with a stepped part of the cover 23 and then is fastened to the other hole by utilizing adhesive.

To be more specific, the disk 24 and the rotor magnet 26-3 are attached to the outer portion of the spindle hub 11, while the fixed shaft 26-1 having a hollow form is fitted into the central hole of the spindle hub 11, via the ball bearing means 26-2, e.g., a pair of ball bearings. Further, in the condition that the rotor magnet 26-3 of the spindle hub 11 and the stator coil 26-4 are facing each other, the fixed main shaft 26-1 and first pin 15-1 are fastened together by adhesive. On the other hand, the second pin 15-1 that has already been adhered to the hole of the base 22, is inserted into the upper half of the fixed shaft 26-1 and is fastened to the fixed main shaft 26-1 also by adhesive. Consequently, the spindle hub 11 having the disk 24 can be successfully contained within a space that is constituted by the base 22 and cover 23. In this construction, when a given current is supplied to the stator coil 26-4, the spindle hub 11 can rotate at a sufficiently high rate. In this case, by virtue of plastic deformation of the flange portion, the structure is which the fixed main shaft 26-1 rotatably supports the spindle hub 11 where the disk 24 and the rotor magnet 26-3 are attached, can be realized relatively easily and with smaller dimensions and with higher accuracy than the prior art.

FIG. 40 is a view showing a second preferred embodiment of a fixed shaft construction of a disk drive according to the present invention. Also in FIG. 40, similar to FIG. 39, the enlarged schematic sectional view of a fixed shaft construction in a spindle motor 26 is illustrated representatively.

The fixed shaft construction of the above second preferred embodiment is similar to that of the first preferred embodiment described before. However, the construction of the second embodiment is different from that of the first embodiment in that another type of pin 15-3 having a form such that the pin 15-3 can be fastened to the base 22 and cover 23 by welding is utilized instead of two pins 15-1, 15-2 described before.

More concretely, in a first step, the pin 15-3 is forced to pass through the hole with a stepped part of the base 22. In the next step, the inner end surface of the flange portion in the pin 15-3 and the bottom surface of the above hole with a stepped part are welded together by welding, laser spot welding or the like, so that the pin 15-3 is mounted vertically to the inside surface of the base 22. Further, the fixed shaft 26-1 that is fitted into the central hole of the spindle hub 11 via the ball bearing means 26-2, is engaged with the pin 15-3 and is fastened thereto by utilizing adhesive. Further, the upper portion of the pin 15-3 that goes through the fixed main shaft 26-1 and protrudes thereabove, is fitted into the other hole with a stepped part of the cover 23 and is finally fastened thereto by adhesion, etc. By virtue of welding, laser spot welding or the like, the structure such that the fixed main shaft 26-1 rotatably supports the spindle hub 11 can be realized relatively easily and with smaller dimensions and with higher accuracy than the prior art, similar to the first preferred embodiment shown in FIG. 39.

In the above-mentioned first and second embodiments, to fasten the fixed shaft 26-1 to the base 22 rigidly within the housing 21 having as small a size as an IC memory card, the plastic deformation of the pin by means of rivetting and the joining of the pin with the base 22 by welding are performed, respectively. Alternatively, it is possible for the pin to be fixed to the base 22 by adhesion. In each case, preferably, the fixed shaft 26-1 is a hollow shaft and is mounted to the first bearing means 26-2 by adhesion. Consequently, an assembly having a hollow form is provided. Further, the above assembly is inserted to the pin, etc., previously fixed to the base 22 and serving as a main central shaft.

FIG. 41 is a view showing a third preferred embodiment of a fixed shaft construction of a disk drive according to the present invention. Also in FIG. 41, similar to FIGS. 39 and 40, the enlarged schematic sectional view of a fixed shaft construction in a spindle motor 26 is illustrated representatively.

The fixed shaft construction of the above third preferred embodiment is similar to that of the second preferred embodiment described before. However, the construction of the third embodiment is different from that of the second embodiment in that integrated type ball bearings 26-6 are utilized, in which the inner race (ring) thereof and the spindle 25 are combined into an integrated form and a given pre-load is generated by coupling the integrated spindle with the outer race (ring) via two columns of balls.

As illustrated in FIG. 41, the disk 24 and the rotor magnet 26-3 are attached to the outer portion of the spindle hub 11. Further, the outer ring of the integrated type ball bearings 26-6 is inserted into the central hole of the spindle hub 11 by pressing. Further, one end of the integrated spindle of the above integrated type ball bearings 26-6 is forced to pass through the hole with a stepped part of the base 22, and is welded to the inner wall surface of the above hole, so that one end of the integrated spindle thereof is mounted vertically to the inside surface of the base 22. On the other hand, the other end of the above integrated spindle is fitted into the other hole with a stepped part of the cover 23 and is finally fastened thereto by adhesion, etc. In this case, since the ball bearings integrated with the spindle are used as the ball bearing means, the process of performing a fixed shaft construction becomes easier than that of the first and second embodiments as in FIGS. 39 and 40, respectively.

Furthermore, it should be noted that the second fixed shaft can be fastened to the base 22 and then the second fixed shaft (these components will be illustrated in the drawings hereinafter) can be mounted to a pair of second bearing means in a manner similar to the fixed main shaft 26-1 and a pair of first bearing means 26-2.

FIG. 42 is a view for explaining the relationship of the diameter of each fixed shaft and the average span between each pair of bearing means as in FIG. 39. In FIG. 42, the structure inside the housing is illustrated more briefly. Further, typical dimensions in the various portions inside and outside the housing are noted for reference.

In this case, a thinner flange portion 25-1 is formed in the vicinity of one end surface of spindle 25 and a straight hole is formed through the base 22, instead of a hole with a stepped part, somewhat different from the first preferred embodiment in FIG. 39. Also, in this construction, the spindle 25 can be mounted vertically to the inside surface of the base 22. In this case, preferably, the flange portion of the spindle 25 (or pins 15-1, 15-3) has a diameter approximately equal to or larger than average span S between a pair of first bearing means 26-2.

In a disk drive according to the present invention, the thickness dimension of the housing is limited to a value smaller than 5 mm (in FIG. 42, 4.9 mm), to realize compatibility with an IC memory card. In this condition, since the span between a pair of bearing means is forced to be shorter, it may be difficult to maintain precision of the position of the bearing means in respect to the direction where they fall. To deal with this difficulty, as in FIG. 42, the upper surface of the flange portion 25-1 is defined as the base dimension of the outer diameter of the flange portion 25-1 and is arranged to make contact with the lower end surface of the outer ring portions of the first bearing means 26-2. To realize this structure more surely, it is desirable for the outer diameter of the flange portion 25-1 to be as large as possible. In this case, typically, the dimension of the diameter of the flange portion 25-1 is set at a value approximately equal to or larger than the average span S between a pair of first bearing means 26-2. In this construction, the ball bearing means 26-2 is practically supported by the flange portion 25-1, as well as the body portion of the fixed shaft 25 per se. Therefore, the apparent precision of the position of the first bearing means 26-2 can be improved to a sufficient degree by virtue of the increase in the base dimension of the spindle 25.

Further, it should be noted that the flange portion of a fixed subsidiary shaft or the like also has a diameter approximately equal to or larger than the average span between a pair of second bearing means. In this construction, similar to the fixed main shaft construction described above, the apparent positioning accuracy of the second bearing means in respect to the direction where they fall can be improved to a sufficient degree by virtue of the increase in the base dimension of the fixed subsidiary shaft or the like.

FIG. 43 is a view for explaining pre-load means on the outer ring portions of bearing means as illustrated in FIG. 39. Also, the example in FIG. 43 in which a thinner flange portion is formed in the vicinity of one end surface of the spindle 25 and a straight hole is formed through the base 22, is illustrated representatively. In this case, the first and second bearing means can have substantially the same structures, and therefore only the first bearing means will be representatively described in detail in FIG. 43.

In a disk drive according to the present invention, as already described in FIG. 42, owing to limitation of the thickness dimension of the housing, the span between a pair of first bearing means 26-2 is forced to be shorter. To be more specific, the first bearing means 26-2 have the respectively corresponding pair of outer ring portions and the respectively corresponding pair of inner ring portions. Further, plural pairs of balls 26a are provided between the outer and inner ring portions, and the inner ring portions are attached to the fixed shaft 26-1. In this construction, the upper group and lower group of the plural pairs of balls 26a as proximately overlap each other in two columns, with a relationship of position such that the above two groups almost contact each other. Accordingly, the structure of the above bearing means 26-2 may be disadvantageous in that sufficient moment of inertia of the spindle motor 26 is not always ensured.

To overcome this disadvantage, as in FIG. 43, pre-load means 26b, such as a thinly-made spring means, that put a constant pressure on the outer ring portions in respect to the axial direction thereof, are provided between a pair of outer ring portions of the first bearing means 26-2. In the drawing, the upper and lower extrapolated lines are formed by connecting contact points where the outer and inner ring portions contact the balls 26a, respectively. Further, when such upper and lower extrapolated lines intersect the central line of the fixed shaft 26-1, the distance D between the intersections of the upper and lower extrapolate lines and the central line is longer than the average span S between a pair of first bearing means 26-2, by means of the pressure on the outer ring portions. For example, in FIG. 43, the distance D becomes approximately twice as large as the average span S. Consequently, the moment of inertia of the spindle motor 26 can be substantially equivalent to the moment of inertia generated by the a pair of bearing means having the average span therebetween approximately twice as large as the actual average span S.

FIGS. 44, 45 and 46 are views showing a fourth preferred embodiment of a fixing shaft construction of a disk drive according to the present invention. To be more specific, FIG. 44 is a sectional front view showing a structure inside the housing of the fourth preferred embodiment; FIG. 45 is a perspective view showing a structure inside the housing with the cover removed; and FIG. 46 is an enlarged sectional view showing the main part of FIG. 45. In FIG. 46, the description of a connector as shown in FIG. 45 is omitted to simplify the explanation of the fourth preferred embodiment of a fixed shaft construction. Further, in this case, to emphasize the characteristics of the above fourth embodiment, a fixed shaft of spindle is indicated by the reference numeral 18, not 26-1 as in FIGS. 39 to 43.

In these figures, a head assembly has two magnetic heads 27 that execute reproducing/recording operations corresponding to read/write operations of the information on the upper and lower surfaces of a magnetic disk 24, two arms 28 that movably support the above two magnetic heads 27, and an actuator 29 that forces the arms 28 to rotate in either direction and the magnetic heads 27 to move to predetermined tracks on the magnetic disk 24. Further, the cover 23 desirably functions not only as shielding means that electromagnetically shields various components inside the housing 21 from the external magnetic field, but also as dust protective means that prevents dust particles from adhering to a magnetic disk 24, magnetic heads 27 or the like. To realize the above two functions of the cover 23, as illustrated in FIG. 44, the cover 23 is constructed to be coupled to the base 22 by utilizing appropriate fastening means, e.g., screws and pins, or a packing, etc., inserted between the cover 23 and the peripheral portion 22' of the base 22, so that the cover 23 is glued to the peripheral portion 22' without any clearance.

Further, the fixed main shaft 18 located between the base 22 and cover 23 at the side of the magnetic disk 24 is fastened to the above base 22 and cover 23 in the form of a fixed beam. A pair of first bearing means 26-2 are fitted around the above fixed shaft 18, and via the above first bearing means 26-2, a spindle hub 11 is rotatably supported by the above main shaft 18. The magnetic disk 24 is coupled with the outer peripheral portion of the spindle hub 11 in a unified form and the above spindle hub 11 rotates with the magnetic disk 24.

On the other hand, the second fixed shaft 45 located between the base 22 and cover 23 at the side of the actuator 29 is also fastened to the above base 22 and cover 23 in the form of a fixed beam. A pair of second bearing means 46 are fitted around the above fixed shaft 45, and via the above second bearing means 46, two arms 28 are rotatably supported by the above fixed shaft 45. The two arms 28 consist of an arm supporting part 17 having a supporting hole 17a into which the above second bearing means 46 is fitted, and two head supporting elements 28-1 that are held by a pair of projections 17b, 17c, both of which are projected outward from the arm supporting part 17. In this case, each of the above projections 17b, 17c are in the form of a thin sheet and extend in the horizontal direction. Further, the two magnetic heads 27 that face the upper and lower surfaces 24a, 24b of the magnetic disk 24, are supported on the respective tip portions of the two head supporting elements 28-1.

Further, a mounting portion 17d is projected a direction opposite to the arm supporting part 17 of the arms 28. A movable coil portion 29b is fixed on the mounting portion 17d, and a magnet portion 29a contacts the inner wall surface of the cover 23. Furthermore, a yoke portion 29c is fixed on the inner wall surface of the base 22 facing the lower surface of the mounting portion 17d. In this construction, the arm 27 can be allowed to rotate in both directions by the driving force caused by the actuator 29 having the movable coil portion 29b, the magnet portion 29a and the yoke portion 29c. Consequently, the tracking of a disk drive for reproducing/recording operations can be performed by moving the two magnetic heads 27 relative to the magnetic disk 24.

Next, the mounting structure of the fixed shaft 18 of the two kinds of fixed shafts will be representatively described in more detail. As shown in FIG. 46, a threaded female part 18b, into which a fixing screw 43 is screwed, is formed in the bottom end surface 18a of the fixed shaft 18. Further, a stepped portion 18c is formed on the upper part of the fixed main shaft 18. Above this stepped portion 18c, a smaller diameter portion 18c protrudes upward from the fixed main shaft 18 in the axial direction. In this case, the smaller diameter portion 18d has a diameter d that is smaller than the outside diameter D of the fixed shaft 18.

Further, the length $T_1$ measured from the bottom end surface 18a of the fixed shaft 18 through the stepped portion 18c thereof is slightly larger than the distance $L_2$ between the upper surface 22b of the base 22 and the lower surface of the cover 23 (in the fourth preferred embodiment as illustrated in FIGS. 44 to 46, about 0.02–0.04 mm). Further, an insertion hole 22c, into which the fixing screw 43 is inserted, is formed in the base 22. Also, a through hole 23b is formed in a top portion 23a of the cover 23 facing the insertion hole 22c. In this case, the inside diameter $D_1$ of the through hole 23b is made larger than the outside diameter d of the fixed shaft 18 ($D>D_1>d$).

When the fixed shaft 18 is fastened to the base 22 and cover 23, in a first step, the fixing screw 43 is inserted from the insertion hole 22c into the threaded female part 18b and is screwed down, so that the fixed shaft 18 is standing firmly on the base 22. In the next step, the cover 23d is mounted on the base 22 so that the smaller diameter portion 18d of the fixed shaft 18 can be inserted into the through hole 23b of the cover 23.

As described above, since the outside diameter D of the fixed main shaft 18 is larger than the inside diameter $D_1$ of the through hole 23b, the stepped portion 18c of the fixed shaft 18 can contact the lower surface 18c of the cover 23. Moreover, since the length $T_1$ from the bottom end surface 18a through the stepped portion 18c is slightly larger than the distance $L_2$ between the upper surface 22b of the base 22 and the lower surface of the cover 23, the fixed shaft 18 forces the peripheral portion of the through hole 23b of the cover 23 to be lifted upward. Therefore, the top portion 23a of the cover 23 is pressed upward and is slightly deformed into a bent form as illustrated in FIG. 46. Consequently, the cover 23 is constructed to hold the fixed shaft 18 by pressing downward on the stepped portion 18c of the above shaft 18, in a form of a diaphragm.

In this condition, adhesive 44 that serves as the fastening means and sealing means is injected into the space between the through hole 23b and the smaller diameter portion 18d from the upper side of the cover 23 and finally the cover 23 is adhered to the fixed main shaft 18 by heat curing or ultravioleted irradiation of the adhesive 44. Preferably, epoxy elastic adhesive, etc., that has high viscosity and low hardness after heat curing, is utilized as the adhesive 44 shown in FIGS. 44 and 46. In this case, if the viscosity of the adhesive 44 is sufficiently high, the adhesive 44 can be prevented from penetrating past the cover 23 even when the adhesive 44 is poured into the through hole 23b. Further, if the hardness after heat curing of the adhesive 44 is sufficiently low, the smaller diameter portion 18d of the fixed shaft 18 can be elastically fastened to the through hole 23b via the adhesive 44. Furthermore, by virtue of the injection of the adhesive 44, the through hole 23b become closed and therefore dust floating in the air can be prevented from going through the cover 23. Accordingly, the adherence of dust to the magnetic disk 24 and the magnetic heads 27 and their surfaces resulting in damage thereto, can be prevented.

In other words, in the fourth preferred embodiment as illustrated in FIGS. 44 to 46, the fixed shaft 18 is constructed to be coupled with the cover 23 rigidly in respect to the thickness direction of the housing 21 by firmly pressing downward against the stepped portion 18c of the above fixed shaft 18, and coupled with the cover 23 flexibly in respect to the plane directions thereof by utilizing the elastic adhesive. By virtue of this construction, thermal stress, etc., which may be caused by the structure in which the fixed shaft 18 is fastened rigidly to both the base 22 and cover 23 in all directions, can be relieved.

More concretely, the cover 23 is mounted on the base 22 and further is fastened thereto by adhesive so that the upper part of the fixed main shaft 18 can be securely fixed to the cover 22. In this case, since the smaller diameter portion 18d is intended to be fitted into the through hole 23b with appropriate looseness, the fixed main shaft 18 can be prevented from tilting due to tightening thereof with a screw as in the prior art. Accordingly, it becomes possible for even inexperienced workers to perform the process of mounting the cover 23 on the base 22 relatively easily. Further, the condition of the fixed shaft 18 vertical to the base 22 can be maintained even after the cover 23 is fixed to the base 22. Therefore, tilting of the spindle hub 11 and the disk 24 mounted on the fixed main shaft 18, can be avoided, and the spindle hub 11 and the disk 24 can be stably supported by the fixed shaft 18 in a predetermined position. Consequently, since the relative position of the two magnetic heads 27 in respect to the magnetic disk 24 can be controlled with high precision, it becomes possible for the tracking control in reproducing/recording operations to be performed more accurately than in the prior art and the demand for higher magnetic recording density can be satisfied.

Further, the above-mentioned mounting structure of the fixed shaft 18 of a spindle can be applied to the fixed shaft 45 of the actuator. Namely, the fixed shaft 45 of the actuator has substantially the same mounting structure as that of the fixed shaft 18 of the spindle. Here, the detailed description of such fixed shaft 45 is omitted. Briefly, the fixed subsidiary shaft 45 stands on the base 22 in a vertical direction without tilting, together with the fixed shaft 18. Therefore, the arm 28 can be prevented from tilting and position errors of the magnetic head 27 in respect to the upper and lower surfaces of the disc 24 can be avoided.

Figure 47:
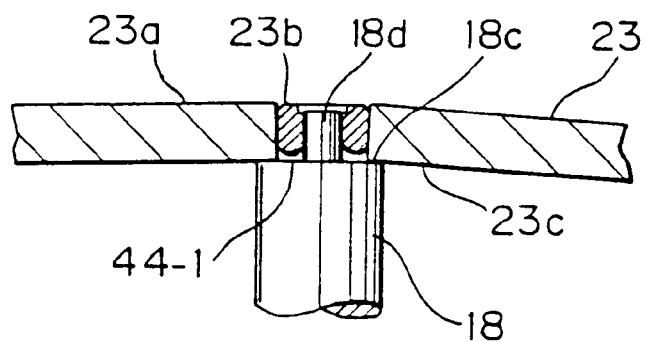
FIG. 47 is a view showing one example of a change in a fixed structure of a shaft and cover in the fourth preferred embodiment as shown in FIG. 46.

FIG. 47 is a view showing one example of a change in a fixing structure of the shaft and cover in the embodiment as illustrated in FIG. 46. In this case, the main part of the fixing structure of the shaft and cover is illustrated in enlargement.

In FIG. 47, instead of the above-mentioned adhesive 44, an elastic sealing member, e.g, an O ring 44-1 made of rubber is placed between the smaller diameter portion 18d of the fixed shaft 18 and the through hole 23b of the cover 23. In this case, since the O ring 44-1 has elasticity, it is deformed into an elliptical form by exerting pressure on the O ring 44-1 from the inner and outer portion thereof. In this condition, the O ring 44-1 can be glued to the outer circumference of the smaller diameter portion 18d and the inner circumference of the through hole 23b without any clearance, and the sealing of the space between the smaller diameter portion 18d and the through hole 23b can be performed securely. By virtue of the elasticity of O ring 44-1, dust floating in the air can be prevented from going through the cover 23. Accordingly, dust adhering to the magnetic disk 24 and the magnetic heads 27 and their surfaces and causing injury can be avoided, similar to the embodiment as illustrated in FIG. 46.

There can be proposed a method based on welding as another embodiment of coupling the fixed shaft 18 without inclining it to the cover 23 as shown in FIG. 46. As shown, for instance, in FIG. 43, the fixed shaft 18(26-1) does not have a step at the upper end surface thereof, and the through hole is not formed in the cover 23, either. The upper end of the fixed shaft 18 comes in contact with the cover 23 under the condition where the base 22 and the cover 23 are fastened together. When they do not come in contact with each other due to tolerance in the size, the cover 23 is lightly depressed. Under this condition, the spot welding is effected from the upper surface of the cover 23. The cover 23 is welded at the last step of assembling where electronic parts have all been contained in the inside. Therefore, the laser welding is preferred to the electric welding. Thus, the fixed shaft 18 is reliably fastened to the cover 23 without exterting any force in the direction to tilt the fixed shaft 18.

Figure 48B:
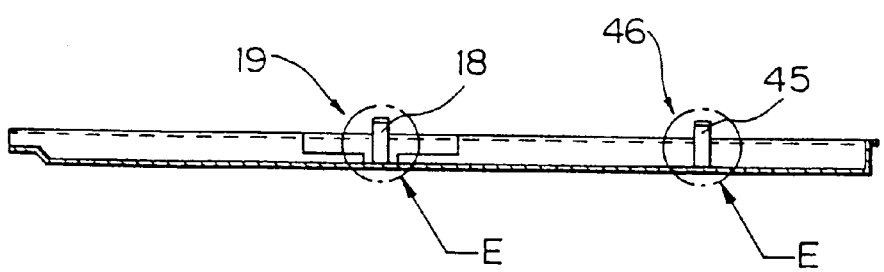

FIGS. 48 and 49 are views showing a fifth preferred embodiment of a fixed shaft construction of a disk drive according to the present invention. To be more specific, (A) of FIG. 48 is a front view showing the structure inside the housing and (B) of FIG. 48 is a sectional view taken along a line B—B of (A). Here, only the main part of the fixed shaft construction relating to the characteristics of the fifth preferred embodiment is illustrated. Further, in FIG. 49, either one of two common portions indicated by E of FIG. 48(B) is illustrated representatively.

As shown in FIGS. 48 and 49, the fixed subsidiary shaft 45 has substantially the same mounting structure as that of the fixed main shaft 18, including the screw 43 and the bearing means 19, 46. In particular, with regard to the bearing means having a relatively complicated structure, it should be noted that the first bearing means 19 of the spindle motor 18 has substantially the same construction as the second bearing means 46 of the head assembly. Accordingly, the fundamental parts of such bearing means can be designed and fabricated with common specifications. Therefore, the kind of mechanical components within the housing can be reduced an the total cost for fabricating a disk drive becomes lower.

Hereinafter, various embodiments of a whole spindle motor construction of a disk drive according to the present invention will be described with reference to FIG. 50 to FIG. 57.

FIG. 50 is a view showing a first preferred embodiment of a whole spindle motor construction of a disk drive according to the present invention. In FIG. 50, the main part of the spindle motor construction relating to the characteristics of the first preferred embodiment is illustrated.

As shown in FIG. 50, a fixed shaft 25 is fastened to the base 22 and cover 23 in order to hold the spindle motor 26 per se in a predetermined position within the housing 21 so that one magnetic disk 24 can rotate therein. A pair of first bearing means 26-2 (from now on, "first" will be omitted) are fixed around the spindle 25 in order to support the fixed shaft 25. Further, a spindle hub 11 has an outer portion engaged with the central hole of the magnetic disk 24 and has an inner portion rotatably mounted on said fixed shaft 25 via the bearing means 26-2. In this case, a rotor magnet 26-3 is composed of a permanent magnet having the form of a flat plate that is magnetized in the axial direction of the fixed shaft 25, and is fitted into a recessed portion of the bottom surface of the spindle hub 11 and is finally adhered thereto.

In the above first embodiment, the spindle hub 11 is made of a soft magnetic material that can be utilized as a yoke. Alternatively, if a nonmagnetic material is used for the spindle hub 11, the rotor magnet 26-3 is adhered to this spindle hub 11 via another yoke. In this case, preferably, an outer ring rotating motor in which the outer ring portion of the bearing means 26-2 rotates is utilized as the spindle motor 26.

Further, a stator coil 26-4 is fixed on the upper wall surface of the base 22 inside the housing 21, so that the stator coil 26-4 faces the rotor magnet 26-3, close to the rotor magnet 26-3 with a certain axial gap. To be more specific, the rotor magnet 26-3 is located between the position of the inside diameter of the magnetic disk 24 and the position of an outer peripheral portion of the bearing means in respect to the radial direction of the rotor magnet 26-3. The base 22 that constitutes a part of the housing 21 is made of a soft magnetic material and also serves as a stator yoke. Here, the stator coil 26-4 is located in a such a manner that it protrudes toward the space near the magnetic disk 24 inside the housing 21. In this construction of the spindle motor, a face-to-face type motor, i.e., a flat type motor, utilizing the magnetic flux in the axial direction of the spindle 25 between the rotor magnet 26-3 and stator coil 26-4, can be formed, and the spindle hub 11 and the magnetic disk 24 rotate in an integrated form with the rotor magnet 26-3 in accordance with the rotation thereof. In this case, the thickness of the spindle motor per se can become remarkably small. By using the face-to-face type (axial gap) motor, the almost inside of the motor can be covered with the bearing as seen from FIG. 42, and also the outer diameter of the motor can be smaller than the inner diameter, and thereby the drive having a thickness of lower than 5 mm can be realized.

Further, since at least the base 22 is made of a soft magnetic material and acts as a yoke simultaneously, a disk drive, in which excellent characteristics can be ensured with smaller size and lower weight than a prior art disk drive, can be provided. In particular, the above structure can be effectively applied to a disk drive utilizing a small number of magnetic disks.

Figure 51:
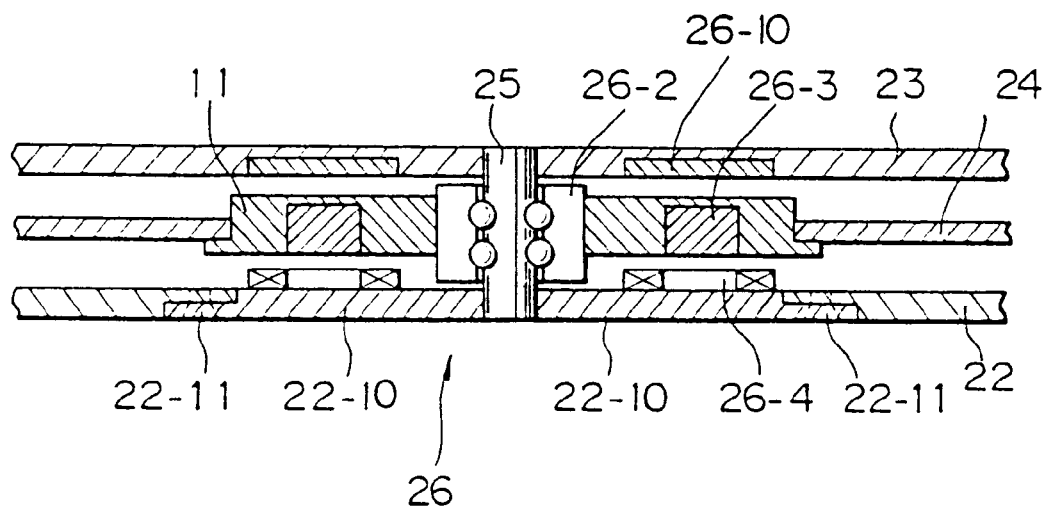
FIG. 51 is a view showing a second preferred embodiment of a whole spindle motor construction of a disk drive according to the present invention.

FIG. 51 is a view showing a second preferred embodiment of a whole spindle motor construction of a disk drive according to the present invention. Also in FIG. 51, the main part of the spindle motor construction is illustrated.

The construction of the above second preferred embodiment is similar to that of the first preferred embodiment as shown in FIG. 50. However, in the second embodiment, different from the first embodiment, each of the spindle hub 11, base 22 and cover 23 is made of a non-magnetic material. In this case, the rotor magnet 26-3 is arranged to have a larger thickness than that of FIG. 50, and the stator yoke at the cover side is utilized, instead of the rotor yoke, as a magnetic path. By arranging the rotor magnet 26-3 in this way, the effective magnetic flux can be increased and excellent motor characteristics can be ensured, similar to the first preferred embodiment as illustrated in FIG. 50.

Further, on the surface of the lower side wall, a stator yoke 26-10 is located in position opposite to the stator coil 26-4 across the spindle hub 11. Furthermore, since the base 22 is made of non-magnetic material as described above, a bushing 22-10 serving as another stator yoke is fixed to the base 22 by screws 22-11 to obtain the effective magnetic flux. The method of fixing a stator yoke to the base 22 can be also applied to any other embodiment utilizing the stator yoke.

In the above second preferred embodiment, owing to the non-magnetic spindle hub 11, base 22 and cover 23, the process of fixing the stator yoke to the base 22 and cover 23 becomes necessary. However, if the above spindle hub 11, base 22 and cover 23 are composed of non-magnetic metal, e.g., aluminum having a smaller specific gravity than the conventional soft magnetic material, the above second embodiment has an advantage that the moment of inertia of each of the rotating components such as the spindle hub 11 and rotor magnet 26-3 can be decreased. Further, since the above rotating components are not used for a yoke, there is another advantage in that the thickness of the spindle hub 11, etc., can become smaller than that of the first embodiment as illustrated in FIG. 50.

Figure 52:
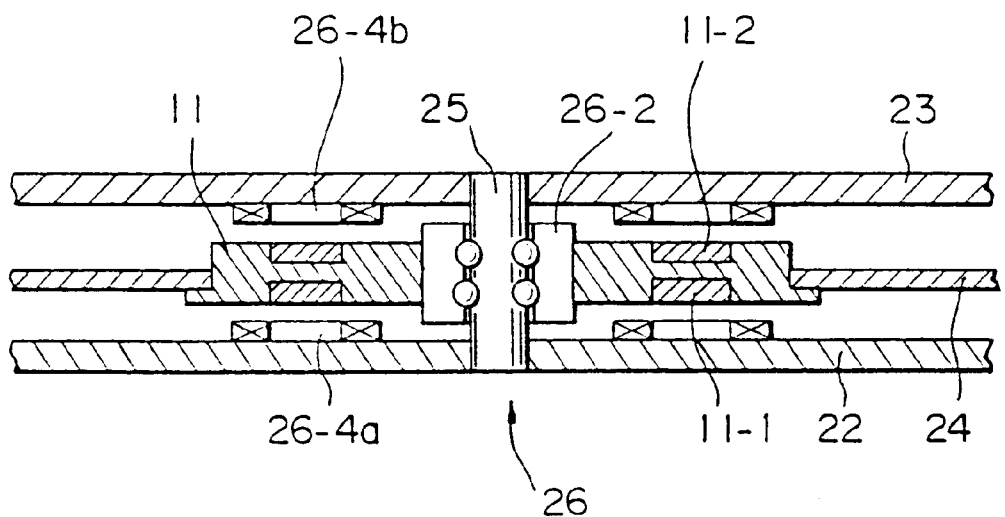
FIG. 52 is a view showing a third preferred embodiment of a whole spindle motor construction of a disk drive according to the present invention.

FIG. 52 is a view showing a third preferred embodiment of a whole spindle motor construction of a disk drive according to the present invention. Also in FIG. 52, the main part of the spindle motor construction is illustrated.

The construction of the above third preferred embodiment is similar to that of the first preferred embodiment as shown in FIG. 50. However, in the third embodiment, different from the first embodiment, two rotor magnets 11-1, 11-2, that are magnetized in the same direction as the axial direction of the fixed shaft 25, are fixed to the lower and upper sides of the spindle hub 11, respectively. Further, the lower stator coil 26-4a is fixed on the upper wall surface of the base 22 inside the housing 21, so that the lower stator coil 26-4a faces the lower rotor magnet 11-1, close to the lower rotor magnet 11-1 with a certain axial gap. On the other hand, the upper stator coil 26-4b is fixed on the lower wall surface of the cover 23, so that the upper stator coil 26-4b faces the upper rotor magnet 11-2, close to the upper rotor magnet 11-2 with a certain axial gap.

As described above, in the above third preferred embodiment, two stator coils 26-4a, 26-4b, and the base 22 and cover 23, both of which serve as a stator yoke, are located in symmetrical positions at the lower and upper sides of the spindle hub 11 in respect to the center of the thickness direction of spindle hub 11, respectively. Therefore, two sources of magnetic attraction that are generated between two rotor magnets 11-1, 11-2 and the respectively corresponding base 22 and cover 23, balance each other out. Consequently, the thrust load of bearing means 26-2 can be reduced and a disk drive having a longer life can be realized.

Further, in the above third preferred embodiment, since two equivalent face-to-face motors exist, a relatively large torque can be attained. Furthermore, the stator coils are arranged to be separated into the lower coil 26-4a and the upper coil 26-4b. Therefore, a sufficiently large torque can be generated in a wake-up operation of the motor by combining the two stator coils, while either one of the stator coils can be separated from the other one and the back electromotive force can be reduced during constant speed rotation of the motor, which leads to the rotation of the disk at a higher rate.

Figure 53:
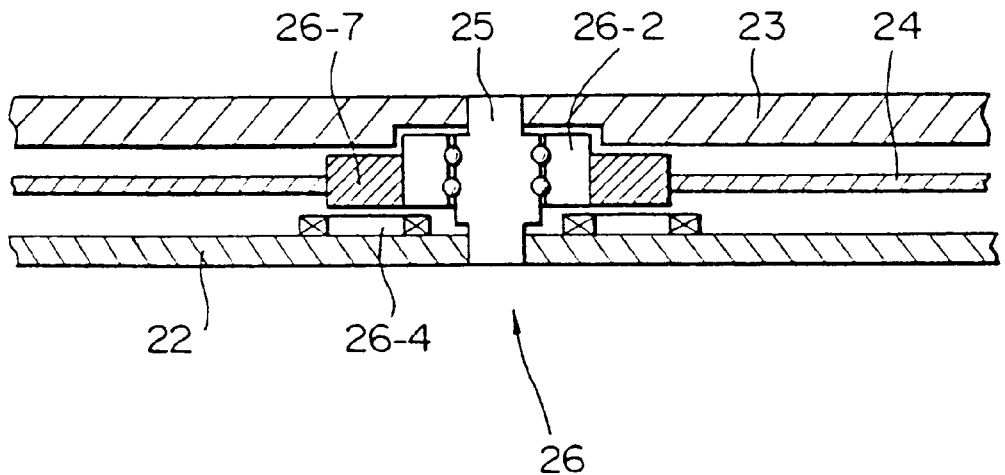
FIG. 53 is a view showing a fourth preferred embodiment of a whole spindle motor construction of a disk drive according to the present invention.

FIG. 53 is a view showing a fourth preferred embodiment of a whole spindle motor construction of a disk drive according to the present invention. Also in FIG. 53, the main part of the spindle motor construction is illustrated.

The construction of the above fourth preferred embodiment is similar to that of the second preferred embodiment as shown in FIG. 51. However, in the fourth embodiment, different from the second embodiment, a rotor magnet 26-7 is made of an annular permanent magnet and the inner peripheral portion thereof is rotatably supported by the fixed shaft 25, not by a spindle hub, via the bearing means 26-2. Further, the outer peripheral portion of the rotor magnet 26-7 is arranged to be fitted into the central hole of the disk 24. In other words, the rotor magnet 26-7 of the fourth embodiment as illustrated in FIG. 53 also serves as the spindle hub.

Further, the cover 23 is made of a soft magnetic material and has a form such that the above cover 23 is as close to the rotor magnet 26-7 as possible, so that the above cover 23 serves as a stator yoke instead of a rotor yoke. In this construction, the elimination of relatively large mechanical components such as the spindle hub can be realized, and therefore a disk drive with smaller dimensions and lower weight can be realized.

Figure 54:
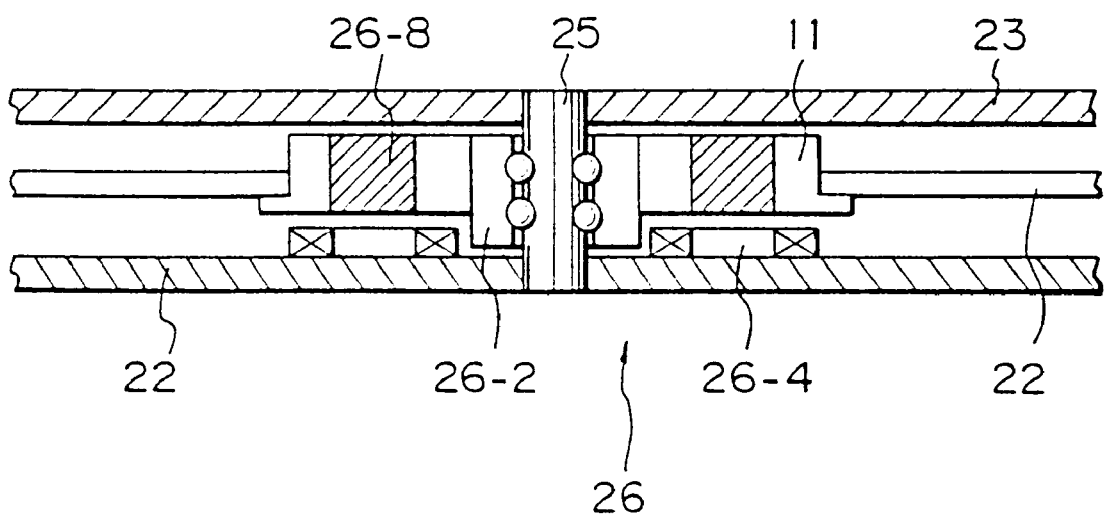
FIG. 54 is a view showing a fifth preferred embodiment of a whole spindle motor construction of a disk drive according to the present invention.

FIG. 54 is a view showing a fifth preferred embodiment of a whole spindle motor construction of a disk drive according to the present invention. Also in FIG. 54, the main part of the spindle motor construction is illustrated.

The construction of the above fifth preferred embodiment is similar to that of the fourth preferred embodiment as shown in FIG. 53. However, in the fifth embodiment, different from the fourth embodiment, a spindle hub 11 has an approximately annular form and is divided into plural sections in the axial direction of the fixed shaft 25. The rotor magnet 26-8 is adhered to the above spindle hub 11 as an intermediate member. Further, the above rotor magnet 26-8 is magnetized in the same direction as the axial direction of the spindle 25. Furthermore, the above rotor magnet 26-7 is constructed to have a thickness such that the upper and lower magnetized surfaces thereof face the cover 23 and the stator coil 26-4, as close to the cover 23 and the stator coil 26-4 as possible, respectively.

The above fifth preferred embodiment of the whole spindle motor construction has the same advantage as other embodiments of the motor construction in that excellent characteristics can be ensured with a smaller size and lower weight than the prior art by virtue of the novel arrangement of the rotor magnet.

Further, it is made easy to support the disk, which is difficult in the fourth embodiment, by utilizing easy machinable materials, and thereby high accuracy in height of the disk can be attained.

Figure 55:
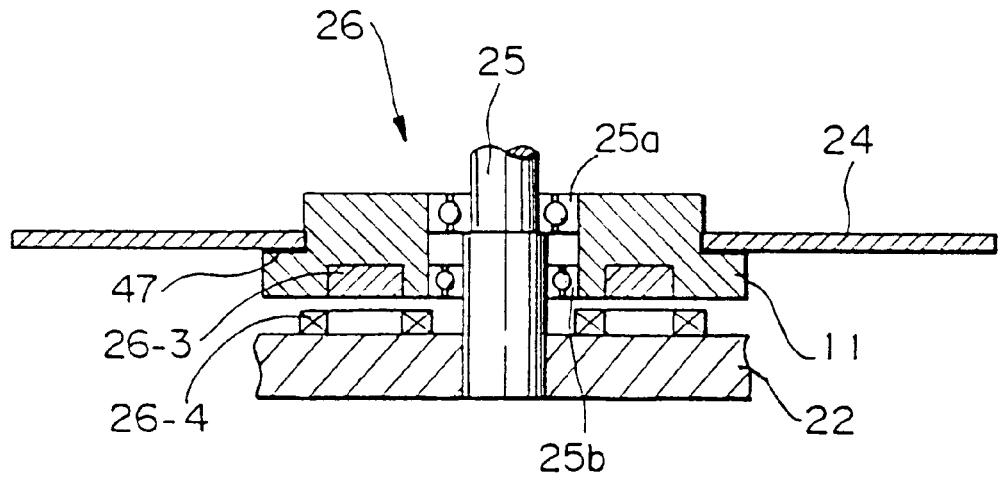
FIG. 55 is a view showing a sixth preferred embodiment of a whole spindle motor construction of a disk drive according to the present invention.

FIG. 55 is a view showing a sixth preferred embodiment of a whole spindle motor construction of a disk drive according to the present invention. In FIG. 55, the main part of the spindle motor construction, especially the main part of the structure for mounting a magnetic disk on a spindle hub illustrated. In this case, a fixed shaft 25, a pair of bearing means 26-2, a rotor magnet 26-3 and a stator coil 26-4 have substantially the same interrelationship as the first preferred embodiment illustrated in FIG. 50 as already described.

In a conventional mounting structure of a magnetic disk, at least one magnetic disk 24 is fixed to a spindle hub 11 by locking clamp means placed on the magnetic disk 24 and attached to the spindle hub 11 by means of screws. On the other hand, in the sixth preferred embodiment as in FIG. 55, the magnetic disk 24 is engaged with a spindle hub 11 via adhesive 47, e.g., light-hardening type adhesive, and is finally fixed to the above spindle hub 11 by curing the adhesive 47 by irradiation with UV (ultraviolet) light, instead of utilizing clamp means and screws.

In this construction, the disk fixing structure can become simpler than the prior art, and some constituent components such as clamp means and screws in the prior art become unnecessary. Therefore, the number of the constituent components can be decreased and space utilized within the housing can be reduced. Consequently, the thickness dimension of the housing 21 can become smaller than the prior art and the whole disk drive can have as compact a size as an IC memory card of Type II according to the PCMCIA.

Figure 56:
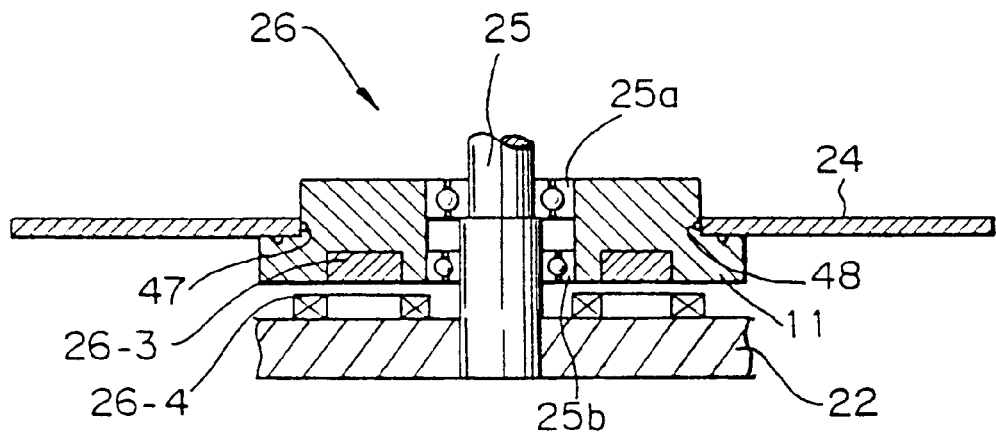
FIG. 56 is a view showing one example of a change in a disk fixing structure in the sixth preferred embodiment as in FIG. 55.
Figure 57:
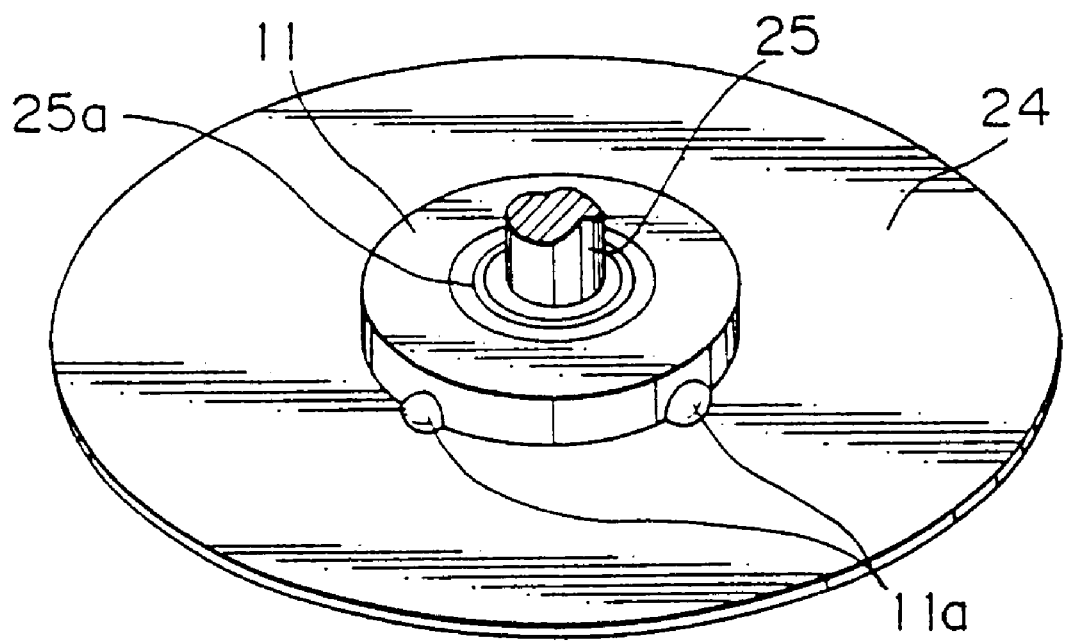
FIG. 57 is a view for explaining means for correcting an imbalance phenomenon in a disk fixing structure.

FIG. 56 is a view showing one example of a change in a disk fixing structure in the sixth preferred embodiment as illustrated in FIG. 55. Also in FIG. 55, only the main part of the spindle motor construction is illustrated.

The construction of the FIG. 56 is similar to that of the sixth preferred embodiment as shown in FIG. 55. However, in this construction, as in the construction of the sixth embodiment, a recessed part 47-1 having a form that allows adhesive 47 to be stored previously, e.g., a triangular section, is provided on the respective adhering surfaces of a spindle hub 11 and a magnetic disk 24, which contact each other. In this case, when the magnetic disk 24 is adhered to the spindle hub 11 by the adhesive 47, such as a light-hardening type adhesive, the above recessed part 47-1 is arranged to be full of a sufficient amount of the adhesive 47. Therefore, it becomes possible for the adhesive strength of the above two adhering surfaces to be increased more than in the case illustrated in FIG. 55.

In each of the disk fixing structures as illustrated in FIGS. 55 and 56, it is necessary that the adhesive 47 be uniformly spread over the whole area of the respective adhering surfaces of the spindle hub 11 and magnetic disk 24, and that it is uniformly fixed over the whole area thereof by equally curing the adhesive 47 by irradiation with UV (ultraviolet) light. In this case, a light-hardening type adhesive is preferably utilized as the adhesive 47. As another example, anaerobic adhesive may be utilized in the region which is not exposed to the air, while another adhesive simultaneously having an anaerobic property and a light-hardening property capable of hardening by irradiation with UV light may be utilized in the region which is exposed to the air.

Further, the form of the recessed part 47-1 is not limited to that of a triangular section described before with reference to FIG. 56. For example, the form of such recessed part 47-1 may be that of a semicircular section, a rectangular form and other various forms. Furthermore, a plurality of recessed parts, each of which has one of the above-mentioned various forms and which are combined into continuous grooved forms as a whole, may be provided alternatively. In this case, it is preferable that the above recessed parts be located so that they can be distributed with respectively equal spaces in respect to the circumferential direction of the fired shaft 25.

As described above, in this construction, the uniform spread of the adhesive 47 on the respective adhering surfaces of the spindle hub 11 and magnetic disk 24 can be ensured and also uniform fixing by curing the adhesive 47 of the above respective adhering surfaces can be ensured, and further the uniform distribution of a plurality of recessed parts can be performed. Therefore, when the spindle hub 11 to which the magnetic disk 24 is fixed rotates, a disadvantageous imbalance phenomenon in which the bearing means 26-2 vibrate due to the nonuniformity of the adhesive 47 in fastening together the above respective adhering surfaces, unequal distribution of recessed parts and the like, can be reduced to a minimum level.

Further, if the above imbalance phenomenon may occur when the spindle hub 11 rotates with the magnetic disk 24, in a first step, rotating components such as the spindle hub 11 can be placed on a test mount of an apparatus for testing the degree of imbalance in such a manner that the occurrence of the vibration of the spindle hub 11 is not restricted. In a second step, some positions in the adhering surfaces, in which the above imbalance must be corrected, are determined by evaluating the direction of imbalance (phase angle) and the amount of imbalance. In a third step, as typically illustrated in FIG. 57, a required amount of weight correcting elements 11a made of light-hardening resin, thermohardening resin or the like are attached to the above determined positions on the adhering surfaces other than the recording regions on the magnetic disk 24. In a fourth step, the above correcting weight elements 11a are cured by means of UV light, high temperature or the like. In this case, to adjust the value of specific gravity of the weight correcting elements 11a, metal powder, etc., is preferably mixed with the above resin. Finally, by virtue of the cured resin serving as the correcting means, the imbalance phenomenon can be securely suppressed.

Figure 58:
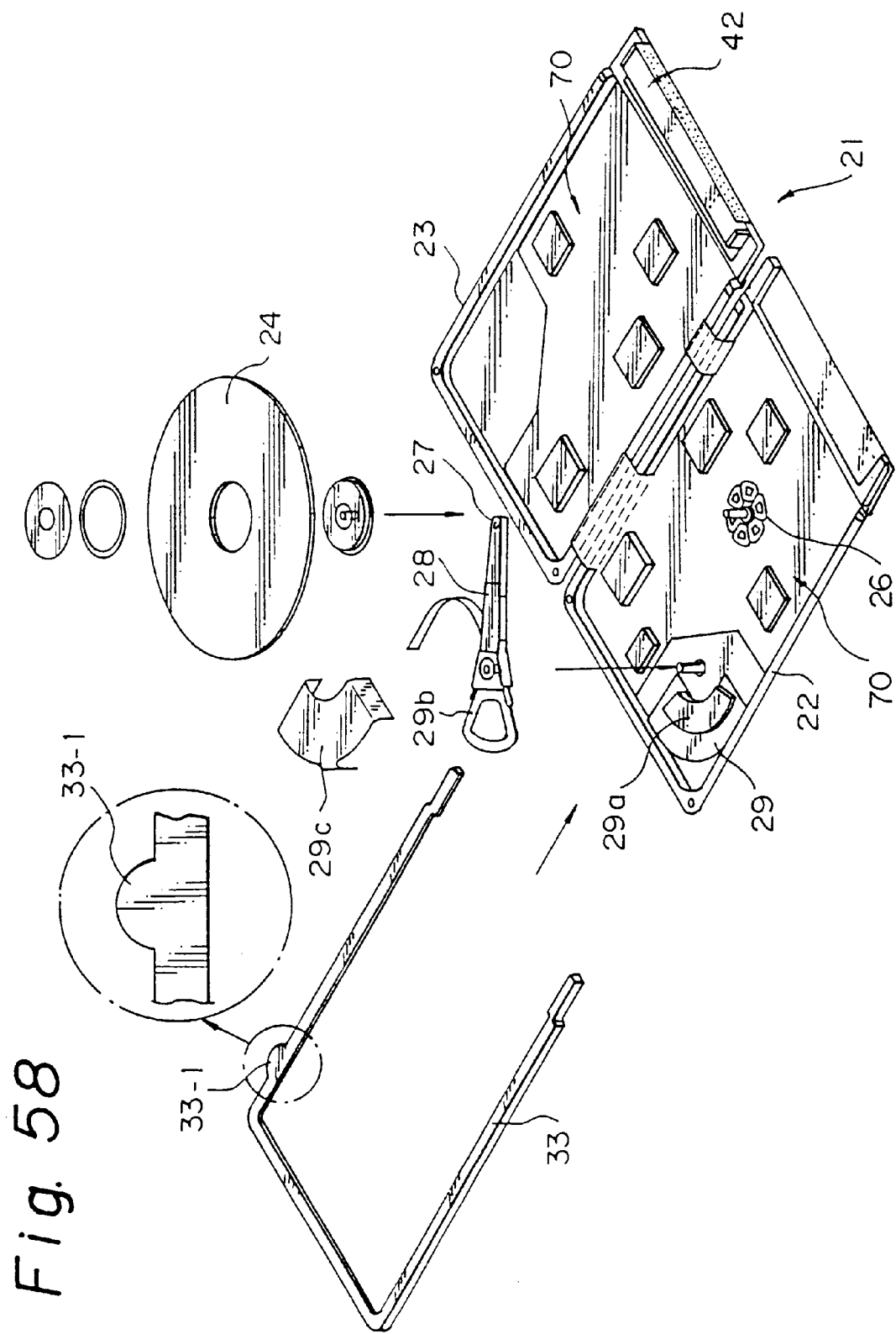
FIG. 58 is a view showing a first example of a change in a frame illustrated in FIG. 38.

FIG. 58 is a diagram illustrating a modified example of the frame of FIG. 38. In FIG. 58, a portion of the U-shaped frame 33 of FIG. 38 is emphasized in a circle of a dot-dash chain line.

In the magnetic disk drive constitution of the present invention, the magnetic disk drive is considerably firmly supported by the connector 42. However, a gap inevitably exists between the housing 21 of the magnetic disk drive and the frame that works as an insertion guide portion for inserting the magnetic disk drive in the external host computer. Therefore, after insertion of the housing 21 into the slot of the host computer, if a read/write operation across a plurality of the trucks is carried out very frequently and vigorous seek movement (movement of the head) is performed, the magnetic disk drive also moves vigorously due to the reaction caused by the motion of the magnetic head. Therefore, there may generate abnormal noise. In order to avoid generation of abnormal noise, therefore, it becomes necessary to minimize the looseness between the housing and the frame.

Figure 59:
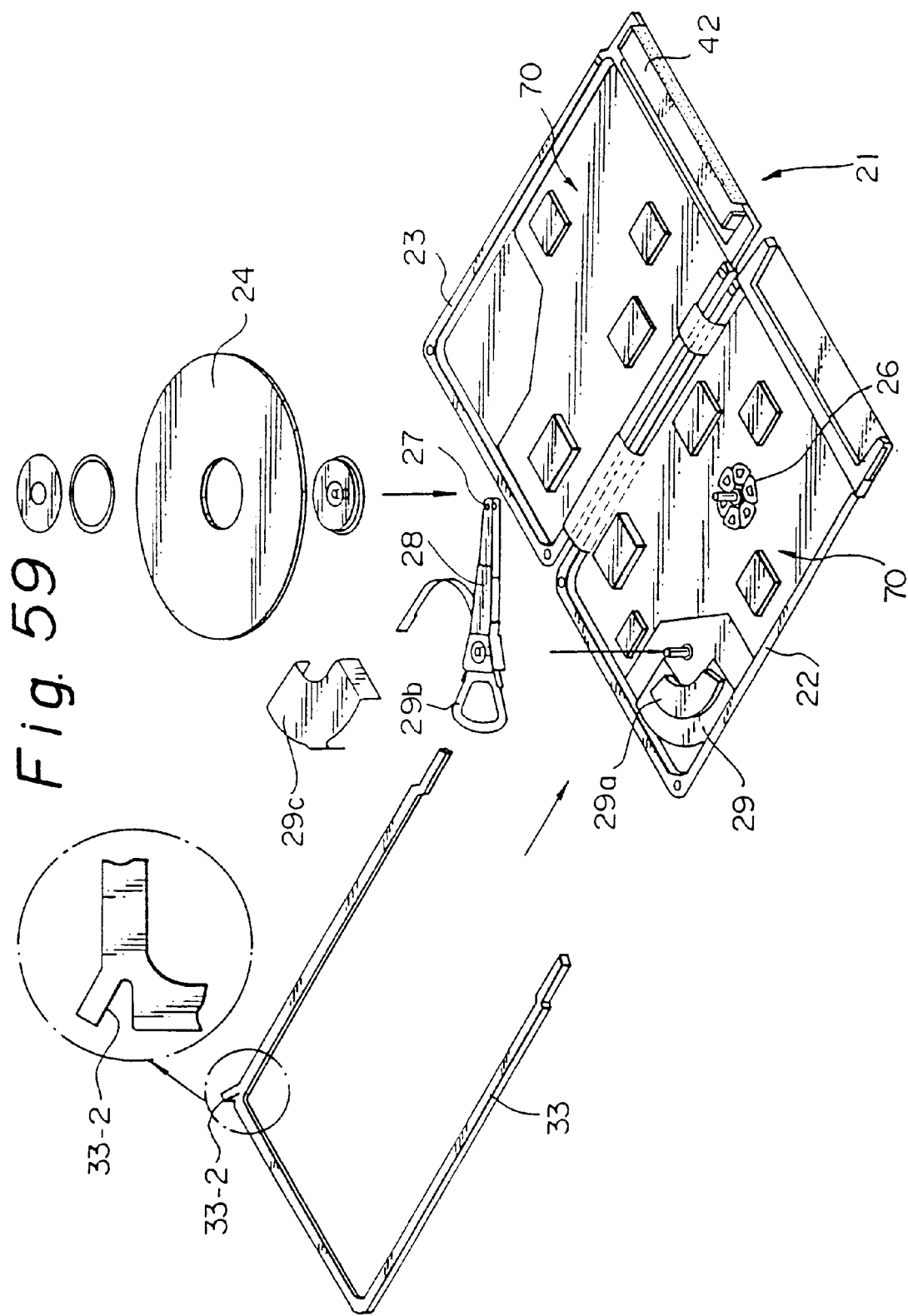
FIG. 59 is a view showing a second example of a change in a frame illustrated in FIG. 38.
Figure 60:
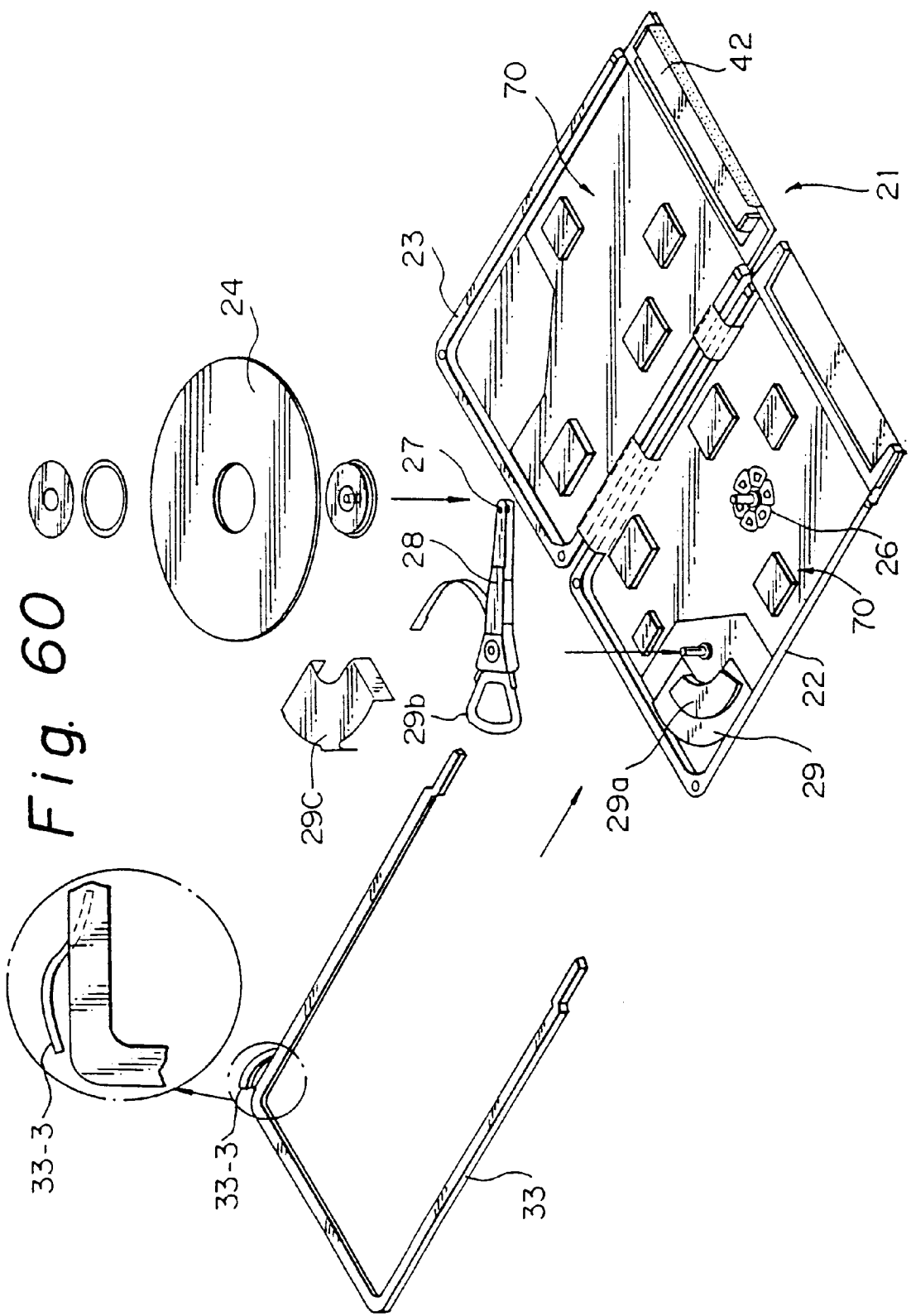
FIG. 60 is a view showing a third example of a change in a frame illustrated in FIG. 38.

In order to substantially suppress the looseness in FIG. 58, a protruded portion 33-1 which slightly protrudes beyond the line of the whole outer shape is formed on a portion of the frame 33 (shown in a circle of a dot-dash chain line on an enlarged scale). The protruded portion 33-1 is formed on only a portion of the frame 33 and can have a function like that of a spring. In this case, the protruded portion 33-1 should be positioned on the outer side (opposite side to the insertion) as much as possible, so that the frame 33 is not caught at the inlet of the slot when the housing 21 is inserted, and the frame 33 must be as soft as possible for the slot. In order to make the frame 33 further soft, a slit 33-2 may be formed on the inside of the protruded portion as shown in FIG. 59. As shown in FIG. 60, further, a resilient means 33-3 such as a thin metallic leaf spring may be insert-molded in the frame 33 made of a plastic member in order to completely absorb the looseness.

The resilient means 33-3 should be inserted in the direction of the inner surface from the viewpoint of its function. In practice, however, the similar effect can be obtained even when it is inserted in the up-and-down direction because of the force of friction.

Figure 61:
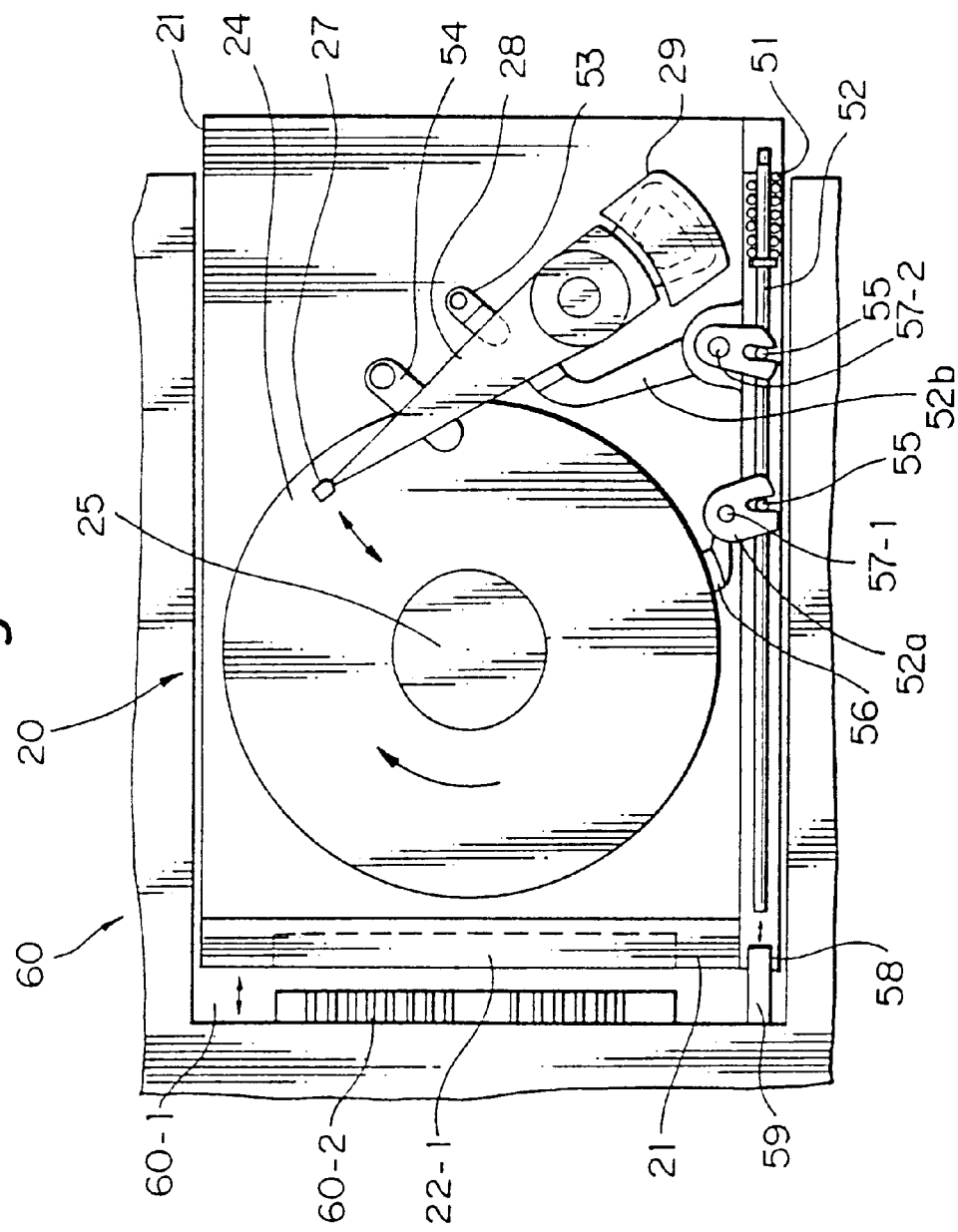
Figure 62:
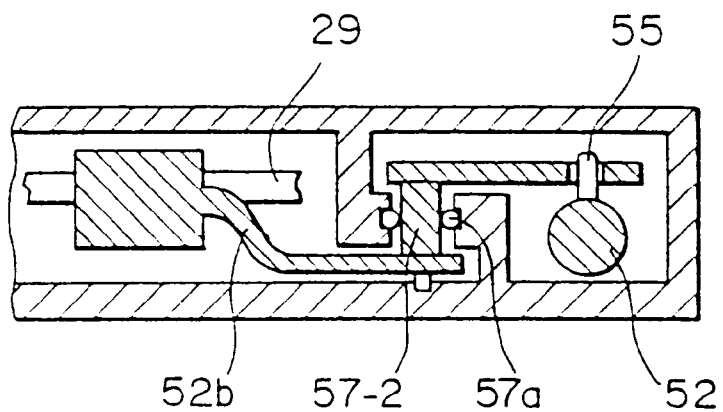
Figure 63:
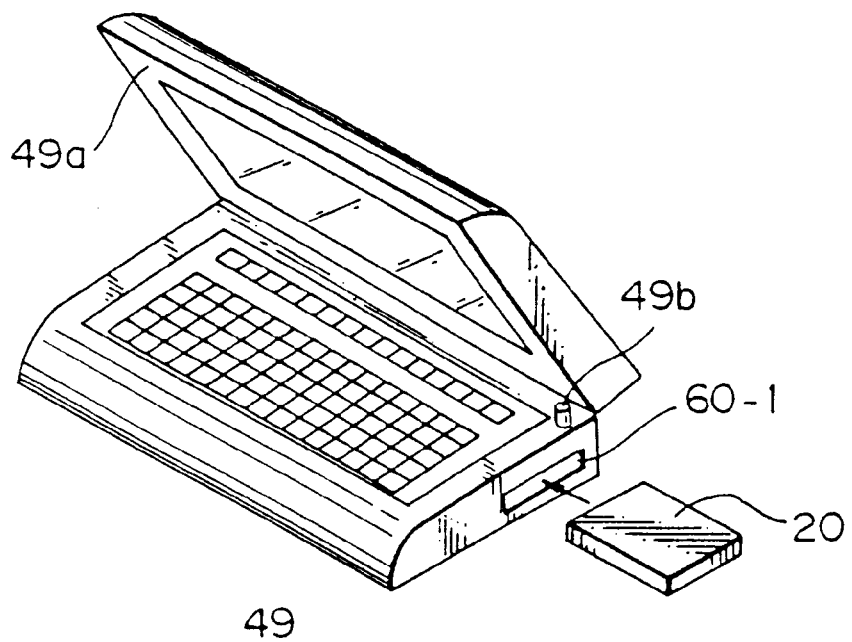
Figure 64:
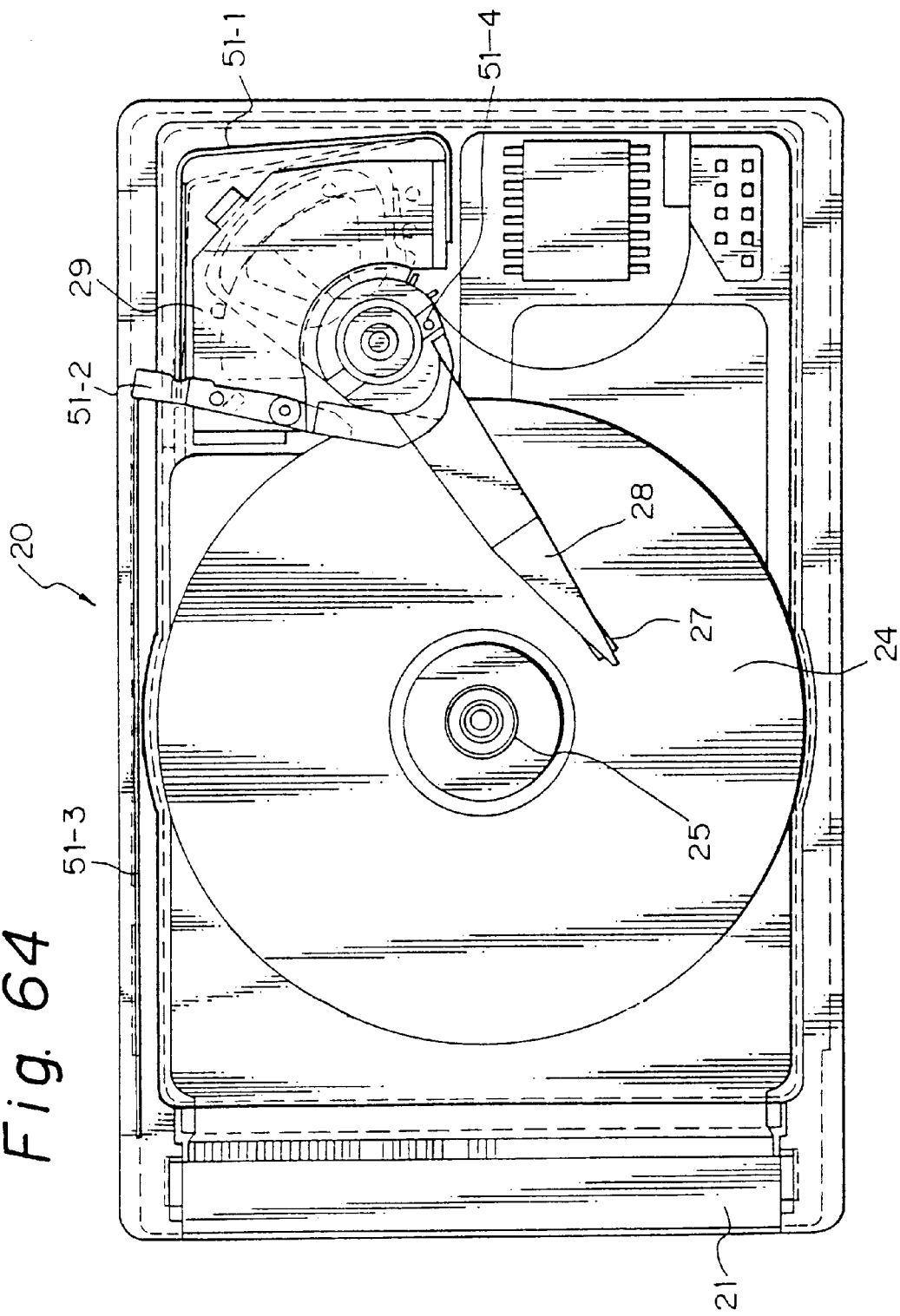
Figure 65:
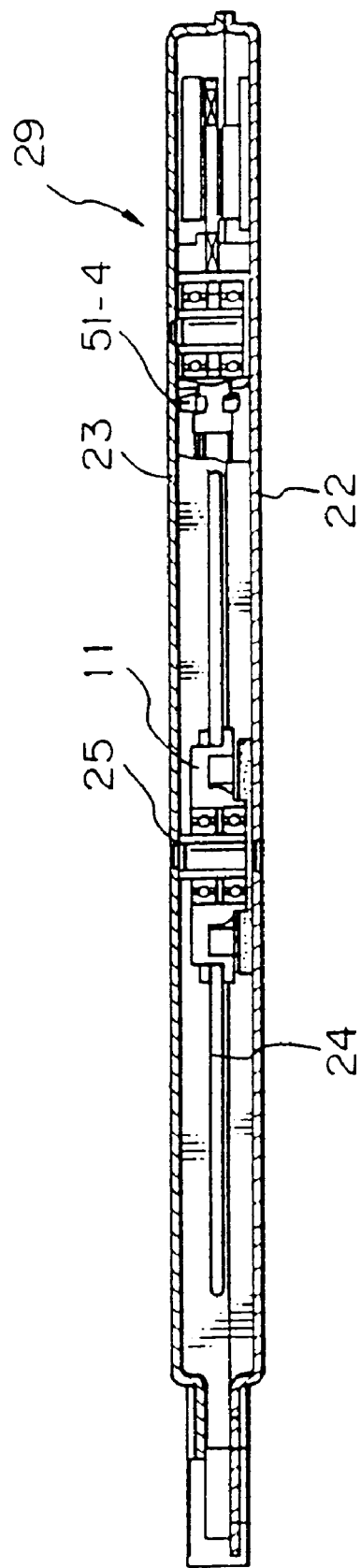
Figure 66A:
Figure 66B:
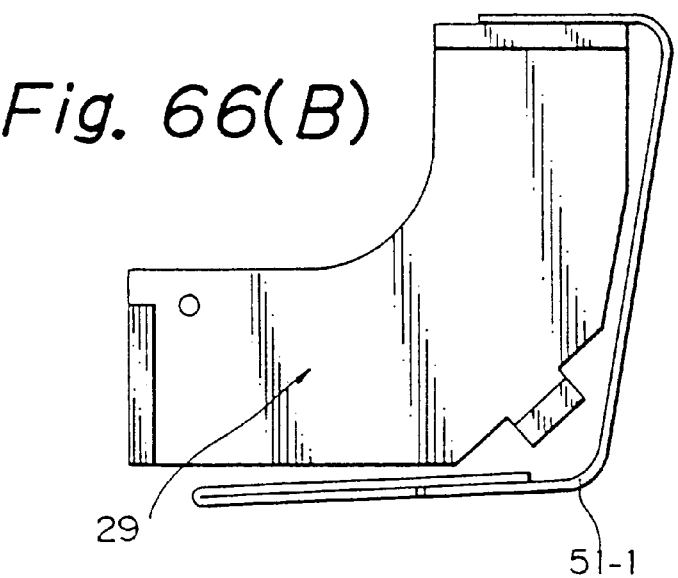
Figure 66C:
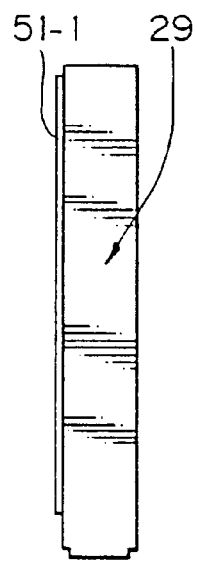

FIGS. 61 to 67 are diagrams illustrating a locking structure of the head assembly in the magnetic disk drive of the present invention. If described in further detail, FIG. 61 is a plan view which schematically illustrates the locking structure of the head assembly of the present invention, FIG. 62 is a sectional view showing partly on an enlarged scale the sealing structure for the interior of the housing and the region where the rod is disposed, FIG. 63 is a perspective view explaining the inserting/removing operations of the magnetic disk drive for the personal computer, FIG. 64 is a plan view which explains in detail a second locking structure of the head assembly of the present invention, FIG. 65 is a front view showing partly in cross section the second locking structure of the head assembly of the present invention, FIGS. 66(A), 66(B) and 66(C) are a plan view, a front view and a side view of constituent parts that directly engage with the locking of the actuator, and FIGS. 67(A) and 67(B) are a plan view and a front view which illustrate in detail and partly in cross section the structure of the rod.

Even in FIGS. 61 to 64 like in the above-mentioned case, there are arranged in the housing 21 a piece of magnetic disk 24 that is mounted on the spindle 12 and a head-positioning actuator 29 that supports, via a support spring (not shown) and an arm 28, the magnetic head 27 which records and reproduces information to and from the magnetic disk 24.

Near the outer circumference of the magnetic disk 24 are arranged a load/unload member 54 which performs a loading or unloading of the magnetic head 27 relative to the magnetic disk 24, and a stopper 53 which locks the actuator 29 near the outside of the arm 28 when the magnetic head 27 is unloaded. On a side portion along the magnetic disk 24 and the actuator 29, there is disposed a rod 52 that works as a drive bar having a coil spring 51 attached at its one end and that moves in the lengthwise direction thereof as indicated by arrow. The aforementioned loading/unloading operations are carried out being interlocked to the inserting/removing operations at the time when the housing 21 of the magnetic disk drive is inserted in or removed from the slot 60-1 of the external host equipment 60 (FIG. 61).

Furthermore on the rod 52 with coil spring 51 are supported, via support shafts 57-1 and 57-2, a first lock lever 52a having a pad 56 that is made of a rubber and that works as a packing for locking the magnetic disk being interlocked to the motion of the rod 52 in the lengthwise direction thereof, and a second lock lever 52b which pushes the arm 28 onto the stopper 53, the first lock lever and the second lock lever being linked to each other by two protruded pins 55. If concretely described, the rod 52 is installed inside the frame 33 (see FIGS. 58 to 60) mounted on the outer periphery of the housing 21, and the end of the rod protrudes to the side position of the connector terminal 22-1.

On the outer side surface of the housing 21 are provided an operation hole 58 for pushing the other end of the rod 52 to actuate it, and the connector terminal 22-1 that works for inputting and outputting data or signals and supplying power. The thus constituted disk drive 20 can be removably inserted in the slot 60-1 of the host computer 49 (FIG. 63) or the like equipment that has a connector terminal 60-2 which corresponds to the connector terminal 22-1 and an operation protrusion 59 that pushes the other end of the rod 52 to actuate it, which are formed on the inner end surface thereof.

The interior of the housing 21 and the region where the rod 52 is disposed are sealed by fitting an O-ring 57a to the support shaft 57-2 that supports the second lock lever 52a as shown in a partly enlarged sectional view of FIG. 62. Therefore, the interior of the housing 21 is air-tightly shut off from the open air.

When the disk drive 20 is inserted in the slot 61 of the host computer 49 as shown in FIG. 63, the connector terminal 60-2 on the side of the slot 60-1 is connected to the connector terminal 22-1 on the side of the disk drive 20 as clearly shown in FIG. 61. Further, the operation protrusion 59 of the side of the slot 60-1 pushes the other end of the rod 52 of the side of the magnetic disk drive 20. Being interlocked to this pushing operation, the magnetic disk 24 is slightly turned, and the arm 28 which supports the magnetic head 27 in an unloaded condition on the load/unload member 54 is pushed onto the stopper 53. Then, the second lock lever 52b locking the actuator 29 and the first lock lever 52a having pad 56 that is pressing and locking the magnetic disk 24 are rotated in the directions to liberate the locked condition. Therefore, the magnetic disk 24 is rotated, the magnetic head 27 is loaded, and the memory becomes accessible.

When the disk drive 20 is taken out from the slot 60-1, the rod 52 moves toward the operation hole 58 being urged by the coil sprint 51, and the first lock lever 52a having pad 56 and the second lock lever 52b are turned being interlocked thereto. By this, the magnetic disk 24 is prevented from rotating by the pad 56 mounted on the first lock lever 52a. The head arm 28 supporting the magnetic head 27 is pushed onto the stopper 53 by the second lock lever 52b, whereby the magnetic head 27 is unloaded on the load/unload member 54 and, at the same time, the actuator 29 is locked.

Moreover, the magnetic disk 24 and the actuator 29 may be locked and unlocked by a mechanism which is shown, for example, in FIG. 63 in which when a closure 49a of the host computer 49 is closed with the disk drive 20 being inserted in the slot 60-1 of the host computer 49, a protruded pin 49b is depressed to actuate the rod 52 on the side of the disk drive 20 so that the magnetic disk 24 and the actuator 29 are locked, and when the closure 49a is opened, the protruded pin 49b is liberated from the depressed condition to liberate the locked condition.

In this case, the opening portion of the slot 60-1 of the host computer may be provided with a closure that opens and closes being interlocked to the operation for inserting and removing the disk drive 20. The above-mentioned locking mechanism makes it possible to insert or remove the disk drive in or from such equipment as a host computer while enabling the interior of the magnetic disk drive to be hermetically sealed from the external atmosphere. Being interlocked to the inserting and removing operations, furthermore, the magnetic head can be loaded and unloaded and, furthermore, the disk and the actuator can be locked and unlocked. Therefore, the disk drive is protected from sudden shocks that may develop when the host computer is being handled or carried. Thus, there is provided an IC memory card-type disk drive featuring excellent advantages in safety and reliability.

A second embodiment of the mechanism for locking the magnetic head 27 will now be described in conjunction with FIGS. 64 to 67.

In FIGS. 64 and 65, reference numeral 51-1 denotes a leaf spring, 51-2 denotes an operation lever and 51-4 denotes a pin. When the housing 21 of the magentic disk drive 20 is inserted in the host computer 49, the rod 52 (FIG. 61) such as a push lever 51-3 is depressed, and the operation lever 51-2 moves and the actuator 29 is allowed to move, too. Therefore, the magnetic head 27 assumes the loaded condition and the memory becomes accessible. When the housing 21 is pulled out from the host computer, furthermore, the actuator 29 returns to the initial position due to the restoring force of the leaf spring 51-1, and the magnetic head 27 assumes the unloaded condition.

The card-type magnetic disk drive 20 will encounter the severest condition in which it is likely to be damaged when the magnetic disk drive that is being transported is inadvertently fallen. In order to cope with the case when the magnetic disk drive is fallen that creates the severest condition, a mechanism is employed which effects the locking when the housing 21 is removed from the slot as described earlier. That is, the straight rod 52 supported by a spring such as leaf spring is arranged by the side of the connector so that, when the housing 21 is removed from the slot 60-1, the rod 52 displaces toward the outer side due to the restoring force of the leaf spring or a like spring, and that the locking is effected by the residual pressure of the spring. By taking into consideration the imaginary rotational angular acceleration at the time of falling, the pre-load is selected to produce a pre-load moment that is not smaller than a torque produced by the pre-load moment of inertia of the actuator 29. Concretely speaking, the device is so designed that the actuator 29 does not move even when when an acceleration of 1000 G (122000 rad/s² reckoned as an angular acceleration) is applied to a corner of the long side of the card with its opposite corner being fixed.

The rod 52 extends along the frame 33 from a portion of the connector 42 through up to the side portion of the actuator 29. In this case, one end of the rod 52 is designed to appear in a trench close to the connector, which trench is defined as one for preventing erroneous insertion according to the specification of PCMCIA, and when an insertion is made to the slot according to the specification of PCMCIA, the end of the rod is pushed. The rod 52 is provided with a partly arcuate under-cut semi-circular hole (see L—L cross section of FIG. 67(B)) formed in a resin molded part such as the frame 33, and the rod 52 is guided through this semi-circular hole and a hole which is constituted by the peripheral edge of the base 22 (see K—K cross section of FIG. 67(B)). The side portion of the cover is partly cut away to form a hole through which the operation lever 51-2 extends from the side of the actuator 29 to come in contact with a rod 82. The operation lever 51-2 is pushed to the side of the connector 42 by the leaf spring 51-1 located at the back of a magnetic circuit that will be described later. The rod 52 has a center of rotation by the side of the magnetic circuit and has a sickle-shaped end which pushes the actuator 29 to lock it. When the rod 52 is under the liberated condition, the pre-load pressure of the leaf spring 51-1 causes the magnetic head 27 to be pushed and locked on the outer side. When the housing 21 is inserted in the slot 60-1, on the other hand, the rod 52 is rearwardly pushed out so that the operation lever 51-2 is moved in the direction of liberating the locked condition. Here, the load required for the insertion overcoming the spring is about 100 g which is a value that brings about no problem compared with the load for inserting the connector or the load for holding the connector. In the case of the structure having a reduced thickness as in the present invention, the operation lever 51-2 is very close (in the order of 0.1 mm) to the rotary portion of the actuator 29, and may come in contact therewith. To eliminate the probability of contact, therefore, the end of the rod 52 has been urged to be pressed onto the base 22 or the cover 23. This makes it possible to eliminate the above-mentioned probability of coming in contact irrespective of tolerance in size.

Figure 68:
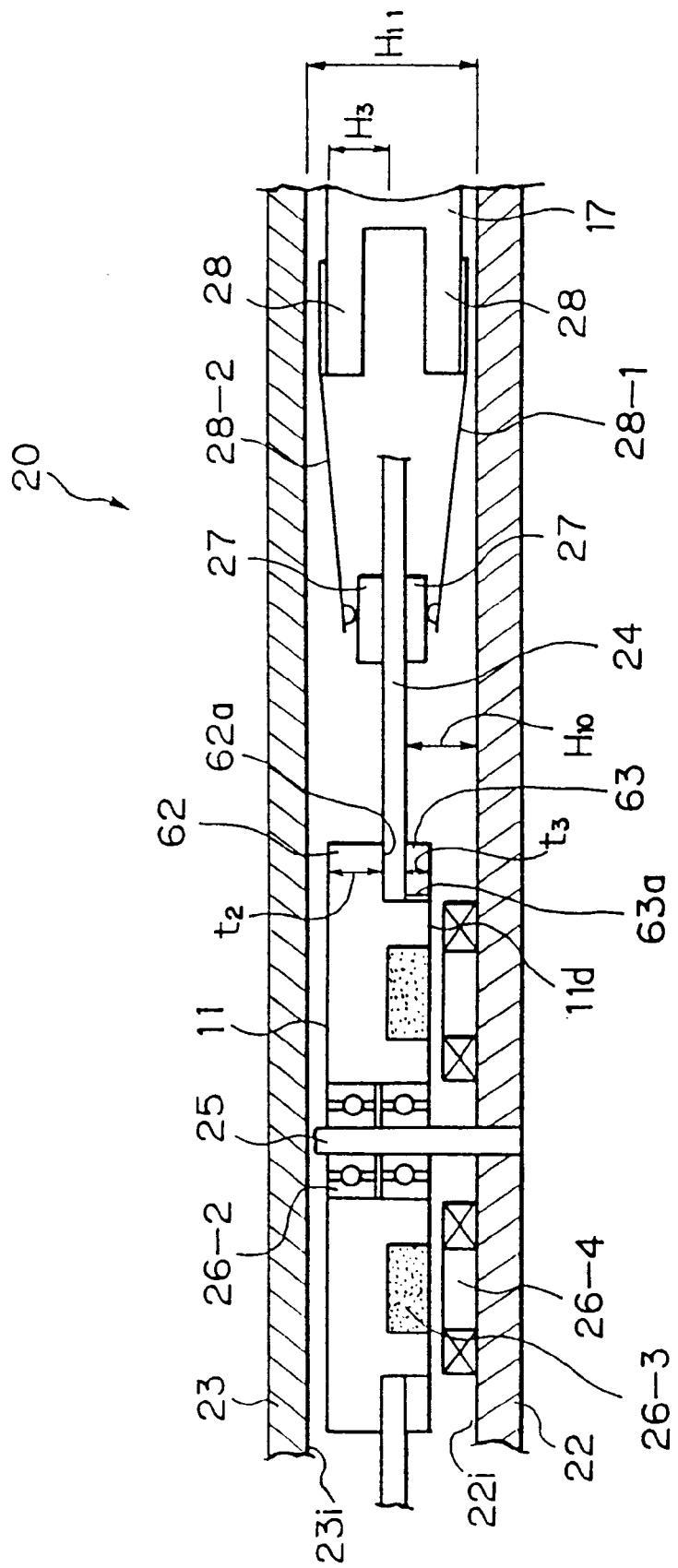
FIG. 68 is a view showing a first preferred embodiment of a spindle motor construction that allows a disk to be fixed in reverse in a disk drive according to the present invention.

FIG. 68 is a front view showing in cross section a first preferred embodiment of the structure of a spindle motor that is capable of reversely fastening the magnetic disk in the magnetic disk drive according to the present invention. FIG. 68 shows major portions only of the constituent parts to illustrate the feature in that the magnetic disk is mounted on the side of the stator coil.

Here, reference is made again to FIG. 42 to closely describe the structure of mounting the magnetic disk 24 on the surface of the side opposite to the stator coil 26-4 of the hub 11, thereby to clarify the difference from FIG. 68.

In FIG. 42, first, the magnetic disk 24 that is to be locked is mounted on the outer peripheral flange portion of the hub 11. Here, since a stepped portion 11' has been formed on the hub 11, the magnetic disk 24 that is mounted forms a recessed portion. Next, an adhesive agent 19' such as an aerophobic adhesive agent is poured into the recessed portion, and an adhesion ring 19 is mounted on the magnetic disk 24 so as to come in contact with both the adhesive agent 19' and the upper surface of the magnetic disk 24. Under this condition, the adhesive agent 19' is cured so that the disk 24 is firmly secured to the hub 11.

Described below are the reasons why the adhesion ring 19 is dared to be used.

A first reason is that ever when the adhesive agent 19' is erroneously applied to the surface of the magnetic disk 24, the disk surface for effecting the reproducing/recording operations cannot be utilized.

A second reason is that the adhesion ring 19 works to prevent the adhesive agent 19' from flowing to the outer peripheral portions of the magnetic disk 24 where the magnetic head 29 exists.

A third reason is that when the adhesive agent 19' is an aerophobic adhesive agent, the adhesive agent 19' that happens to flow on the surface of the disk does not undergo curing except under the portion of the adhesion ring 19 and, thus, the motion of the magnetic head 27 is not affected.

A fourth reason is that the inner circle of the disk is adhered to the spindle hub 11, and furthermore the upper surface of the disk, the adhesion ring 19' and the spindle hub 11 are adhered together instead of adhering the magnetic disk 24 to the flange portion of the spindle hub 11. This makes it possible to precisely control the height of mounting the magnetic disk.

The above-mentioned fastening by using the adhesion ring 19 is different from the conventional push-fastening using a clamp member with respect to that the pre-load cannot be applied in the direction of holding. That is, in an ordinary push-fastening, a resilient member (inclusive of a screw) is used to hold the disk 24, the resilient member having resiliency in the direction of pushing the magnetic disk. In the adhesion-fastening using an adhesive agent of the present invention, however, the pre-load pressure cannot be applied since the adhesive agent undergoes creeping. Because of this reason, it is important to well control the thickness at a moment when the adhesive agent is cured.

In contrast with the method of adhesion-fastening the disk 24 on the surface of the side opposite to the stator coil 26-4 of the spindle hub 11, FIG. 68 employs a method of fastening the magnetic disk on the surface that faces the stator coil 26-4 of the spindle hub 11.

In FIG. 68, the spindle hub 11 has a flange portion 62 on the side opposite to the stator coil 26-4, and the support surface 62a faces the side of the stator coil 26-4. Further, the spindle hub 11 has a clamp margin 63a that will fit to a damper 63 on the side of the stator coil 26-4.

The flange portion 62 has a thickness $t_2$ which is large enough not to be warped during the machining.

The magnetic disk 24 is supported on the support surface 62a of the flange portion 62, is clamped by a damper 63 that is forcibly inserted from the side of the stator coil 26-4, and is secured to the spindle hub 11. The flange portion 62 has a sufficiently large rigidity, and the support surface 62a is formed maintaining a good dimensional precision. Therefore, the magnetic disk 24 is precisely fastened, and the recording and reproducing operations are favorably carried out.

The clamper 63 is simply to hold the magnetic disk 24 and may have a relatively small thickness. The clamper 13 is in flush with the lower surface 11d of the spindle hub 11.

Owing to the above-mentioned structure, the height $H_{10}$ from the upper surface 22i of the base 22 to the magnetic disk 24 can be decreased to be smaller than that of the above-mentioned case of FIG. 42.

The flange portion 62 is located at a position corresponding to the arm support portion 17 in the direction of height, and the thickness $t_2$ of the flange portion 62 is within the height $H_3$ of the upper half of the arm support portion 17. Therefore, the height $H_{11}$ between the base 21 and the cover 23 corresponds to the sum $(H_{10}+H_3)$ he height $H_{10}$ and the height $H_3$, and this sum can be decreased to be smaller than that of the case of FIG. 42. It is expected that the magnetic disk drive of FIG. 68 can be realized having a thickness smaller than that of FIG. 42.

In this case, furthermore, the magnetic disk 24 is arranged nearly at the center in the direction of thickness of the housing 21 and is, hence, allowed to rotate maintaining good balance to a sufficient degree.

Figure 69:
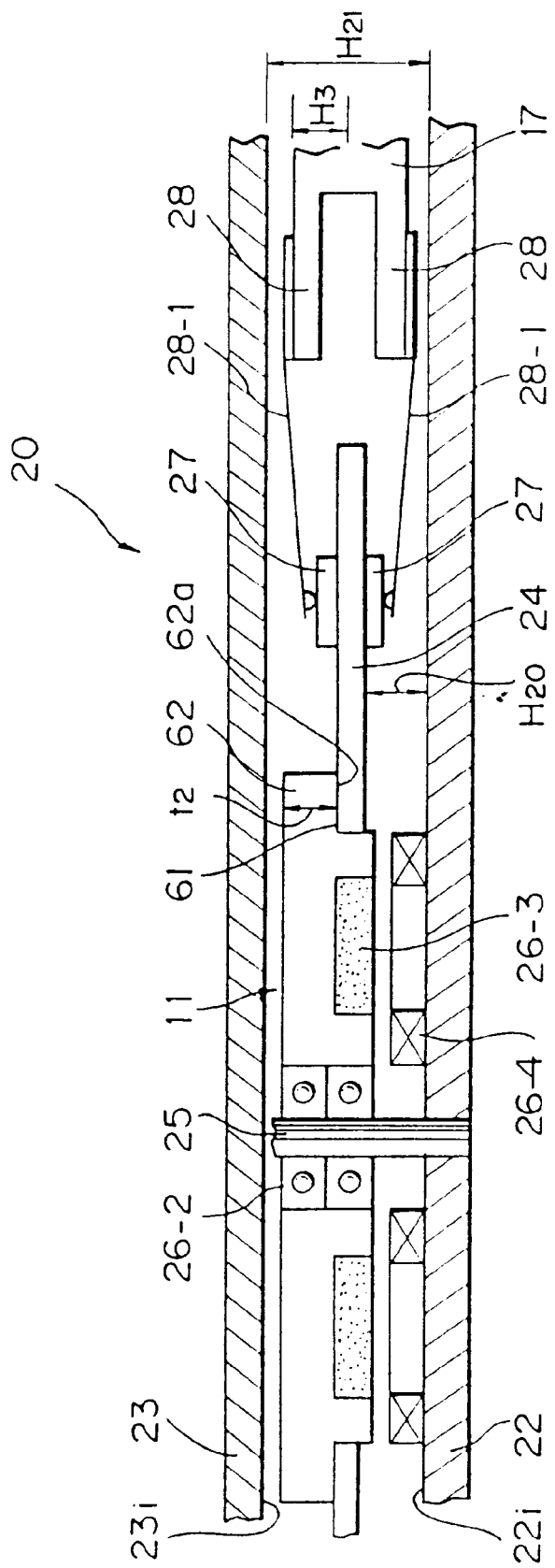
FIG. 69 is a view showing a second preferred embodiment of a spindle motor construction that allows a disk to be fixed in reverse in a disk drive according to the present invention.

FIG. 69 is a front view illustrating in cross section a second favorable embodiment of the structure of the spindle motor that is capable of reversely fastening the magnetic disk in the magnetic disk drive of the present invention.

This embodiment does not employ the clamper 63 of FIG. 68 in order to further decrease the thickness. In FIG. 69, the portions corresponding to the constituent portions of FIG. 68 are denoted by the same reference numerals. Here, the spindle hub 11 has substantially the same construction as the spindle hub 11 of FIG. 68 except that the clamp margin 63a of FIG. 68 is eliminated. Concretely speaking, the spindle hub 11 has the flange portion 62 and the support surface 62a. The magnetic disk 24 is fitted to the spindle hub 11, is positioned in contact with the support surface 62a, and is adhered with an adhesive agent 61 so as to be fastened maintaining good precision.

Therefore, the height $H_{20}$ from the upper surface 22i of the base 22 to the magnetic disk 24 becomes smaller than the corresponding height $H_{10}$ of FIG. 68 by the height of the clamp margin 63a. That is, the height $H_{21}$ between the base 22 and the cover 23 corresponds to the sum ($H_{20}+H_3$) of the above-mentioned height $H_{20}$ and the above-mentioned height $H_3$, which is smaller than the height $H_{11}$ of FIG. 68. Accordingly, the magnetic disk drive of FIG. 69 becomes thinner than the magnetic disk drive of FIG. 68.

Figure 70:
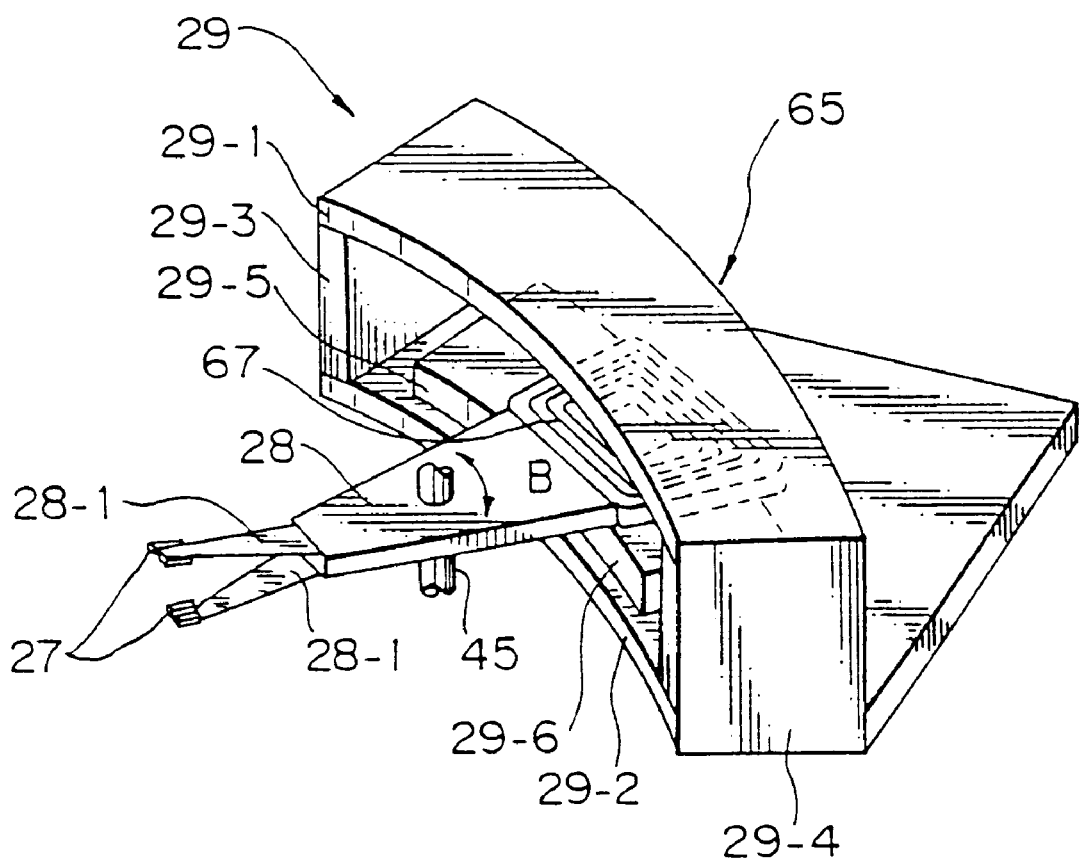
FIG. 70 is a view showing a first preferred embodiment of an actuator construction of a disk drive according to the present invention.

FIG. 70 is a perspective view illustrating a first favorable embodiment of the structure of the actuator in the magnetic disk drive according to the present invention.

In FIG. 70, the arm 28 has an arm end 28-1 for holding at its end the magnetic head 27 as mentioned earlier, and is disposed to rotate in the direction of arrow B with a second fixed shaft 45 as a center, and has a flat coil 67 attached to the rear end thereof. A pair of permanent magnets 29-5 and 29-6 are arranged near the flat coil 67. Furthermore, an edge portion on the side of the arm 28 is curved in the direction of width, and a central portion of an edge portion on the side opposite to the above edge portion is protruded in a cornered shape to form a lower yoke 29-2 which can be arranged at the corner of the disk drive efficiently utilizing the space in the magnetic disk drive. There is further provided an upper yoke 29-1 of a curved shape having ordinary width. The upper and lower yokes 29-1 and 29-2 are magnetically coupled together at their both sides by using side yokes 29-3 and 29-4 maintaining a predetermined distance. The flat coil 67 moves in a gap between the upper yoke 29-1 and the pair of permanent magnets 29-5, 29-6 in a magnetic circuit 65 constituted by the above yokes, and thus a drive coil motor (DCM) is constituted.

In the actuator of this embodiment as mentioned above, the lower yoke 29-2 has a broad central portion in which the magnetic flux density becomes great as the magnetic flux directly passes from one permanent magnet 29-5 to the other neighboring permanent magnet 29-6 in the magnetic circuit 67. Furthermore, the sectional area is increased by increasing the area of the lower yoke 29-2. Therefore, the problem of magnetic flux saturation is eliminated even when the thicknesses of the lower yoke 29-2 and the upper yoke 29-1 are decreased, making it possible to suppress the drop in the magnetic flux density across the gap which is caused by the leakage of magnetic flux due to magnetic flux saturation.

The lower yoke 29-2 having the above-mentioned shape enables the actuator 29 to be installed at the corner in the magnetic disk drive to efficiently utilize the space, and the disk drive as a whole can be constructed in a compact size.

Figure 71:
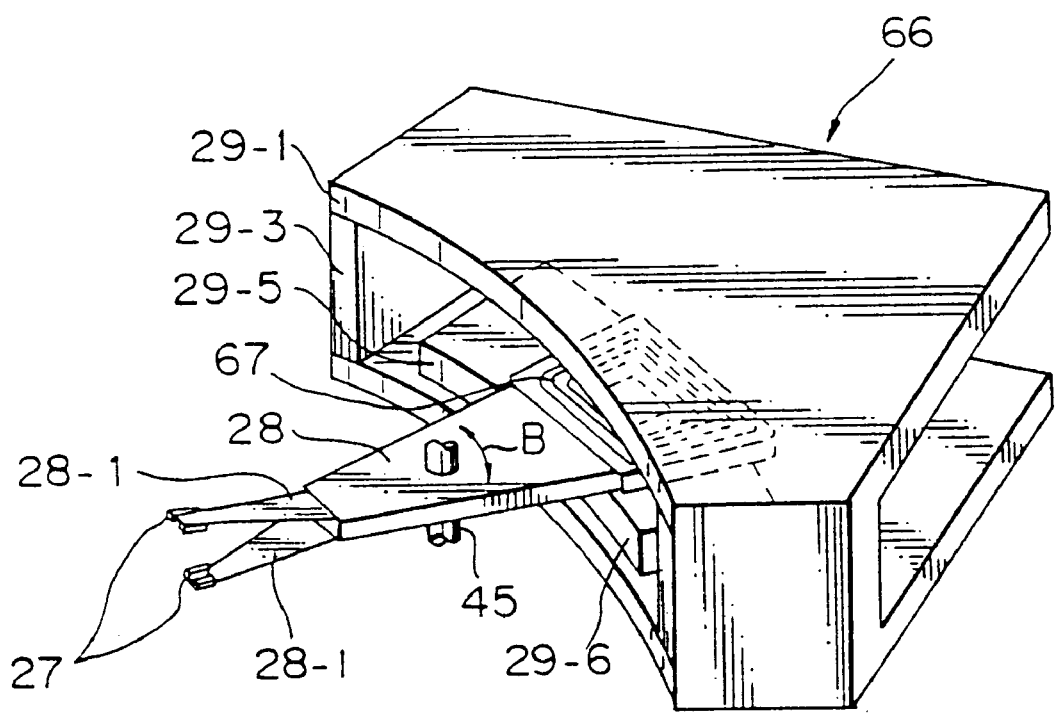
FIGS. 71, 72(A), 72(B) and 73 are views showing a second preferred embodiment of an actuator construction of a disk drive according to the present invention.
Figure 72A:
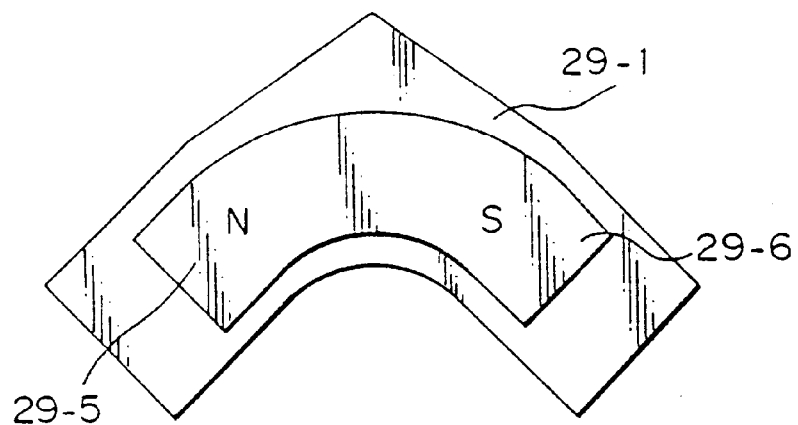
Figure 72B:
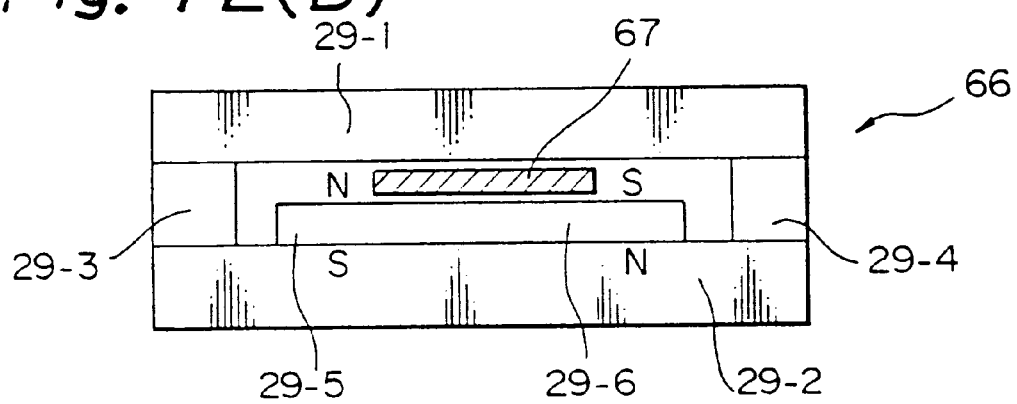
Figure 73:
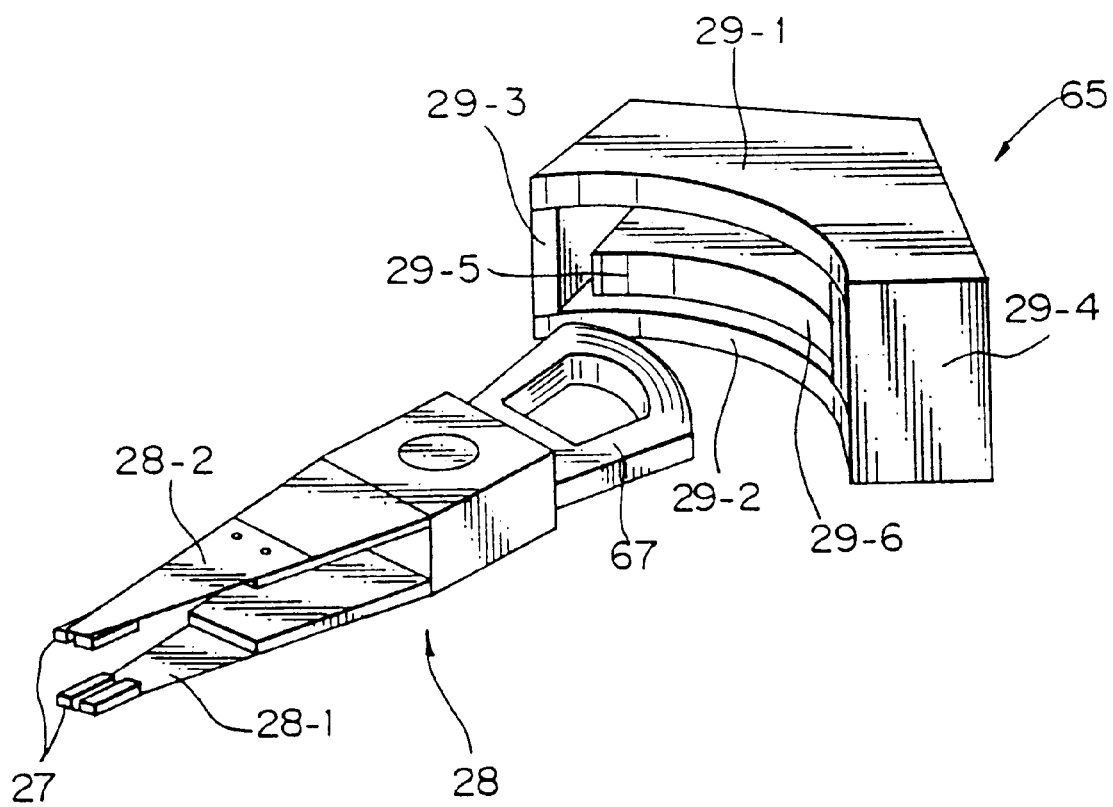

FIG. 71, 72 and 73 are diagrams illustrating a second favorable embodiment of the structure of the actuator in the magnetic disk drive according to the present invention. If described in further detail, FIG. 71 is a perspective view illustrating major portions of this embodiment, FIGS. 72(A) and 72(B) are a schematic plan view and a schematic front view, and FIG. 73 is a perspective view which separately illustrates the head assembly and the magnetic circuit.

The embodiment shown in these drawings is different from the embodiment shown in FIG. 70 with respect to that the upper yoke 29-1 has a shape that is protruded in a cornered shape at its central portion like the shape of the above-mentioned lower yoke 29-2, the upper yoke 29-1 being included in a separate magnetic circuit 66 that constitutes a drive coil motor in combination with the flat coil 67 attached to the rear end of the arm 28.

Even in this embodiment, the lower yoke 29-2 and the upper yoke 29-1 have broad central portions based on the same idea as the embodiment of FIG. 70, and sectional areas are increased by increasing the areas of the lower yoke 29-2 and the upper yoke 29-1. Therefore, the problem of magnetic flux saturation does not arise despite the lower yoke 29-2 and the upper yoke 29-1 are formed in reduced thicknesses. Accordingly, the magnetic flux density across the gap is prevented from being decreased by the leakage of magnetic flux that stems from the magnetic flux saturation.

When either the upper yoke or the lower yoke has a broadened portion as in the first embodiment and when the magnet is to be adhered on either one of them, the yoke that has the broadened portion should be the one on which the magnet is adhered. When the magnet is mounted on one side, in general, the magnetic flux tends to spread in the gap near the yoke of the side where there is no magnet, and the magnetic flux density slightly decreases in the central portion of the yoke. In this case, if the yoke is excessively broadened, the magnetic flux spreads too broadly and may intersect the coil in reduced amounts.

In the above-mentioned actuator structure of either the first embodiment or the second embodiment, the problem of magnetic flux saturation is effectively overcome in the lower yoke and in the upper yoke despite the decrease in the thicknesses of the lower yoke and the upper yoke constituting the magnetic circuit, and the magnetic flux density across the gap is suppressed from being decreased by the leakage of magnetic flux that stems from the magnetic flux saturation.

Moreover, the lower yoke or both the lower yoke and the upper yoke have broad central portions which are protruded in a cornered shape so that they can be arranged at a corner portion in the magnetic disk drive to efficiently utilize the space, making it possible to realize the actuator and the magnetic disk drive in compact sizes and in reduced thicknesses.

Figure 74A:
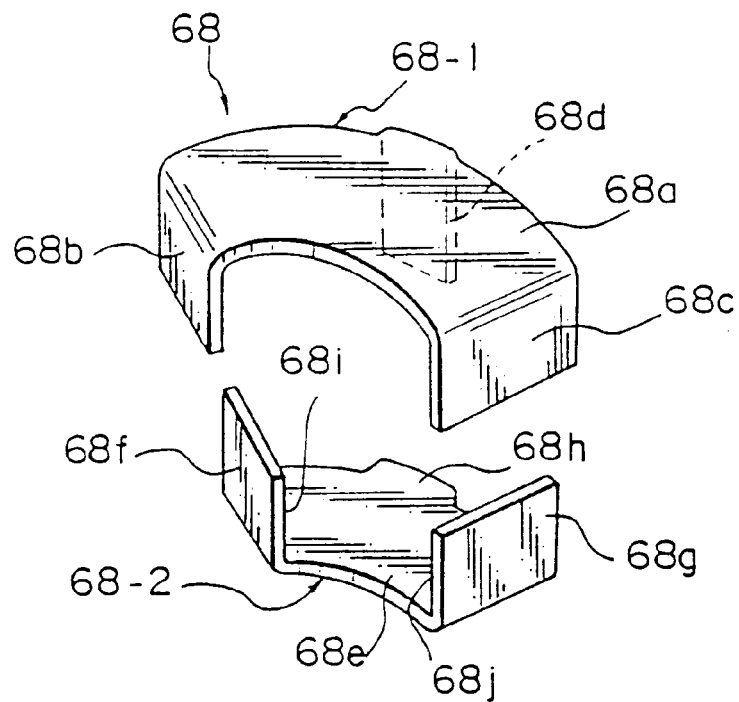
FIGS. 74(A), 74(B), 75(A), and 75(B) are views showing a third preferred embodiment of an actuator construction of a disk drive according to the present invention.
Figure 74B:
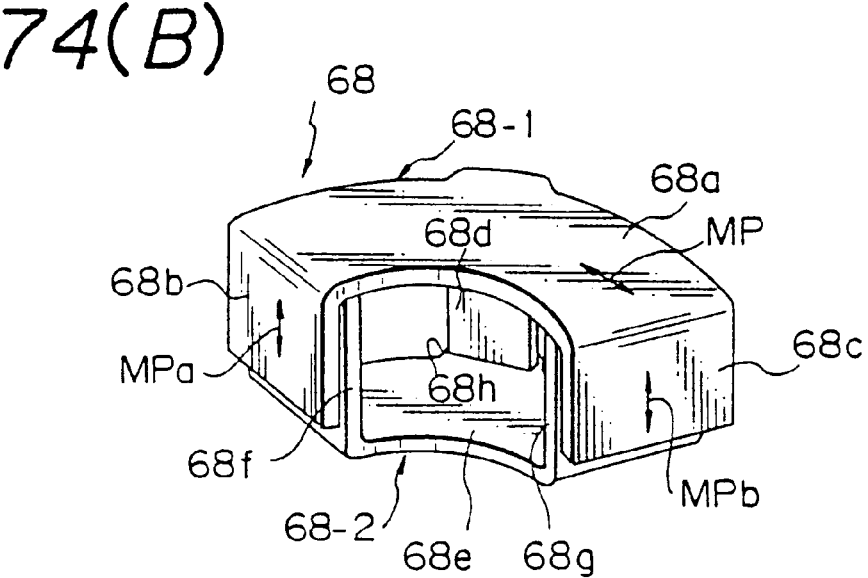
Figure 75A:
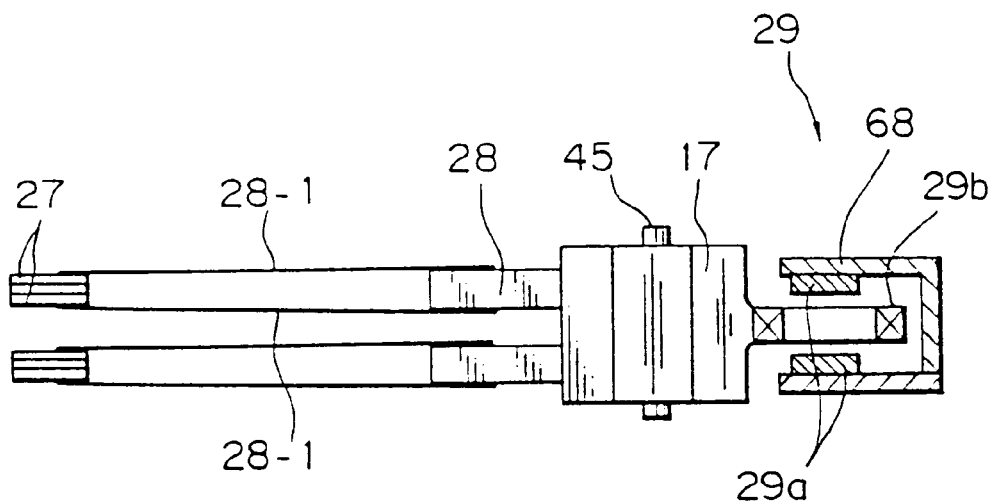
Figure 75B:
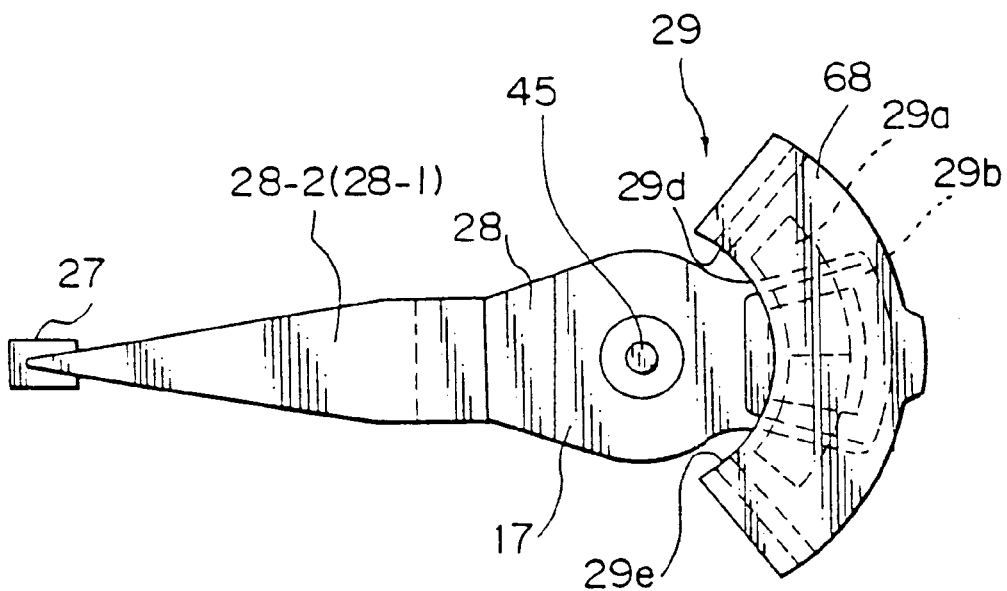

FIGS. 74 and 75 are diagrams illustrating a third favorable embodiment of the structure of the actuator in the magnetic disk drive according to the present invention. If described in further detail, FIG. 74 is a perspective view showing a yoke portion according to the present invention, wherein FIG. 74(A) shows a condition where the yoke portion is disassembled, and FIG. 74(B) shows a condition where the yoke portion is assembled. FIG. 75 is a diagram illustrating in detail the head assembly that includes an actuator of the type of moving coil, wherein FIG. 75(A) is a cross-sectional front view, and FIG. 75(B) is a plan view thereof.

In FIG. 74(A), the yoke portion 68 comprises an upper member 68-1 and a lower member 68-2 which are bent by pressing a plate of a soft magnetic material having a high saturation magnetic flux density.

The upper member 68-1 has a nearly fan-shaped upper surface 68a, two upper side surfaces 68b and 68c formed by downwardly bending both ends of the upper surface 68a at right angles, and an upper end surface 68d formed by bending the central portion of the outer circumferential edge of the upper surface 68a at right angles. The lower member 68-2 has a nearly fan-shaped lower surface 68e, two lower side surfaces 68f and 68g formed by upwardly bending both ends of the lower surface 68e at right angles, and a protruded edge portion 68h that protrudes at the central portion of the outer circumferential edge of the lower surface 68e. The upper side surfaces 68b, 68c, lower side surfaces 68f, 68g, and the upper end surface 68d all have the same length. They, however, need not be all of the same length. For instance, the upper side surfaces 68b and 68c may have a length which does not downwardly protrude beyond the lower surface 68e.

Referring to FIG. 74(B), the upper member 68-1 and the lower member 68-2 are disposed in a manner that the upper side surface 68b and the lower side surface 68f as well as the upper side surface 68c and the lower side surface 68g are overlapped intimately with each other, and the ends of the lower side surfaces 68f and 68g come in contact with the upper surface 68a, and the end of the upper end surface 68d comes in contact with the protruded edge portion 68h.

The upper side surfaces 68b, 68c and the lower side surfaces 68f, 68g are not in parallel with each other. Therefore, the upper side surfaces 68b, 68c and the lower side surfaces 68f, 68g are overlapped upon one another so as to be positioned in the horizontal direction (which is in parallel with the upper surface 68a), and the lower side surfaces 68f, 68g are brought into contact with the upper surface 68a so as to be positioned in the vertical direction (in the direction of height). The upper end surface 68d and the protruded edge portion 68h come in contact with each other and are supported so that their attitudes are stabilized. Under the thus positioned condition, the upper surface 68a of the upper member 68-1 faces the lower surface 68e of the lower member 68-2, magnetic paths MPa and MPb are formed between the upper member 68-1 and the lower member 68-2 by the upper side surface 68b, lower side surface 68f and by the upper side surface 68c, lower side surface 68g, and an annular magnetic path MP is formed through the whole yoke portion 68.

Therefore, the magnetic path MPa or MPb that had hitherto been formed by pole members which are separate parts, is now formed by the upper side surfaces 68b, 68c and by the lower side surfaces 68f, 68g, resulting in a reduction in the number of parts. Moreover, the magnetic paths MPa and MPb are connected at one place only, respectively, and the connecting portions have large opposing areas. Therefore, the reluctance is maintained small at the connection portions, and is also maintained small through the whole yoke portion 68. Moreover, the leakage of magnetic flux is reduced at the connection portions, and a high magnetic flux density can be obtained at the moving portion.

In the magnetic paths MPa and MPb, furthermore, the upper side surfaces 68b, 68c and the lower side surfaces 68f, 68g are overlapped upon one another, and have a magnetic flux density which is smaller than that of the upper surface 68a and the lower surface 68e. Therefore, saturation takes place little in such portions. When a housing that accommodates the yoke portion 68 is made of a magnetic material and is so disposed that a portion thereof comes in contact with the upper surface 68a or the lower surface 68e, therefore, this contacting portion of the housing becomes a portion of magnetic path MP of the yoke portion 68, and the magnetic flux is permitted to pass through without being saturated in the magnetic paths MPa, MPb. Thus, the magnetic flux density can be increased in the moving portion. Moreover, since the upper side surfaces 68b, 68c and the lower side surfaces 68f, 68g are overlapped upon one another and the lower side surfaces 68f, 68g come in contact with the upper surface 68a, the upper member 68-1 and the lower member 68-2 are easily positioned without the need of providing any additional positioning members such as dowels that were used thus far. Therefore, the parts can be machined and assembled very easily. As the upper end surface 68d and the protruded edge portion 68h come in contact with each other, furthermore, the attitudes of the above two members are stabilized and the reluctance can be decreased, too. In order to couple the upper member 68-1 and the lower member 68-2 as a unitary structure, furthermore, an adhesive agent may be applied to the contacting surfaces of the upper side surfaces 68b, 68c and the lower side surfaces 68f, 68g, or the two members may be held together as a unitary structure by a housing which accommodates the yoke portion 68.

As shown in FIGS. 75(A) and 75(B), furthermore, the head assembly is constituted by an actuator 29, an arm 28 that moves being coupled to the actuator 29, an arm end 28-1 coupled to the arm 28, and the magnetic head 27 mounted at the tip of the arm end 28-1.

The actuator 29 comprises the yoke portion 68, a magnet portion 29a consisting of a pair of opposing permanent magnets mounted on the inner sides of the upper surface 68a and the lower surface 68e of the yoke portion 68, a flat moving coil portion 29b that is movably arranged in the magnet portion 29a, and an arm support portion 17 such as a carriage which rotatably supports the moving coil portion 29b and the arm 28 with the second fixed shaft 45 as a center. The magnet portion 29a consists of two permanent magnets having dissimilar polarities, and electric currents of opposite directions flowing through the opposing sides of the coil portion 29b receive the electromagnetic force in the same direction due to magnetic fields of opposite directions, causing the arm support portion 17 to be rotated.

The thus rotated arm support portion 17 comes at its rotational end into contact with side edges 29d, 29e on the inner side of the lower side surfaces 68f and 68g, and thus the moving range of the actuator 29 is restricted. That is, the side edges 29d, 29e serve as stoppers contributing to simplifying the structure of the actuator 29. In the actuator 29, since the yoke portion 68 has a small reluctance and a high saturation magnetic flux density, a high magnetic flux density is obtained across the permanent magnets (high magnetic flux density in the moving portion) and a large force acts on the coil 29b. Therefore, despite of its small size, the actuator 29 produces a large torque and can be favorably employed for a compact and thin magnetic disk drive such as the card-type magnetic disk drive.

In the above embodiment, the upper side surfaces 68b, 68c are on the outer side of the lower side surfaces 68f, 68g, and the positioning in the vertical direction (height direction) is accomplished by the ends of the lower side surfaces 68f and 68g. However, a relation in position may be reversed between the upper side surfaces 68b, 68c and the lower side surfaces 68f, 68g. Moreover, the cover 22 may be constituted by using a magnetic material and may be used as a portion of the magnetic circuit that is formed by the actuator 29.

Figure 76:
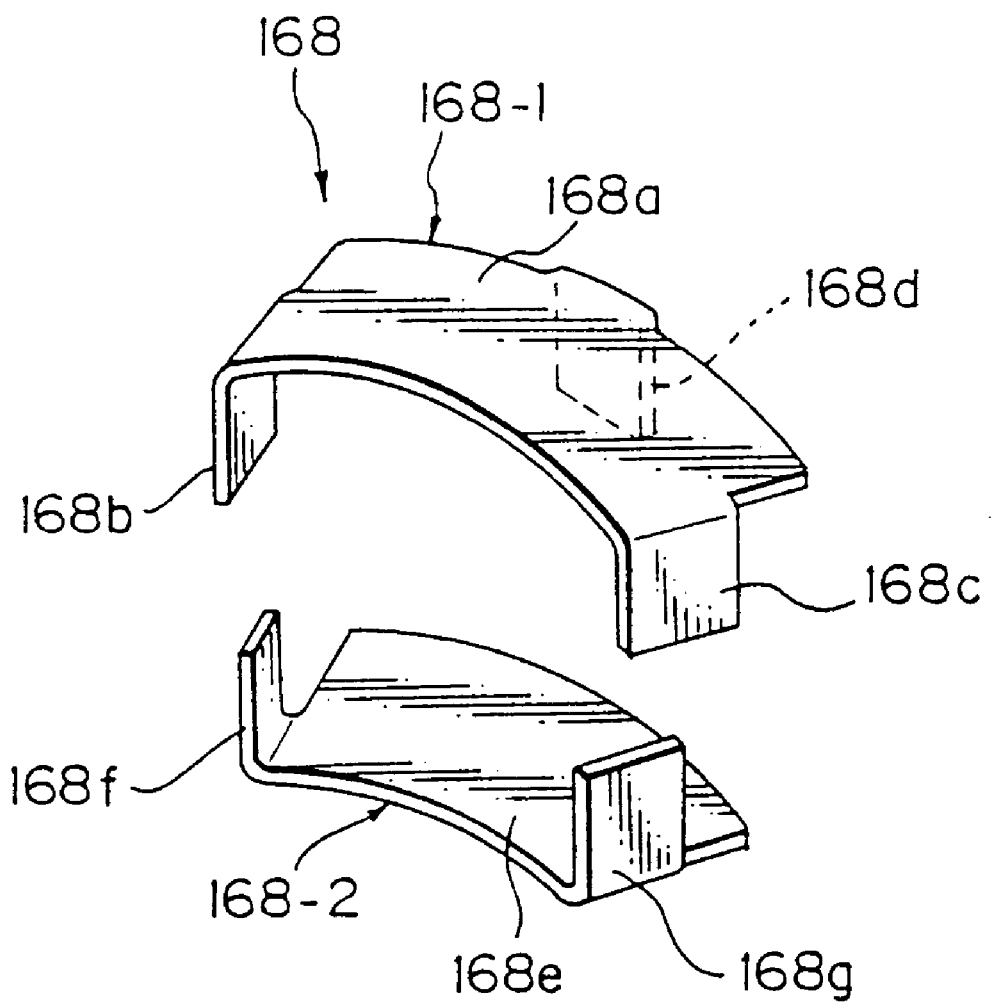
FIG. 76 is a view showing a fourth preferred embodiment of an actuator construction of a disk drive according to the present invention.

FIG. 76 is a perspective view illustrating in a disassembled manner a yoke 168a in the structure of the actuator according to a fourth preferred embodiment of the present invention, and wherein the portions having the same functions as the portions of FIG. 74 are denoted by the same reference numerals but are not described here again or described only briefly.

In the yoke portion 168 of FIG. 76, the upper side surfaces 168b, 168c and the lower side surfaces 168f, 168g have widths which are nearly one-half the lengths of the sides of the upper surface 68a and the lower surface 68e.

Thus, the yoke portion 168 has a small shape and occupies a reduced volume, enabling other mechanical parts to be arranged in the portion provided by the reduction in the widths of the upper side surfaces 168b, 168c and the lower side surfaces 168f, 168g, making it possible to realize the magnetic disk drive in a further decreased size. In this case, the upper side surfaces 168b, 168c and the lower side surfaces 168f, 168g have decreased widths but have thicknesses which are twice as great as those of the upper surface 68a and the lower surface 68e. Therefore, the magnetic saturation does not take place in the upper side surfaces 168b, 168c and in the lower side surfaces 168f, 168g so far as the housing is not used as the magnetic path.

FIG. 77 is a perspective view showing lower members 69-2a to 69-2c only of the yoke portions 69a to 69c in the structure of the actuator according to a further embodiment of the present invention, and wherein the portions having the same functions as the portions explained with reference to FIG. 74 are denoted by the same reference numerals but are not described here again or described only briefly.

Figure 77A:
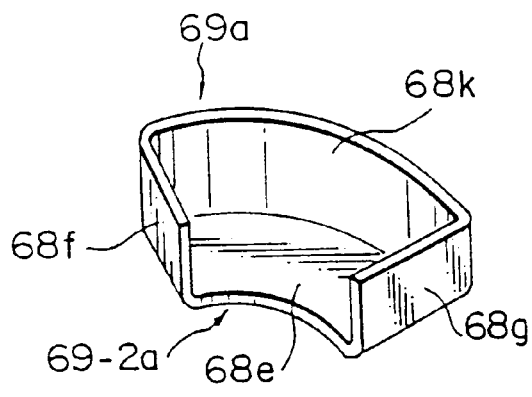
FIGS. 77(A)–77(C) is a view showing some additional embodiments of an actuator construction of a disk drive according to the present invention.

As shown in FIG. 77(A), the lower member 69-2a of the yoke portion 69a has a lower end surface 68k that is formed continuously to the lower side surfaces 68f, 68g and to the lower surface 68e. The lower end surface 68k serves as a portion of the magnetic path and supports the upper member to stabilize its attitude.

Figure 77B:
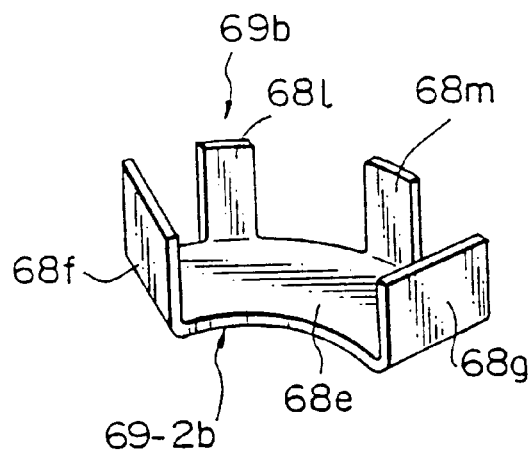

The lower member 69-2b of the yoke portion 69b shown in FIG. 77(B) has two lower end surfaces 68l and 68m formed from the lower surface 68e. The lower end surfaces 68l and 68m serve as portions of the magnetic path and support the upper member.

Figure 77C:
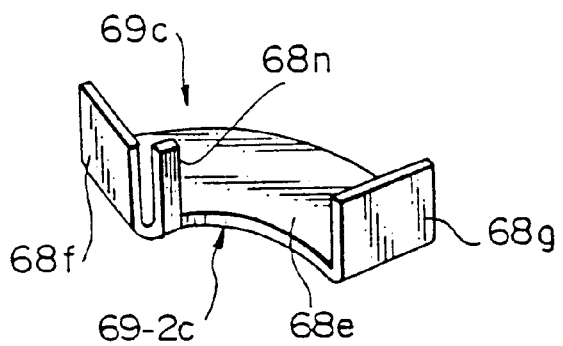

The lower member 69-2c of the yoke portion 69c shown in FIG. 77(C) has a lower end surface 68n that works as a stopper and that is formed from the lower surface 68e on the inside of the lower side surface 68f. The lower end surface 68n restricts the moving range of the actuator 29 instead of the above-mentioned side edge 29d, and serves as a portion of the magnetic path.

The upper members of the yoke portions 69a to 69c are symmetrical to the lower members 69-2a to 69-2c; i.e., they fit together so that the lower side surfaces 68f, 68g, and the lower end surfaces 68k, 68l, 68m, 68n are overlapped upon one another. Or, the upper members of the yoke portions 69a to 69c may be so formed as to simply have the upper surface 68a and the upper side surfaces 68b, 68c.

In the aforementioned embodiment, either one of the upper member 68-1 or the lower member 68-2 may be on the upper side and the other one may be on the lower side. The upper member 68-1 and the lower member 68-2 can be prepared by various methods in addition to pressing. Only one permanent magnet may be used for the magnet portion 29a.

According to the present invention, the yoke is constituted using a reduced number of parts, and the reluctance is lowered to obtain a high magnetic flux density at the moving part. Moreover, the upper member and the lower member are easily positioned to facilitate the assembling.

Figure 78:
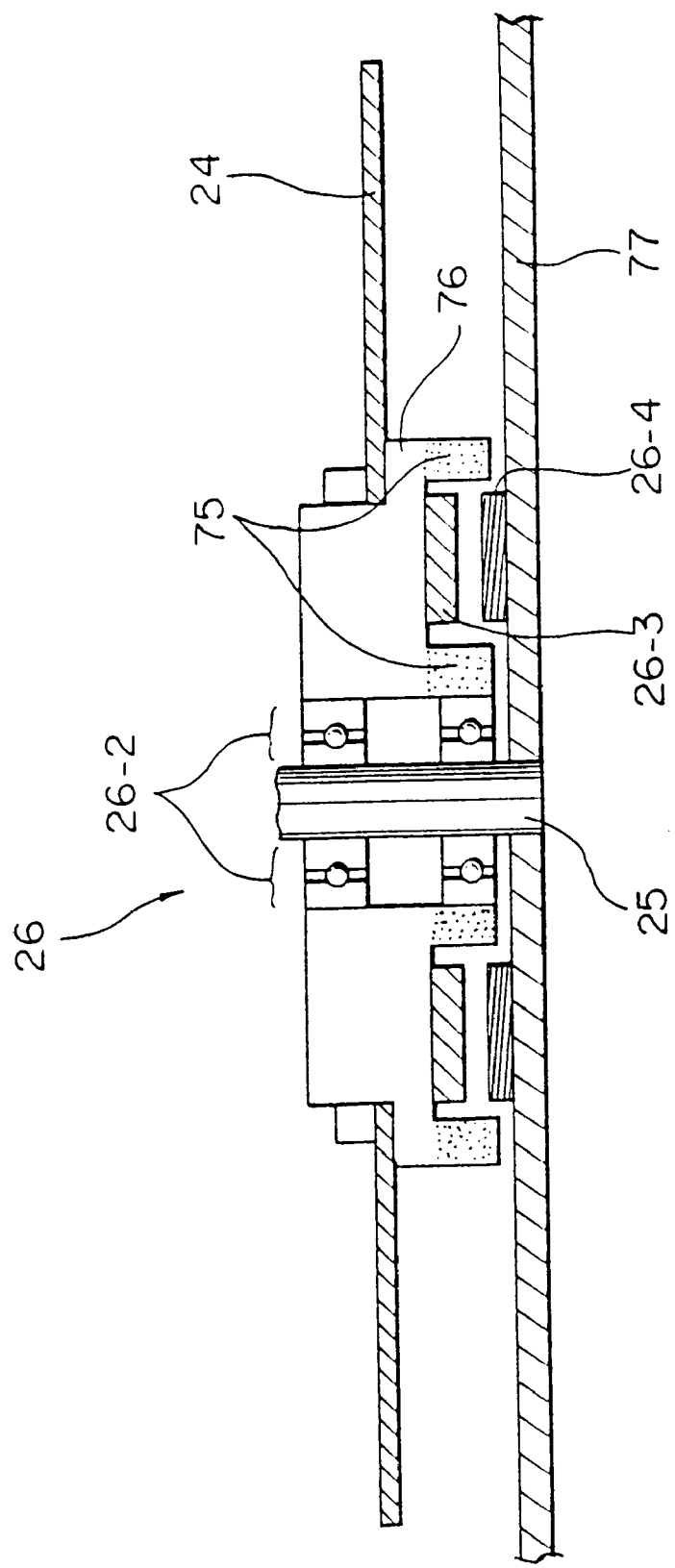
FIGS. 78, 79, 80 and 81 are views showing one improved example of a first preferred embodiment of a whole spindle motor construction as in FIG. 50.

FIGS. 78, 79, 80 and 81 are diagrams illustrating an embodiment which is an improvement from the first preferred embodiment of the whole structure of the spindle motor shown in FIG. 50. If described in further detail, FIG. 78 is a sectional view of the spindle motor of the axial flux type according to the above improved example. Aventurine portions 75 denote a magnetic path auxiliary means which according to this embodiment is formed together with a rotor yoke 76 as a unitary structure.

Figure 79:
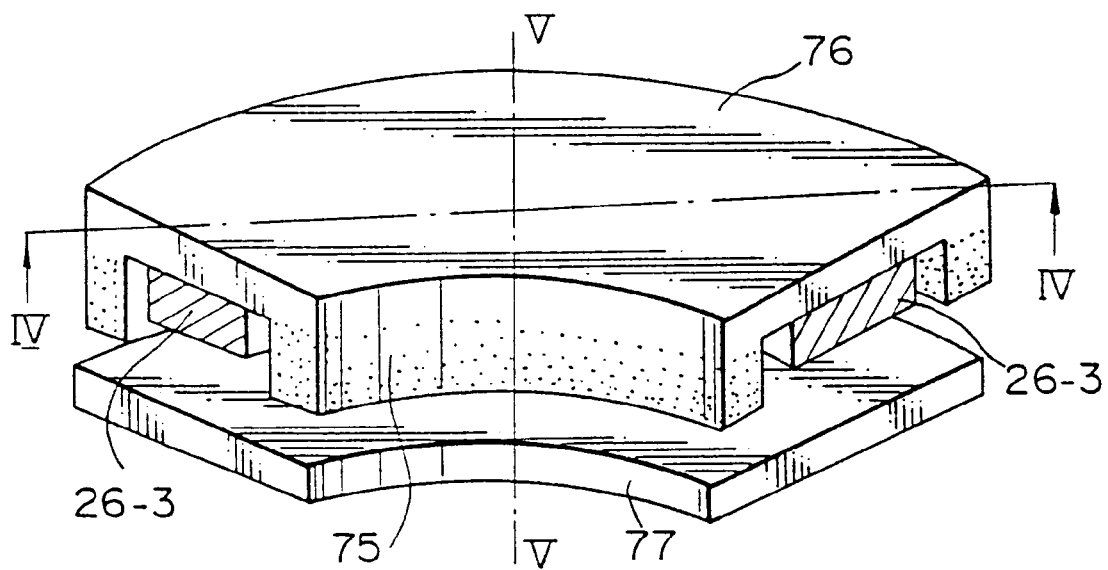
Figure 80:
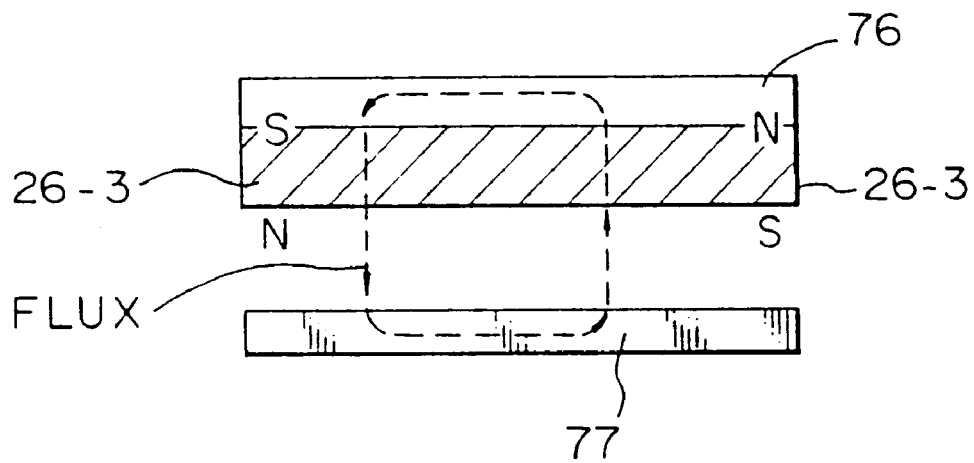
Figure 81:
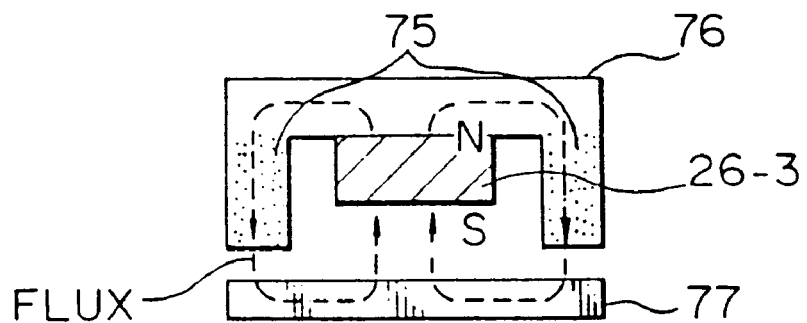

FIGS. 79 to 81 illustrate in detail the structure of the spindle motor of the axial flux type according to the present invention, wherein FIG. 79 is a perspective view of a constituent block, FIG. 80 is a sectional view along the line IV—IV of the constituent block of FIG. 79, and FIG. 81 is a sectional view along the line V—V of the constituent block of FIG. 79. Aventurine portions 75 denote a magnetic path auxiliary means which according to this embodiment is formed together with the rotor yoke 76 as a unitary structure.

In FIG. 79, an annular magnetic path auxiliary means 75 made of a magnetic material is disposed at a position near the magnet 26-3 and the stator 26-4 to trap the leakage magnetic flux. That is, the annular magnetic path auxiliary means 75 is formed together with the rotor yoke 76 as a unitary structure so as to include therein the magnets 26-3 and stator coils 26-4 that are annularly arranged. The gap between the magnetic path auxiliary means 75 and the stator yoke 77 is set to be smaller than the gap between the magnets 26-3 and the stator yoke 77. When the spindle motor 26 is rotating, therefore, a closed magnetic path is formed in the circumferential direction as indicated by a broken line with arrow in FIG. 80. As shown in FIG. 81, furthermore, the leakage magnetic flux is trapped by the magnetic path auxiliary means 75 which exhibits properties of the magnetic material, and auxiliary closed magnetic paths are formed in the radial direction passing through the magnetic path auxiliary means 75. That is, when there is no magnetic path auxiliary means, the magnetic flux passes through the closed magnetic path of the circumferential direction only. In this embodiment, however, the magnetic flux disperses in the auxiliary closed magnetic paths of the radial direction. Therefore, the magnetic flux density decreases in the rotor yoke 76 and in the stator yoke 77; i.e., the magnetic flux is not saturated in the rotor yoke 76 and in the stator yoke 77, resulting in a decrease in the leakage magnetic flux density. On the other hand, the magnetic flux density increases across the gap for rotating the rotor yoke 76 compared with that of when there is no magnetic path auxiliary means.

Therefore, even when the rotor yoke 76 and the stator yoke 77 are machined to have thicknesses smaller than those of the prior art, the electric current flowing into the stator coils 26-4 can be efficiently converted into a torque. At the same time, the magnetic head, recording disk and like portions that deal with recording signals are less affected by the leakage magnetic flux density.

Figure 82:
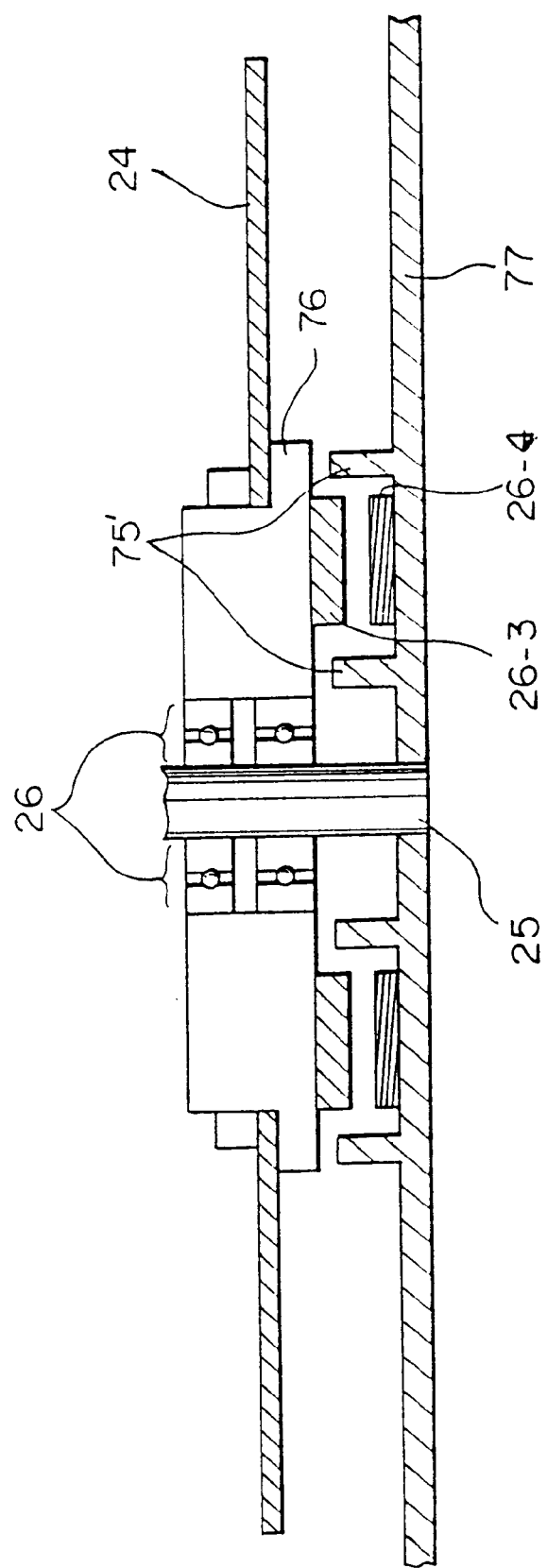
FIG. 82 is a view showing another improved example of a first preferred embodiment of a whole spindle motor construction as in FIG. 50.

FIG. 82 is a sectional view illustrating another embodiment which is an improvement from the first preferred embodiment of the whole structure of the spindle motor of FIG. 50, and wherein the same constituent portions as those of FIG. 78 are denoted by the same reference numerals but are not described. In this embodiment, the magnetic path auxiliary means 75 is formed integrally with the stator yoke 77. Even this constitution makes it possible to obtain the same effects as those of the embodiment of FIGS. 78 to 81.

In addition to the above, though not diagramed, the magnetic path auxiliary means 75 may be split and are formed integrally with the rotor yoke 76 and the stator yoke 77, and the thus split magnetic path auxiliary means 75 are opposed to each other to obtain the same effects.

In FIGS. 78 and 82, the magnetic path auxiliary means 75 is arranged so as to include the magnet 26-3 consisting of a plurality of magnet elements and the stator 26-4 consisting of a plurality of coil elements that are annularly and contiguously arranged from both the inner and outer peripheral sides. However, the leakage magnetic flux density can be decreased to be smaller than that of the prior art even when the magnetic path auxiliary means 75 is arranged on either the inner peripheral side or the outer peripheral side only.

According to the above improved embodiments shown in FIGS. 78 to 82, the magnetic path auxiliary means helps decrease the leakage magnetic flux density that is caused by saturation in the rotor yoke and in the stator yoke, and the electric current flowing into the coil is efficiently converted into a torque and, besides, the portions such as the magnetic head and the recording disk that deal with recording signals are less affected by the leakage magnetic flux density. It is therefore allowed to easily provide a spindle motor having a size and a thickness which are smaller than those of the prior art.

Figure 83:
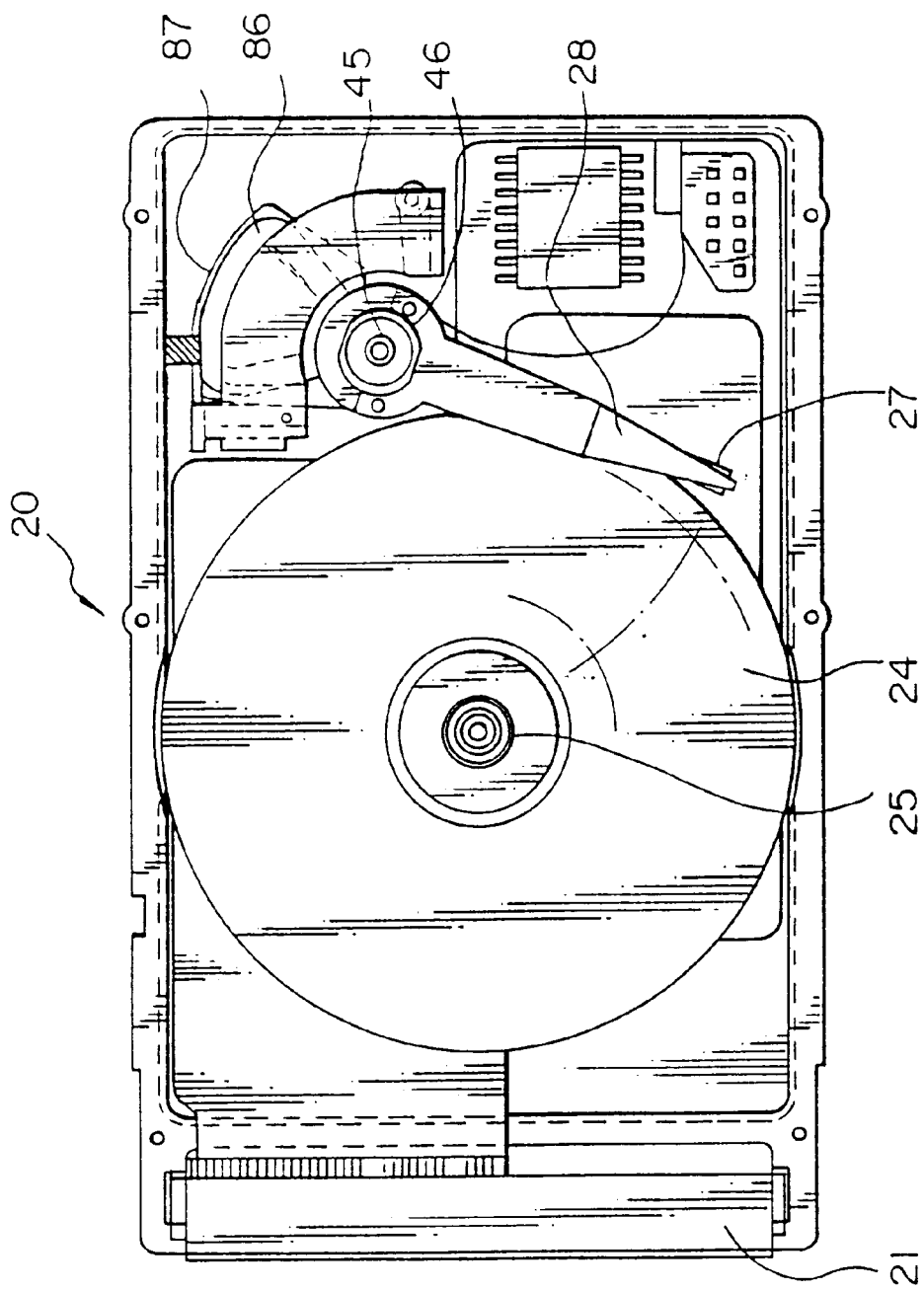
FIGS. 83 and 84 are views showing one preferred embodiment of a head retracting construction of a disk drive according to the present invention.
Figure 84:
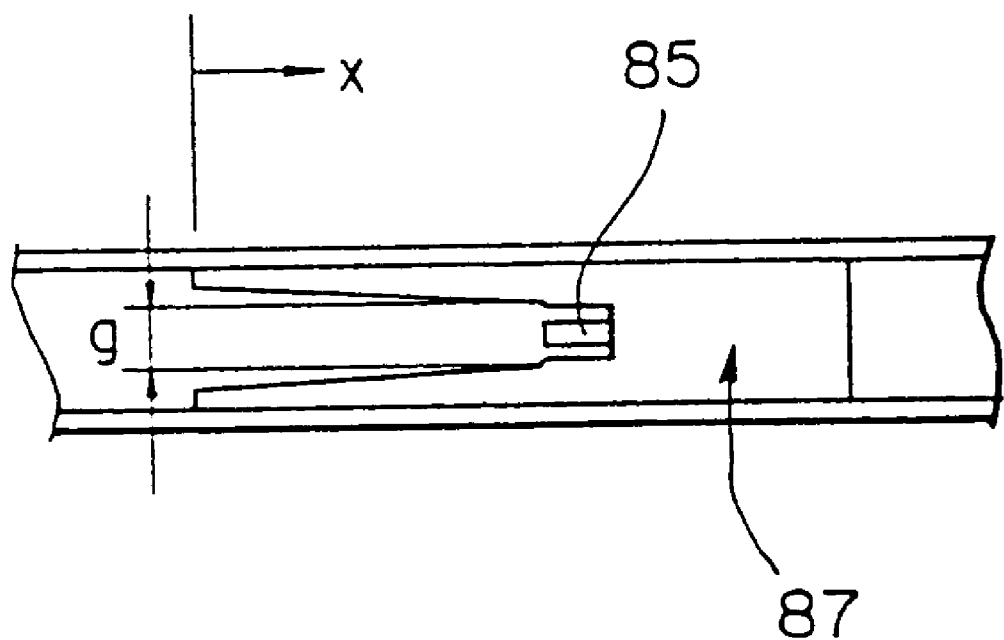

FIGS. 83 and 84 are diagrams illustrating a preferred embodiment of a magnetic head retracting assembly in the magnetic disk drive of the present invention. If described in further detail, FIG. 83 is a plan view which illustrates a portion of the magnetic head retracting assembly in an emphasizing manner, and FIG. 84 is a side view which schematically illustrates the magnetic head retracting assembly.

The magnetic disk drive and the IC memory card used for personal computers require a high degree of durability with respect to not only shocks but also external magnetic field. The IC cards must not permit data to become abnormal even in a magnetic field which is as intense as one kilogausses. However, equipment having an aluminum base/cover are not generally capable of withstanding such an intense magnetic field. In the magnetic disk drives, in general, the magnetic head and the medium portion (magnetic disk) must be placed in a magnetic field which is weaker than 5 gausses.

According to the present invention, therefore, a steel base/cover is employed as mentioned earlier to completely shield the magnetism. A steel plate having a thickness of about 0.4 mm exhibits a shielding effect to a degree sufficient to meet the above demand. However, the problem exists in that the steel plate that is press-worked often has a residual magnetization of as great as about several tens of gausses. As required, therefore, the magnetic annealing is effected to cope with the problem.

To minimize the effect caused by the external magnetic field, it is important that the magnetic head is retracted to the data zone when the power source is turned off. This is because, the magnetic head has a large effect for concentrating the magnetic flux and just under the magnetic head, the data is affected by a magnetic field of the order of 10 gausses and is likely to be erased in a magnetic field of the order of 100 gausses. In the disk medium without the magnetic head, on the other hand, the data is not erased even in a magnetic field which is as strong as about 1000 gausses. In view of the fact that a portable disk is affected by the magnetic field disturbance particularly when it is being carried, it is essential to employ a mechanical retracting assembly which does not rely upon the VCM (voice coil motor) drive.

In a magnetic disk drive having a floating magnetic head, in particular, it is essential to provide a magnetic head retracting assembly which retracts the magnetic head to the parking zone when the disk is stopped in order to avoid damage to the data zone during the CSS (contact start stop) operation, and an actuator locking assembly for holding the retracted magnetic head. Even in the magnetic disk drive using a negative-pressure slider (zero-load slider) that does not perform the CSS operation, it is necessary to employ the retracting and locking operations in view of the fact that the magnetic head comes into collision with the medium when a shock is imparted thereto from the external side. Moreover, the magnetic disk drive having the unloading mechanism requires a mechanism which reliably moves the magnetic head to the unloading position and holds it at that position when the power source is cut off.

Usually, the magnetic head retracting assembly:

(1) utilizes a return spring, (2) utilizes a counter electromotive force of the spindle motor to retract the actuator, or (3) utilizes the gravity.

Further, the actuator locking assembly:

(1) utilizes a ratchet mechanism, (2) utilizes the frictional force, or (3) utilizes the magnetic force.

So far as a linear spring is used, however, the return spring in the ordinary magnetic haed retracting assembly (1) exhibits a change in the offset force depending upon a position on the data zone, and greatly affects the control system. Moreover, an excessively great offset force is applied at a position opposite to the retracted zone, and becomes a cause of an increase in the consumption of electric power. Even in the case of the retracting assembly (2), the electromotive force of the spindle motor decreases with a decrease in the size of the magnetic disk drive, and a sufficiently large retracting force is not obtained. Furthermore, the magnetic head retracting assembly (3) which utilizes the gravity is not applicable to the balanced rotary actuator which nowadays is chiefly used. In the modern small disk drives, furthermore, it is not allowed to determine the direction of installation, and the assembly (3) is not utilizable.

Further, the actuator locking assembly (1) requires a solenoid or the like for liberating or holding the actuator. The actuator locking assembly (2) requires a fine and cumbersome setting. Even in the case of the locking assembly (3) which performs the so-called catching using the magnetic force of a magnet, the effective range is limited to near the parking zone. The retracting assembly which uses the return spring has the locking ability, but its locking force is weaker than the retracting force unless a magnetic spring is used, and is not practicable.

The present invention therefore employs a retracting assembly by using a magnet as shown in FIGS. 83 and 84. Here, the head assembly has a rotary actuator 29 (see, for example, FIG. 70), and has a retraction magnet 85 at the outer edge of a flat coil 86 of the actuator 29 in order to maintain the magnetic head 29 under the retracted condition. Moreover, retraction yokes 87 are arranged under and over the retraction magnet 85 thereby to form a closed magnetic path.

If concretely described with reference to a graph of FIG. 85 and a gap changing structure of FIG. 86, a gap G in the magnetic circuit is so set in the data zone that a gap value g will vary in proportion to an inverse number of a value $X+X_0$ which is obtained by adding a given integration constant $X_0$ to a moving distance X of the magnetic head. Moreover, a stepped portion 87-1 is formed in the yoke 87 so that the gap value g will abruptly decrease in the locking zone. With this formation, a constant torque is produced in the data zone which is greater than the static friction of the bearing means 46. In the locking zone on the outer portion of the magnetic disk, on the other hand, the torque suddenly increases. Therefore, a large holding torque is obtained and the magnetic head is reliably locked.

Figure 87:
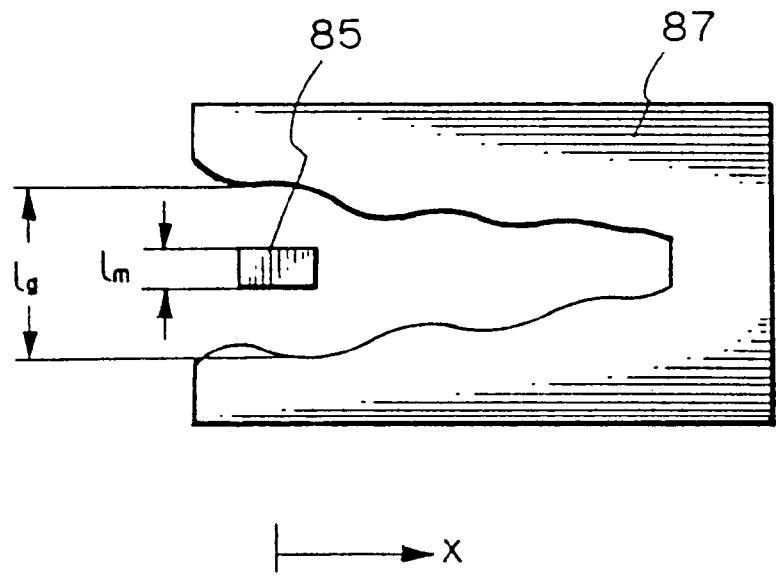
FIG. 87 is a model of rotation utilizing magnetic force for explaining the principle of a head retracting mechanism in a disk drive according to the present invention.

FIG. 87 is a diagram showing a model of magnetic circuit for explaining the principle of the magnetic head retracting assembly according to the present invention.

Generally, there are various methods for calculating magnetic attraction, and a method which uses a change ratio of magnetic energy and is used most conveniently will be hereby explained.

Magnetic energy W of a system expressed by magnetomotive force NI, magnetic flux θ and magnetic resistance R is given by:

$$W = \tfrac{1}{2}\phi^2 R = \tfrac{1}{2} NI\theta = \tfrac{1}{2}(NI)^2/R$$

The force generated is given as follows by differentiating magnetic energy in the moving direction:

$$F = dW/dx = -\tfrac{1}{2}(NI)^2/R^2 \, dR/dx = -\tfrac{1}{2}\theta^2 \, dR/dx$$

Let's consider a magnetic circuit model such as one shown in FIG. 87. In this case, magnetic energy is stored in the space, the magnet and the yoke. Here, lg: air gap distance (inclusive of thickness of magnet; g is a suffix)

lm: thickness of magnet (m is a suffix)

S': sectional area of magnet $\mu$o: permeability in air $\mu$r: permeability of recoil He: intersection of tangent of demagnetization curve at operating point with B=0 (linearized coercive force)

Br: intersection of tangent of demagnetization curve at operating point with H=0 (linearized residual magnetic flux density; Br=$\mu$rHe)

Assuming in this case that the magnetic resistance inside the yoke can be neglected (or the magnetic energy does not exist), the magnetic resistance R of this magnetic circuit can be expressed as follows:

$$R = \left\{ \frac{(lg - lm)}{\mu_0} + \frac{lm}{\mu_r} \right\} \frac{1}{S'}$$

If $\mu$o=$\mu$r in this case, $$R = lg/(\mu o \, S')$$

On the other hand, the magnetomotive force NI is given as follows:

$$NI = He \, lm$$

Therefore, assuming that the area S' does not change, $$\phi = NI/R = \mu_0 S' H_a lm/lg$$

$$dR/dx = 1/(\mu_0 S') \, dlg/dx$$

Accordingly, the generated force can be given as follows:

$$F = -\frac{1}{2}\mu_0 S' \left( H_0 \frac{lm}{lg} \right)^2 \frac{d\,lg}{dx}$$

(generated force of gap change)

As can be understood from the above explanation, a large generated force can be obtained when the magnet is thick relative to the gap and the gap change ratio is great. To obtain predetermined force irrespective of the position X, $$lg = \frac{1}{2}\mu_0 S'(H_e lm)^2 \frac{1}{F} \cdot \frac{1}{x + x_0}$$

$x_0$: intergration constant

Since it is practically difficult to produce the shape having such functions, a substantially constant torque can be obtained even by a linear change if the gap distance lg is made sufficiently greater than the thickness lm of the magnet.

When the device is used as the lock, a step or steps may be provided so that this gap change becomes sufficiently great.

Figure 88:
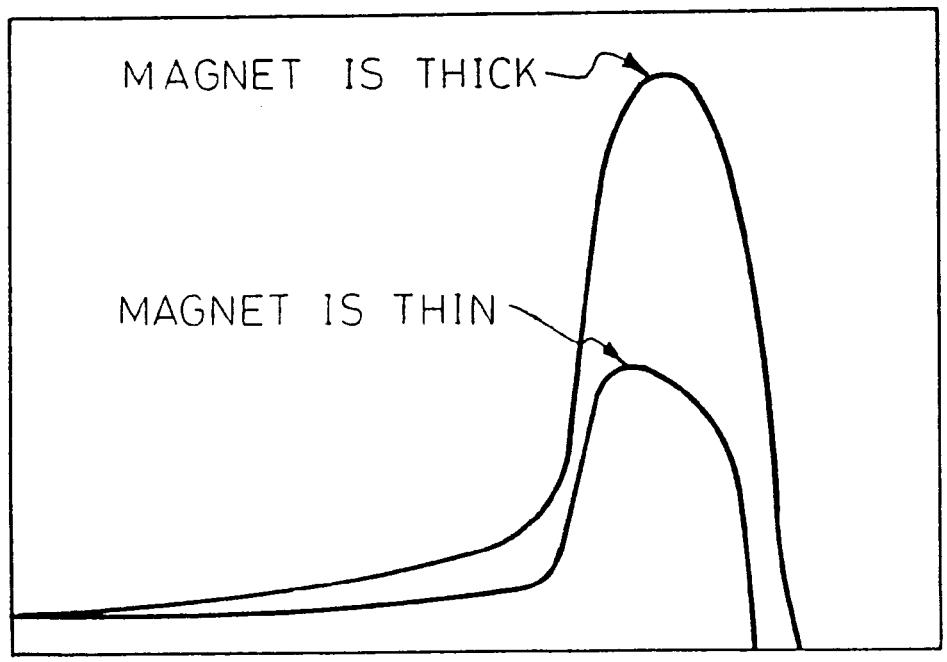
FIG. 88 is a graph showing the result of actual measurement of torque in a head retracting mechanism of gap changing type.

FIG. 88 is a graph showing the actually measured result of the torque in the gap change type head retraction mechanism. According to the actually measured result, a substantially constant retraction force can be obtained throughout the full stroke of the head 27, and a torque about four to nine times the retraction force is generated at the lock position on the right side of the graph, so that sufficient performance as the lock mechanism can also be obtained. The holding torque at this lock position becomes greater with a greater thickness (lm) of the magnet 87 as can be appreciated clearly from the actually measured result of FIG. 88 and from the magnetic circuit model of FIG. 87.

Figure 89:
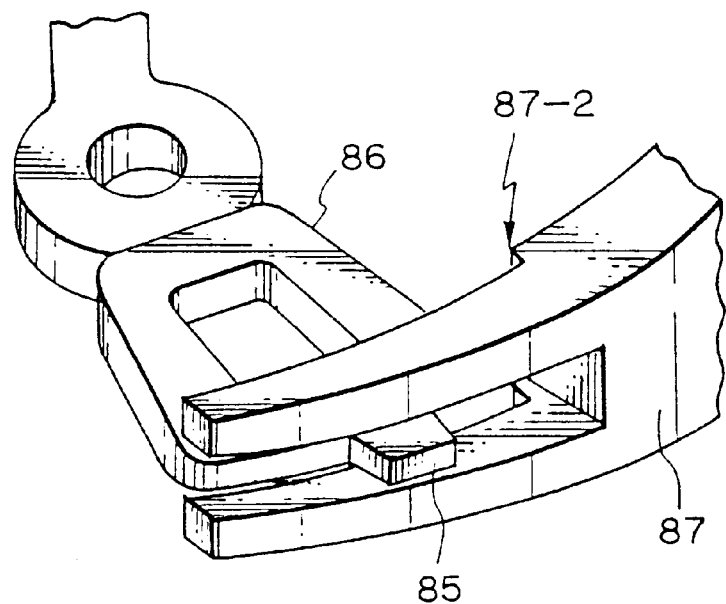
FIG. 89 is a view showing one example of a head retracting mechanism of area changing type.

FIG. 89 is a perspective view of an example of the area change type retraction mechanism. In FIG. 89, the overlapping area of the positioning magnet 85 and the positioning yoke 87 is change inside the plane between them in the direction in which the magnetic head 29 under-goes displacement, so as to retract the head 29. More in particular, the overlapping area between the magnet 85 and the yoke 87 becomes progressively greater linear-function-wise towards the right side, and the width of the yoke 28 is drastically increased by forming another step 87-2 with respect to the planar direction of the yoke 87. With such a construction, the change with respect to the moving distance X of the retraction force can be calculated using the magnetic circuit model shown in FIG. 87. Namely, this calculation provides:

$$dR/dx = -lg/(\mu o \, S^2) \, dS/dx$$

Accordingly, the generated force is given as:

$$F = \frac{1}{2}\mu_0 \frac{(H_e lm)^2}{lg} \cdot \frac{dS'}{dx}$$

(generated force of area change)

In other words, a predetermined force can be obtained by the linear change of the ares S.

Figure 85:
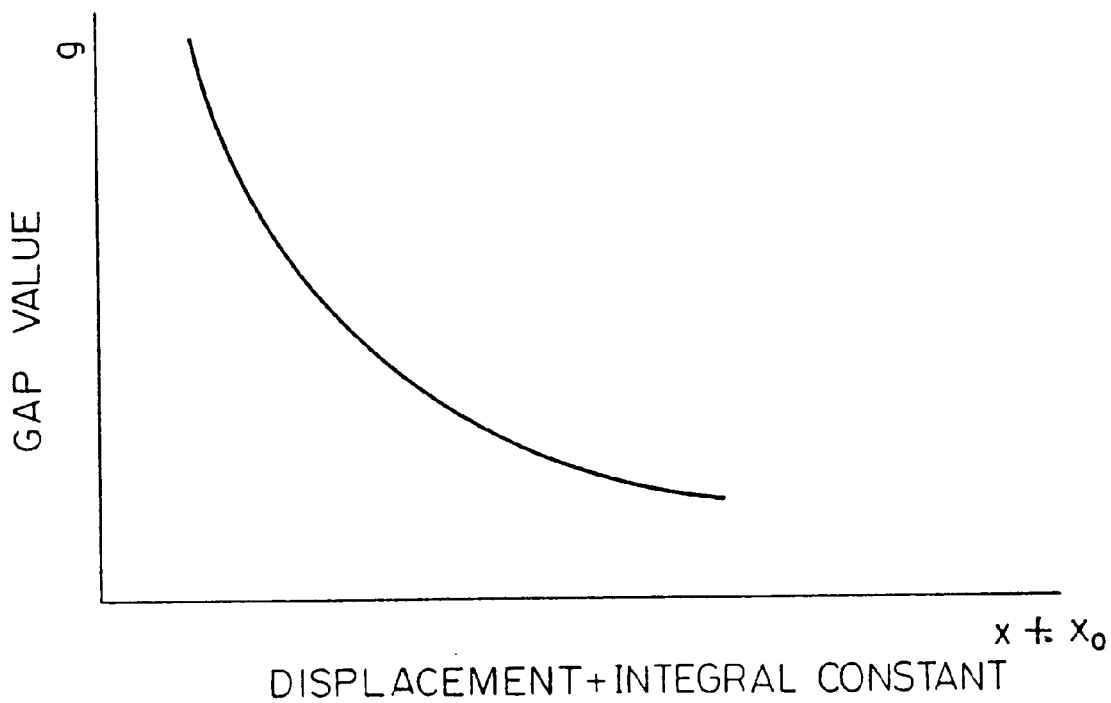
FIG. 85 is a graph for explaining the relationship between the displacement of a magnetic head and the gap value in FIG. 86.
Figure 86:
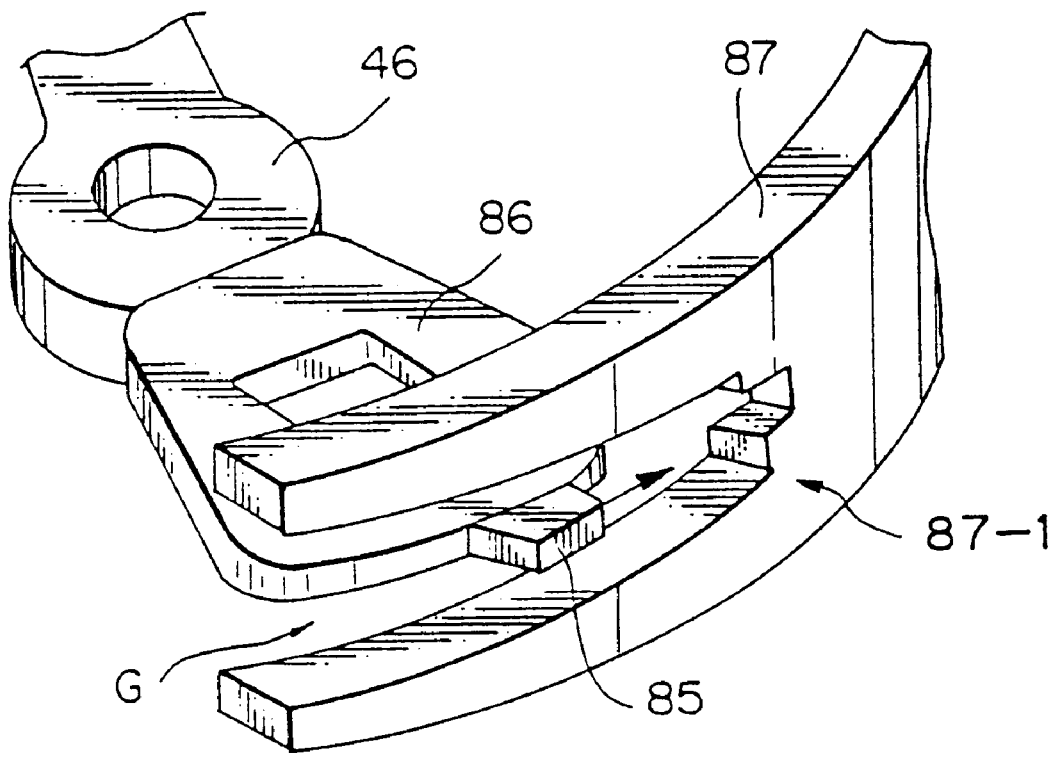
FIG. 86 is an enlarged perspective view of FIG. 84.

In the lock area, a step portion is disposed in the same way as in FIG. 85 so that the holding torque is increased and the magnetic head can be locked reliably.

Figure 90:
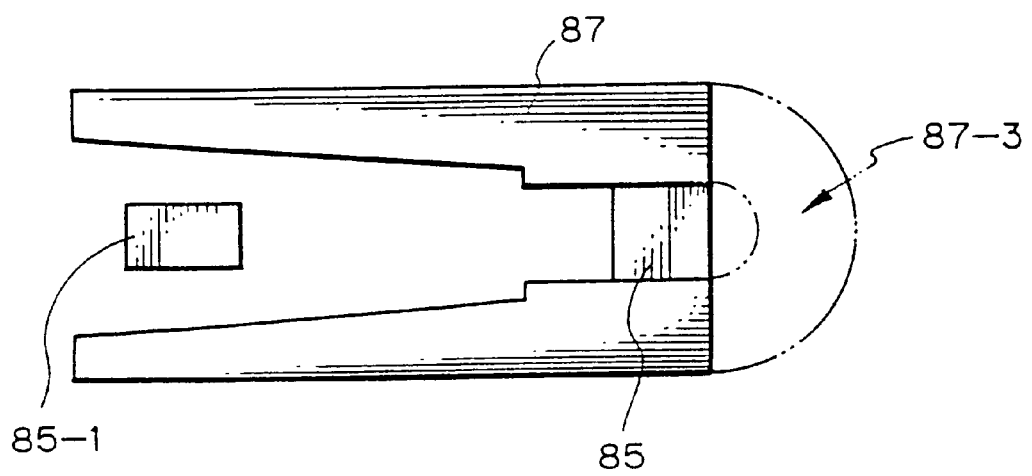
FIG. 90 is a view showing other example of a head retracting mechanism in a disk drive according to the present invention.

FIG. 90 shows another example of the retraction mechanism for the magnetic head in the magnetic disk drive according to the present invention.

In this example, the magnet 85 is not disposed at the moving portion but the magnet 85 as the permanent magnet is assembled in a part of the yoke 87 at the fixed portion. An iron plate as a soft magnetic substance is disposed at the moving portion. This arrangement provides the effect similar to that of other embodiments. In this example, however, a magnetic circuit other than the gap is likely to be formed and in such a case, a part of the magnetic flux generated by the permanent magnet does not contribute to the generation of the retracting force. For this reason, the design of the magnetic circuit becomes more difficult. In this embodiment, the yoke 87 is made of a sheet metal which is substantially concentric with the center of rotation, and the center shape and other groove shapes are finished to predetermined shapes.

In any of the examples of the head retracting mechanism and the lock mechanism according to the present invention, the retracting force which is substantially constant throughout the full regions of the magnetic disk can be generated by the simple mechanism and a sufficiently large lock force can be generated at the lock position. Accordingly, a compact and high reliability magnetic disk drive can be accomplished. In these embodiments, the direction of the magnetic flux exists in the axial direction of the actuator pivot, but can be set in the radial direction.

Figure 91:
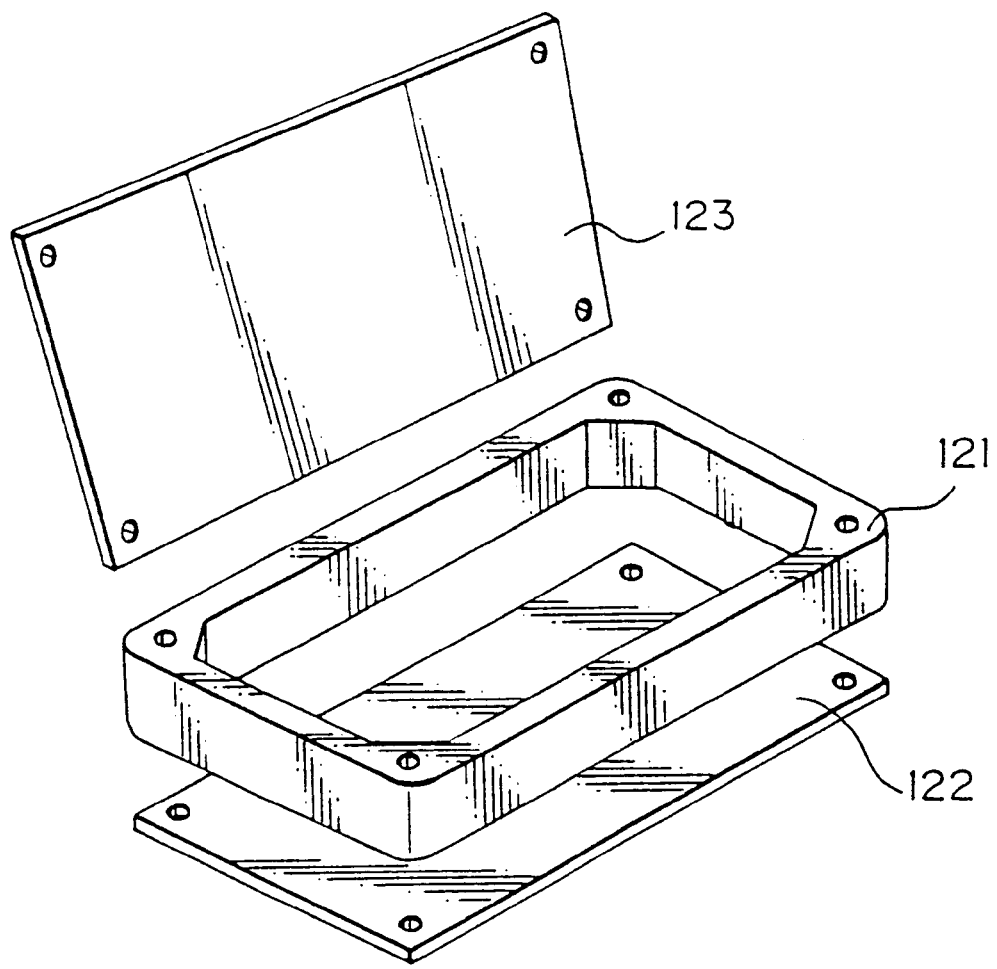
FIG. 91 is a view showing another example of a housing constituted from three separate elements; and, FIGS. 92, 93, 94 and 95 are views showing an example of a disk drive having a whole structure in which one disk and two heads are assembled in a housing according to the present invention.

FIG. 91 is an exploded perspective view showing an example of the housing constituted by three different elements. Since the constituent elements other than those of the housing in the embodiment shown in FIG. 91 are substantially the same as those of many other embodiments, the portions other than the housing will be omitted.

Here, the housing of the magnetic disk drive comprises a flat sheet-like base portion 122 at a lower portion, a cover portion 123 on the flat sheet at an upper portion and a frame portion 121 disposed at the side portions. The thickness of this frame portion 121 is set in advance so that the disk, the disk drive unit, the head assembly, and so forth, can be accommodated inside the housing.

If the base portion 122 and the cover portion 123 are made of an iron type metal having higher rigidity than aluminum, the thickness of each of the base portion 122 and the cover portion 123 can be reduced. Furthermore, if a magnetic material among the iron type metals is used, it can be used also as the yoke member for the actuator motor, and the thickness of the apparatus can be further reduced as a whole. The material of the frame portion 122 disposed in such a manner as to be sandwiched between the base portion 122 and the cover portion 123 is aluminum, for example, because die casting which can be practiced can be utilized.

When the magnetic substance is used for the base portion 122 and the cover portion 123, they can also be used as the yokes of the spindle motor and actuator motor or as auxiliary yokes. They also have the magnetic shielding effect. When the material of the frame portion 121 is a magnetic substance inclusive of iron, etc., there can be obtained the advantage that the magnetic shielding effect can be improved much more than when only the base portion 122 and the cover portion 123 are made of the magnetic material.

Figure 92:
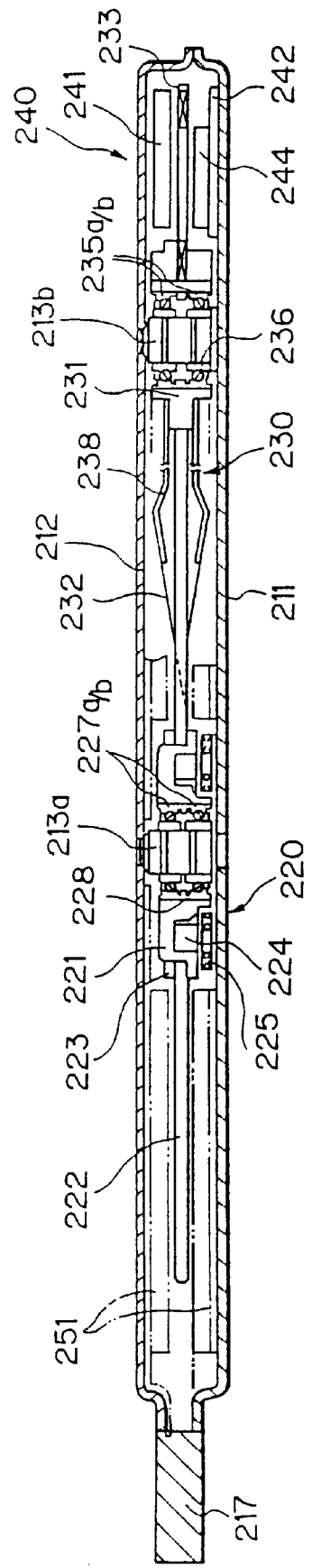
Figure 94:
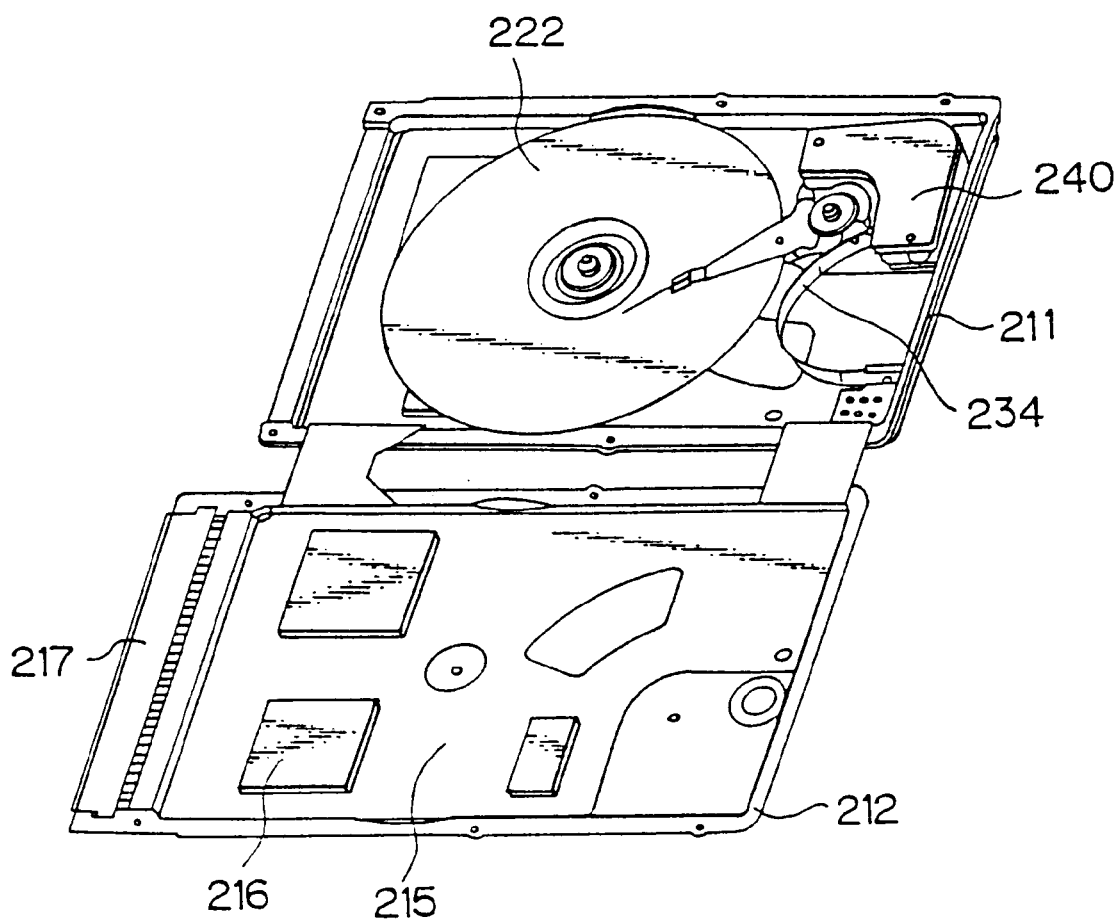
Figure 95:
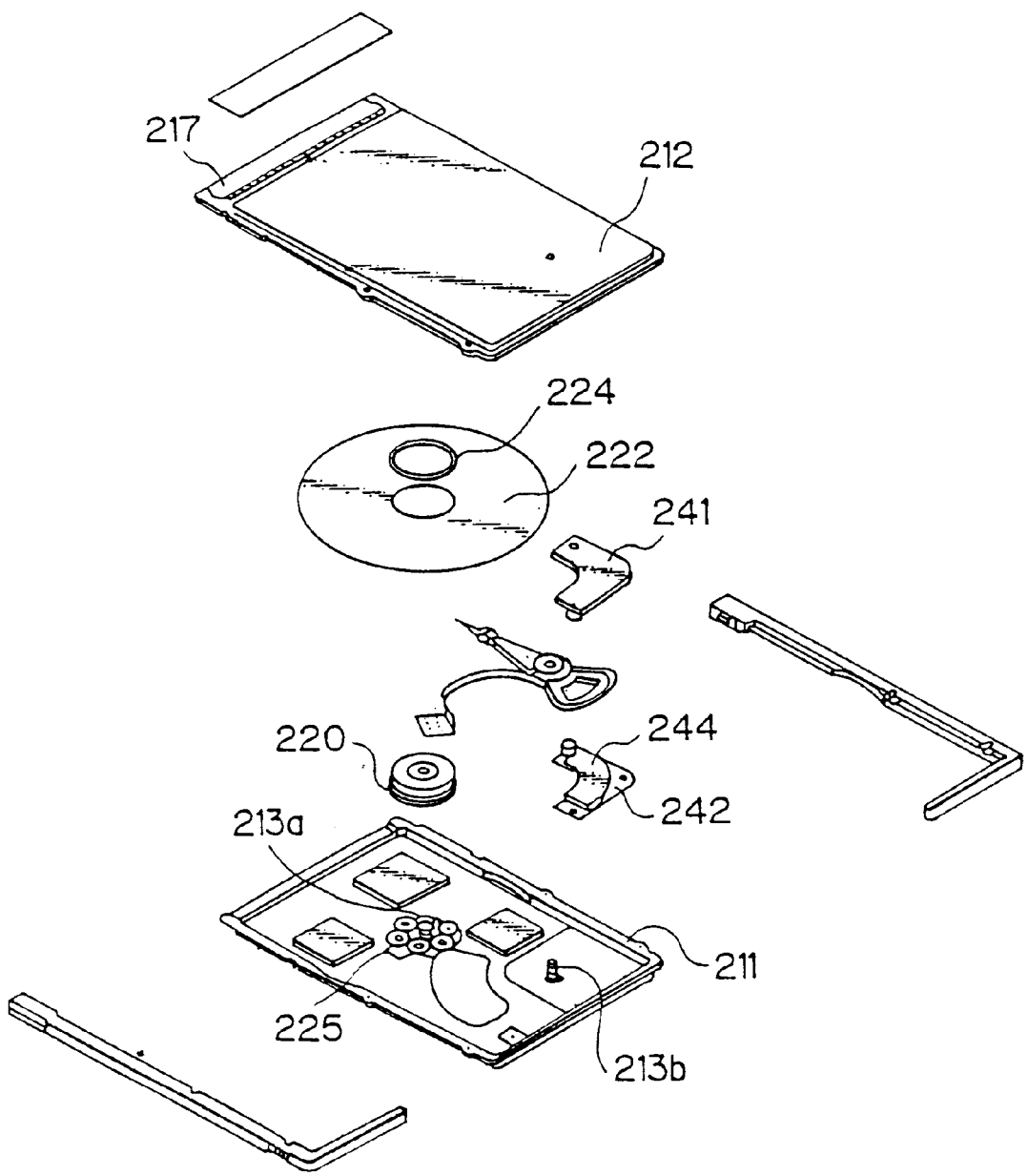

FIGS. 92, 93, 94 and 95 show most preferable embodiment of the disk drive having the overall structure wherein one disk and two heads are assembled in the housing according to the present invention. FIG. 92 is a sectional front view of the overall structure, FIG. 93 is a perspective view showing the principal portions of the overall structure, FIG. 94 is an exploded perspective view showing various components which are under the exploded state.

As shown in these drawings, the disk drive comprises one disk having a diameter of equal to or less than 1.89 inches, a disk driving means for rotating the disk, two magnetic heads capable of read and write from and to the surface of the disk, arms for supporting the magnetic heads, an actuator carriage for rotatably supporting the arms, bearings for allowing the rotation of the actuator carriage, a positioner driving means for rotating the actuator carriage and moving the magnetic heads to predetermined positions on the surface of the disk as a recording medium, a base and a cover mating with each other to form a housing (which protects at least a disk enclosure portion, the disk driving means, the magnetic heads, the actuator carriage, the bearings and the actuator driving means), and a circuit for controlling at least the disk driving means, the magnetic heads, and the read/write operation by the actuator driving means.

In this case, the circuit described above comprises a flexible printed circuit board, the height of the magnetic disk drive is about 5mm according to Type II of PCMCIA.

More in particular, reference numeral 211 in FIGS. 92 to 95 denotes the cover, and reference numeral 212 does the cover. Reference numerals 213a and 213b denote a disk side fixed shaft and an actuator side fixed shaft, respectively. As seen from FIG. 32, the base 211 and the cover 212 are made of an iron type metal, and such a metal provides, as mentioned earlier, a high magnetic shielding effect. The fixed shafts 213a and 213b are realized by using the shafts shown in FIG. 42, and the lower ends having flanges are fixed to the base 211 by rivetting (or press fitting and welding).

Furthermore, the upper end of each fixed shaft 213a, 213b is fixed to the cover 212 with the structure shown in FIG. 46.

One magnetic recording medium (disk) 222 is rotatably held, via a bearing and a spindle hub, on the shaft 213a, and a spindle motor 220 is assembled. An actuator 230 inclusive of the magnetic head 232 and the arm 238 is rotatably in a predetermined range of angle held on the actuator side fixed shaft 213b. This actuator 230 can move, as mentioned before, the magnetic head 232 to a desired track on the disk 222 and can keep it positioned there.

Reference numeral 251 denotes a flexible circuit board. This single flexible circuit board 251 is bonded and fixed, as mentioned in detail in FIG. 6, to the inner surface of the base 211 and cover 212 by a suitable adhesive, or the like. A group of electronic circuit components 216 necessary for controlling the operations of the disk drive as a whole (such as a servo circuit, a spindle motor control circuit, a read/write circuit, an interface circuit, etc.) are assembled and mounted on the printed circuit board 251 by dividing into an analog group circuit and digital group circuit. Furthermore, the printed circuit board 251 is connected to connectors 217 which are supported by the base 211 and the cover 212. When the connectors are connected to a plug portion of an external electronic appliance (such as a portable note-type personal computer), the magnetic disk drive shown in FIGS. 92 to 95 functions as an external memory device for the external electronic appliance.

Preferably, the spindle motor 220 in these drawings is a flat coil type DCM having an axial gap. Its hub 221 supports the disk 222 by bonding. A magnet 224 is bonded inside the spindle hub 221 by bonding. This magnet 224 is disposed in parallel with the disk 222 and is subjected to multipolar magnetization in a perpendicular direction. The spindle hub 222 functions as the yoke for the magnet 224.

Reference numeral 227a denotes a upper bearing of the disk, and 227b does its lower bearing. Reference numeral 228 denotes a spacer for securing a predetermined gap between the upper bearing 227a and the lower bearing 227b. The inner races of the lower and upper bearings are bonded and fixed to the fixed shaft 213a. The spindle hub 221 is made of an iron type material. The inner peripheral portion of the spindle hub 221 is bonded to the outer races of the upper and lower bearings 227a and 227b. A plurality of coils 225 are disposed below the magnet 224, and each of these coils is shaped concentrically on a flexible substrate and is disposed equidistantly with respect to the others. The magnetic circuit of the brushless motor described above is constituted by the spindle hub 221, the magnet 224, the coils 225 and the base 211. Each lead wire (not shown in FIGS. 92 to 95) extended from each coil 225 is connected to a corresponding terminal on the printed circuit board 251, and a current for driving the spindle motor 220 is supplied to each coil 225 through each lead wire. When a current is supplied to each coil 225, a driving force is generated inside the magnetic circuit described above and rotates the hub 221.

The structure of the actuator 230 inclusive of the magnetic heads 232 and the arms 238 will be explained in further detail. Reference numeral 225a denotes a back bearing of the actuator 230 and reference numeral 225b does its upper bearing. Reference numeral 236 denotes a spacer for securing a predetermined gap between the upper bearing 235a and the lower bearing 235b. The inner races of the upper and lower bearings 235a, 235b are bonded and fixed to the fixed shaft 213b. Reference numeral 231 denotes a block made of an iron type material. The inner peripheral portion of the block 231 is bonded to the outer races of the lower and lower bearings 235a, 235b.

Furthermore, the arms 238 are coupled to the block 231 from an axial direction by laser spot welding. Each magnetic head 232 is bonded and fixed to one of the ends of each arm 238. These two magnetic heads 232 face both surfaces of the magnetic recording medium 222, respectively. The coils 233 for driving the actuator 230 are disposed on the opposite side to the arms 238 and are fixed to the block 231 by resin molding.

Reference numeral 234 denotes a flexible printed board, which functions as a signal line for transferring read/write signals between the magnetic heads 232 and the control circuit and a feeder for supplying current to the coil of the actuator. This flexible printed board 234 is connected to the flexible printed circuit board 251 on the opposite side to the magnetic heads 232 by soldering.

A VCM (Voice Coil Motor) shown in FIG. 71 provides a driving force necessary for moving each magnetic head 232 to a desired position on the disk. This VCM comprises upper and lower yokes 242, side surface yokes 243a, 243b and a magnet 244 that together form a magnetic circuit 240, and each coil 233 disposed in this magnetic circuit 240. When a current is allowed to flow through each coil 233, the actuator 230 starts rotating.

In this case, a contact type integral magnetic head for vertical magnetic recording, disclosed in a unexamined Japanese patent publication 3-178017, is utilized for the magnetic head 232 so that the disk drive becomes light weight and can be driven by low voltage. However, by employing a loading/unloading mechanism, the ordinary magnetic head which effects horizontal recording and is equipped with a head slider having a predetermined float quantity, can also be used in place of the integral magnetic head described above.

According to such a structure, there occurs ordinarily the space which cannot be occupied at the upper and lower end portions of the housing with the exception of the proximity of the shaft and the actuator.

For this reason, various circuits can be assembled into the space described above, so that the space can be utilized more effectively inside the housing.

In another embodiment shown in FIGS. 92 to 95, the outer dimension of the disk drive is in agreement with the size of the specification of IC memory cards in accordance with the standard specification of PCMCIA or JEIDA. Furthermore, the connector of this disk drive can be made equal to the connector of the IC memory cards by using a magnetic recording medium (disk) having a diameter of about 1.3 in. (up to 1.89 in.), and the size can also be made equal to that of the IC memory cards. Further, if the same specification of an interface is adopted, it becomes possible to realize a compatibility with the IC memory card.

After all, according to 1-disk magnetic disk drive of the present invention, its memory capacity can be increased to at least 40M bytes while keeping its height equal to or less than 8 mm.

What is claimed is:

1. A disk drive comprising inside a housing:

a disk that stores information;

a spindle hub that is supported by a pair of bearing means rotatably in both directions, wherein said disk is fixed to said spindle hub by adhesion; and a plurality of recessed parts, which allow the adhesive to be stored in advance, are arranged on either one of the adhered surface of the spindle hub and the adhered surface of the disk which contact with each other, at predetermined spaces with respect to the circumferential direction of a spindle fixing shaft.

2. A disk drive according to claim 1, wherein said recessed parts are arranged at respectively equal spaces with respect to the circumferential direction of the spindle fixing shaft.

3. A disk drive according to claim 1, wherein a section of each of said recessed parts has one of a triangular form, a semicircular form, and a rectangular form.

4. A disk drive according to claim 1, wherein said recessed parts are combined into a continuous grooved form as a whole.

5. A disk drive comprising inside a housing:

a disk that stores information; and a spindle hub that is supported by a pair of bearing means rotatably in both directions, wherein said disk is fixed to said spindle hub by adhesion, wherein said disk is mounted to said spindle hub via fixing rings that are placed in one surface of said disk, so that said disk can be firmly adhered to said spindle hub, and wherein a stepped portion is formed in the outer peripheral part of the spindle hub, and an adhesive is poured in advance into a recessed part formed in the stepped portion, and both the disk mounted on the stepped portion and the fixing ring mounted on one surface of the disk are fixed together to the spindle hub by means of the adhesive.

6. A disk drive according to claim 5, wherein the adhesive for fixing both the disk and the fixing ring to the spindle hub is an adhesive having an anaerobic property.

* * * * *